(12) United States Patent
Huang et al.

(10) Patent No.: US 11,461,152 B2
(45) Date of Patent: Oct. 4, 2022

(54) INFORMATION INPUT METHOD AND TERMINAL

(71) Applicant: HUAWEI TECHNOLOGIES CO., LTD., Shenzhen (CN)

(72) Inventors: Liwei Huang, Beijing (CN); Zhenyu Liu, Wuhan (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/761,226

(22) PCT Filed: Nov. 30, 2017

(86) PCT No.: PCT/CN2017/114017
§ 371 (c)(1),
(2) Date: May 1, 2020

(87) PCT Pub. No.: WO2019/104669
PCT Pub. Date: Jun. 6, 2019

(65) Prior Publication Data
US 2020/0356422 A1 Nov. 12, 2020

(51) Int. Cl.
*G06F 9/54* (2006.01)
*G06F 9/451* (2018.01)
*G06F 3/0488* (2022.01)

(52) U.S. Cl.
CPC ............ *G06F 9/542* (2013.01); *G06F 3/0488* (2013.01); *G06F 9/451* (2018.02)

(58) Field of Classification Search
None
See application file for complete search history.

(56) References Cited

U.S. PATENT DOCUMENTS

| 5,165,012 A * | 11/1992 | Crandall ............. G06Q 10/109 345/618 |
| 8,144,839 B2 | 3/2012 | Boussard et al. |
| 8,639,684 B2 | 1/2014 | Djabarov |
| 2012/0053926 A1 | 3/2012 | Satpute |
| 2017/0031575 A1* | 2/2017 | Dotan-Cohen ..... G06F 3/04847 |
| 2020/0225908 A1* | 7/2020 | Lee ......................... G10L 15/22 |

FOREIGN PATENT DOCUMENTS

| CN | 102172003 A | 8/2011 |
| CN | 105912138 A | 8/2016 |
| CN | 106293080 A | 1/2017 |
| CN | 106570102 A | 4/2017 |
| CN | 106843526 A | 6/2017 |

* cited by examiner

*Primary Examiner* — Chat C Do
*Assistant Examiner* — William C Wood
(74) *Attorney, Agent, or Firm* — Stein IP, LLC

(57) ABSTRACT

An information input method and a terminal, related to the field of electronic technologies, to improve information input efficiency of the terminal. When a user launches a first application on a terminal, the terminal displays a first interface of the first application, and in response to a first operation performed by a user on the first interface, the terminal automatically selects at least one piece of first remark information that matches an attribute of the first application, and prompts the user with the at least one piece of first remark information in the first interface. In this way, the user can choose the first remark information as the input content, and the user does not need to type any words.

15 Claims, 33 Drawing Sheets

INFORMATION INPUT METHOD AND TERMINAL

CROSS-REFERENCE TO RELATED APPLICATIONS

This application is a national stage of International Application No. PCT/CN2017/114017, filed on Nov. 30, 2017, which is hereby incorporated by reference in its entirety.

TECHNICAL FIELD

Embodiments of this application relate to the field of electronic technologies, and in particular, to an information input method and a terminal.

BACKGROUND

With development of electronic technologies, more applications may be installed on a terminal. For example, applications such as a shopping-type application (for example, Taobao), a browser application, and a map application may be installed on the terminal.

When searching for information by using an application in the terminal, a user needs to enter, word by word, information that needs to be searched for. Consequently, information input efficiency is relatively low. For example, when a user shops by using Taobao in the terminal, if a commodity needs to be searched for, a name or a feature of the commodity needs to be entered into a search window in a Taobao interface of the terminal word by word. Consequently, information input efficiency is relatively low.

SUMMARY

Aspects of this application provide an information input method and a terminal, to improve information input efficiency of the terminal.

According to a first aspect, this application provides an information input method, applied to a terminal. The information input method includes: displaying, by the terminal, a first interface of a first application, and in response to a first operation performed by a user on the first interface, automatically selecting at least one piece of first remark information that matches an attribute of the first application, and prompting the user with the at least one piece of first remark information in the first interface; and displaying, by the terminal, a second interface of a second application, and in response to a first operation performed by the user on the second interface, automatically selecting at least one piece of second remark information that matches an attribute of the second application, and prompting the user with the at least one piece of second remark information in the second interface. The first remark information is information that is stored in a nonvolatile storage medium of the terminal when the user uses a third application, and the second remark information is information that is stored in the nonvolatile storage medium when the user uses a fourth application. The first application, the second application, and the third application are different applications, and the first remark information and the second remark information are different.

In the information input method provided in this application, because the first remark information matches the attribute of the first application, the first remark information probably includes information that the user wants to enter into the first interface of the first application. Because the second remark information matches the attribute of the second application, the second remark information probably includes information that the user wants to enter into the second interface of the second application. In addition, because the first remark information and the second remark information are stored in the nonvolatile storage medium of the terminal, the terminal may directly select matched remark information from the first remark information or the second remark information in response to the first operation, to enter the corresponding remark information, and does not need to enter the remark information word by word. This can improve information input efficiency.

In a possible design manner, the first operation performed on the first interface is a tap operation performed by the user on an input box in the first interface. The automatically selecting at least one piece of first remark information that matches an attribute of the first application includes: automatically selecting, by the terminal, at least one piece of first remark information that matches an attribute of the input box that is in the first interface and on which the first operation is performed. The first operation performed on the second interface is a tap operation performed by the user on an input box in the second interface. The automatically selecting at least one piece of second remark information that matches an attribute of the second application includes: automatically selecting, by the terminal, at least one piece of second remark information that matches an attribute of the input box that is in the second interface and on which the first operation is performed.

In this application, that the first remark information matches the attribute of the first application may be specifically that the first remark information matches the attribute of the input box in the first interface. That the second remark information matches the attribute of the second application may be specifically that the second remark information matches the attribute of the input box in the second interface.

In another possible design manner, the method in this application may further include: adding, by the terminal, a first mark to one piece of first remark information when detecting that the user performs, in the first application on the piece of first remark information, an operation that meets a preset condition; and the automatically selecting at least one piece of first remark information that matches an attribute of the first application includes: automatically selecting, by the terminal, first remark information that matches the attribute of the first application and to which the first mark is not added.

For example, it is assumed that the first application is a shopping-type application (for example, Taobao), and the first remark information is a commodity name (for example, a sweeping robot). When detecting that the user performs a purchase operation on the first remark information in the first application, the terminal may add the first mark (for example, purchased) to the first remark information. Correspondingly, when automatically selecting the first remark information that matches the attribute of the first application, the terminal may not select the first remark information to which the first mark is added.

According to this solution, the terminal may select, from the nonvolatile storage medium, the first remark information that matches the attribute of the first application and to which the first mark is not added, to prevent the terminal from repeatedly prompting the user with the first remark information on which the user has performed an operation, namely, the first remark information on which the user has performed, in the first application, the operation that meets the preset condition.

In another possible design manner, before the displaying, by the terminal, a first interface of a first application, and in response to a first operation performed by a user on the first interface, automatically selecting at least one piece of first remark information that matches an attribute of the first application, and prompting the user with the at least one piece of first remark information in the first interface. The method in this embodiment of this application further includes: when the user uses the third application, determining, by the terminal, a scenario attribute of a scenario in which the user uses the third application, and storing, in a scenario corresponding to the scenario attribute in a preset scenario library, the first remark information that is obtained by the terminal when the user uses the first application, where the preset scenario library is stored in the nonvolatile storage medium, the preset scenario library includes a plurality of scenarios, and each of the plurality of scenarios has a different scenario attribute. Correspondingly, the automatically selecting at least one piece of first remark information that matches an attribute of the first application includes: automatically selecting, by the terminal, a scenario that is in the preset scenario library and whose scenario attribute matches the attribute of the first application, and selecting first remark information in the matched scenario.

In another possible design manner, the third application and the fourth application may be the same. For example, the third application and the fourth application may be a same system-level application in the terminal, for example, Reminder. Alternatively, the third application and the fourth application may be different. For example, the third application and the fourth application may be different system-level applications in the terminal. For example, the third application is Reminder in the terminal, and the fourth application is Clipboard in the terminal.

In another possible design manner, the information input method may further include: displaying, by the terminal, historical prompt information in the first application in response to the first operation performed by the user on the first interface; and displaying, by the terminal, historical prompt information in the second application in response to the first operation performed by the user on the second interface.

In this application, in response to the first operation performed by the user on the first interface, the terminal may not only display the at least one piece of first remark information that matches the attribute of the first application, but also display historical search information in the first application; in response to the first operation performed by the user on the second interface, the terminal may not only display the at least one piece of second remark information that matches the attribute of the second application, but also display historical search information in the second application. In this way, the terminal can display both remark information corresponding to an application and historical search information in the application.

In another possible design manner, the method may further include: in response to a second operation performed by the user, the terminal may not only store third remark information in the nonvolatile storage medium by using the third application or the fourth application, but also display a third interface that includes a plurality of application options, where the plurality of application options are in a one-to-one correspondence with a plurality of applications installed on the terminal; and then, in response to a selection operation performed by the user on the plurality of application options in the third interface, the terminal stores, in the nonvolatile storage medium, a correspondence between the third remark information and an application corresponding to an application option selected by the user, or sets an attribute of the application option selected by the user to an attribute of the third remark information.

In this application, when storing remark information by using the third application or the fourth application, the terminal may display the third interface that is used by the user to select an application corresponding to the remark information, so that the user selects an application (for example, the first application) that may be subsequently used for the remark information. In this way, accuracy of a correspondence between remark information and an application can be improved.

In another possible design manner, in response to a second operation performed by the user, the terminal may not only store third remark information in the nonvolatile storage medium by using the third application or the fourth application; but also analyze the third remark information, and search a plurality of applications installed on the terminal for an application corresponding to the third remark information; and then, the terminal stores a correspondence between the third remark information and a found application in the nonvolatile storage medium, or sets an attribute of the found application to an attribute of the third remark information.

In another possible design manner, the first remark information is stored in the third application in the terminal. The automatically selecting, in response to a first operation performed by a user on the first interface, at least one piece of first remark information that matches an attribute of the first application includes: in response to the first operation performed by the user on the first interface, automatically selecting, by the terminal from remark information stored in the third application, the at least one piece of first remark information that matches the attribute of the first application. In other words, the terminal may select, from the remark information stored in the third application (namely, a system-level application), the at least one piece of first remark information that matches the attribute of the first application.

According to a second aspect, an embodiment of this application provides a terminal, including a display unit, a selection unit, and a storage unit. The display unit is configured to display a first interface of a first application. The selection unit is configured to: in response to a first operation performed by a user on the first interface displayed by the display unit, automatically select at least one piece of first remark information that matches an attribute of the first application. The display unit is further configured to prompt, in the first interface, the user with the at least one piece of first remark information selected by the selection unit, where the first remark information is information that is stored in the storage unit of the terminal when the user uses a third application, and the storage unit is a nonvolatile storage medium of the terminal. The display unit is further configured to display a second interface of a second application. The selection unit is configured to: in response to a first operation performed by the user on the second interface displayed by the display unit, automatically select at least one piece of second remark information that matches an attribute of the second application. The display unit is further configured to prompt, in the second interface, the user with the at least one piece of second remark information selected by the selection unit, where the second remark information is information that is stored in the storage unit when the user uses a fourth application, the first application, the second application, and the third application are different applications, and the first remark information and the second remark information are different.

In a possible design manner, the first operation that is performed on the first interface and to which the selection unit is in response is a tap operation performed by the user on an input box in the first interface displayed by the display unit. That the selection unit is configured to automatically select at least one piece of first remark information that matches an attribute of the first application includes: the selection unit is configured to automatically select at least one piece of first remark information that matches an attribute of the input box that is in the first interface and on which the first operation is performed. The first operation performed by the selection unit on the second interface is a tap operation performed by the user on an input box in the second interface displayed by the display unit. That the selection unit is configured to automatically select at least one piece of second remark information that matches an attribute of the second application includes: the selection unit is specifically configured to automatically select at least one piece of second remark information that matches an attribute of the input box that is in the second interface and on which the first operation is performed.

In another possible design manner, the terminal further includes: a detection unit and an addition unit. The detection unit is configured to detect whether the user performs, on one piece of first remark information in the first application, an operation that meets a preset condition. The addition unit is configured to add a first mark to one piece of first remark information when the detection unit detects that the user performs, in the first application on the piece of first remark information, the operation that meets the preset condition. That the selection unit is configured to automatically select at least one piece of first remark information that matches an attribute of the first application specifically includes: the selection unit is configured to automatically select first remark information that matches the attribute of the first application and to which the first mark is not added.

In another possible design manner, the terminal further includes a determining unit. The determining unit is configured to: before the display unit prompts the user with the at least one piece of first remark information in the first interface, when the user uses the third application, determine a scenario attribute of a scenario in which the user uses the third application. The storage unit is further configured to: store, in a scenario corresponding to the scenario attribute in a preset scenario library, the first remark information that is obtained by the terminal when the user uses the first application, where the preset scenario library is stored in the nonvolatile storage medium, the preset scenario library includes a plurality of scenarios, and each of the plurality of scenarios has a different scenario attribute.

In another possible design manner, that the selection unit is configured to automatically select at least one piece of first remark information that matches an attribute of the first application includes: the selection unit is specifically configured to: automatically select a scenario that is in the preset scenario library and whose scenario attribute matches the attribute of the first application, and select first remark information in the matched scenario.

In another possible design manner, the third application and the fourth application are the same.

In another possible design manner, the display unit is further configured to: display historical prompt information in the first application in response to the first operation performed by the user on the first interface; and display historical prompt information in the second application in response to the first operation performed by the user on the second interface.

In another possible design manner, the storage unit is further configured to: in response to a second operation performed by the user, store third remark information in the storage unit by using the third application or the fourth application; the display unit is configured to display a third interface in response to the second operation, where the third interface includes a plurality of application options, and the plurality of application options are in a one-to-one correspondence with a plurality of applications installed on the terminal; and the storage unit is further configured to: in response to a selection operation performed by the user on the plurality of application options, store, in the storage unit, a correspondence between the third remark information and an application corresponding to an application option selected by the user, or set an attribute of the application option selected by the user to an attribute of the third remark information.

In another possible design manner, the terminal further includes an analysis unit. The storage unit is further configured to: in response to a second operation performed by the user, store third remark information in the storage unit by using the third application or the fourth application. The analysis unit is configured to: in response to the second operation, analyze the third remark information, and search a plurality of applications installed on the terminal for an application whose attribute matches the third remark information. The storage unit is further configured to: store a correspondence between the third remark information and a found application, or set an attribute of the found application to an attribute of the third remark information.

In another possible design manner, the first remark information is stored in the third application in the terminal; and that a selection unit is configured to: in response to a first operation performed by a user on the first interface, automatically select at least one piece of first remark information that matches an attribute of the first application includes: the selection unit is specifically configured to: in response to the first operation performed by the user on the first interface, automatically select, by the terminal from remark information stored in the third application and the fourth application, the at least one piece of first remark information that matches the attribute of the first application.

According to a third aspect, an embodiment of this application provides a terminal, including a processor, a memory, and a touch screen. The memory, the touchscreen, and the processor are coupled, the memory is configured to store computer program code, the computer program code includes a computer instruction, the memory includes a nonvolatile storage medium, and when the processor executes the computer instruction, the touchscreen is configured to display a first interface of a first application; the processor is configured to: in response to a first operation performed by a user on the first interface, automatically select at least one piece of first remark information that matches an attribute of the first application; the touchscreen is further configured to prompt the user with the at least one piece of first remark information in the first interface, where the first remark information is information that is stored in the nonvolatile storage medium of the terminal when the user uses a third application; the touchscreen is further configured to display a second interface of a second application; the processor is further configured to: in response to a first operation performed by the user on the second interface, automatically select at least one piece of second remark information that matches an attribute of the second application; and the touchscreen is further configured to prompt the user with the at least one piece of second remark information in the second interface, where the second remark information is information that is stored in the nonvolatile storage medium when the user uses a fourth application, the first application, the second application, and the third application are different applications, and the first remark information and the second remark information are different.

In a possible design manner, the first operation performed on the first interface displayed by the touchscreen is a tap operation performed by the user on an input box in the first interface displayed by the touchscreen; the processor is specifically configured to automatically select at least one piece of first remark information that matches an attribute of the input box that is in the first interface and on which the first operation is performed; the first operation performed on the second interface displayed by the touchscreen is a tap operation performed by the user on an input box in the second interface displayed by the touchscreen; and the processor is specifically configured to automatically select at least one piece of second remark information that matches an attribute of the input box that is in the second interface and on which the first operation is performed.

In another possible design manner, the processor is further configured to add a first mark to one piece of first remark information when detecting that the user performs, in the first application on the piece of first remark information, an operation that meets a preset condition; and that the processor is configured to automatically select at least one piece of first remark information that matches an attribute of the first application includes: the processor is specifically configured to automatically select first remark information that matches the attribute of the first application and to which the first mark is not added.

In another possible design manner, the processor is further configured to: before the touchscreen prompts the user with the at least one piece of first remark information in the first interface, when the user uses the third application, determine a scenario attribute of a scenario in which the user uses the third application, and the memory is further configured to store, in a scenario corresponding to the scenario attribute in a preset scenario library, the first remark information that is obtained by the terminal when the user uses the first application, where the preset scenario library is stored in the nonvolatile storage medium, the preset scenario library includes a plurality of scenarios, and each of the plurality of scenarios has a different scenario attribute.

In another possible design manner, that the processor is configured to automatically select at least one piece of first remark information that matches an attribute of the first application. The processor is specifically configured to: automatically select a scenario that is in the preset scenario library and whose scenario attribute matches the attribute of the first application, and select first remark information in the matched scenario.

In another possible design manner, the third application and the fourth application are the same.

In another possible design manner, the touchscreen is further configured to: display historical prompt information in the first application in response to the first operation performed by the user on the first interface; and display historical prompt information in the second application in response to the first operation performed by the user on the second interface.

In another possible design manner, the memory is further configured to: in response to a second operation performed by the user, store third remark information in the nonvolatile storage medium by using the third application or the fourth application; the touchscreen is further configured to display a third interface in response to the second operation, where the third interface includes a plurality of application options, and the plurality of application options are in a one-to-one correspondence with a plurality of applications installed on the terminal; and the memory is further configured to: in response to a selection operation performed by the user on the plurality of application options, store, in the nonvolatile storage medium, a correspondence between the third remark information and an application corresponding to an application option selected by the user, or set an attribute of the application option selected by the user to an attribute of the third remark information.

In another possible design manner, the memory is further configured to: in response to a second operation performed by the user, store third remark information in the nonvolatile storage medium by using the third application or the fourth application; the processor is further configured to: in response to the second operation, analyze the third remark information, and search a plurality of applications installed on the terminal for an application whose attribute matches the third remark information; and the memory is further configured to: store a correspondence between the third remark information and a found application in the nonvolatile storage medium, or set an attribute of the found application to an attribute of the third remark information.

In another possible design manner, the first remark information is stored in the third application in the terminal; and the processor is configured to: in response to a first operation performed by a user on the first interface, automatically select at least one piece of first remark information that matches an attribute of the first application. The processor is specifically configured to: in response to the first operation performed by the user on the first interface, automatically select, from remark information stored in the third application and the fourth application, the at least one piece of first remark information that matches the attribute of the first application.

According to a fourth aspect, an embodiment of this application provides a control device, including a processor and a memory. The memory is configured to store computer program code, the computer program code includes a computer instruction, and when executing the computer instruction, the processor performs the information input method according to the first aspect and possible design manners of the first aspect.

According to a fifth aspect, this application provides a computer storage medium. The computer storage medium includes a computer instruction, and when the computer instruction is run on a terminal, the terminal is enabled to perform the information input method according to the first aspect and any possible design manner of the first aspect in this application.

According to a sixth aspect, this application provides a computer program product. When the computer program product is run on a computer, the computer is enabled to perform the information input method according to the first aspect and any possible design manner of the first aspect in this application.

It may be understood that, the terminals in the second aspect and the third aspect and the possible design manners thereof, the control device in the fourth aspect, the computer storage medium in the fifth aspect, and the computer program product in the sixth aspect that are provided above are all configured to perform the corresponding method provided above. Therefore, for beneficial effects that can be achieved by the terminals, the control device, the computer storage medium, and the computer program product, refer to beneficial effects in the corresponding methods provided above. Details are not described again herein.

FLOWCHART DESCRIPTION OF EMBODIMENTS

Figure 1:
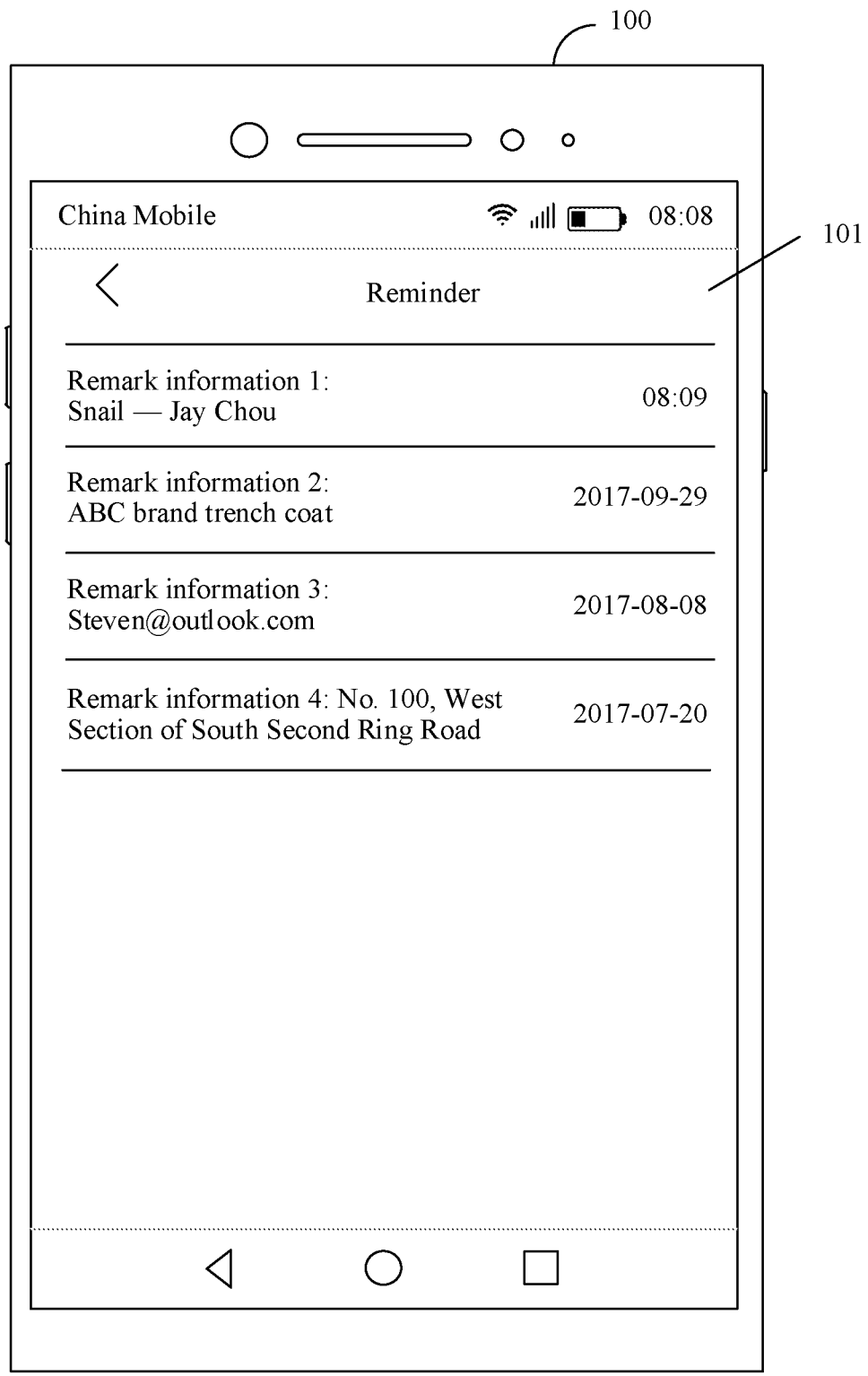
FIG. 1 is a schematic diagram 1 of an example display interface according to an embodiment of this application.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In description of this application, unless otherwise stated, "a plurality of" means at least two. The term "and/or" describes an association relationship between associated objects and indicates that three relationships may exist. For example, A and/or B may indicate the following three cases: Only A exists, both A and B exist, and only B exists.

This application provides an information input method and a terminal. The method may be applied to a process in which the terminal enters information into an interface of an application (for example, a first application or a second application).

The application (for example, the first application and the second application) in this embodiment of this application may be an embedded application program (namely, a system application in the terminal) that is installed on the terminal or a downloadable application program. The embedded application program is an application program provided as a part of the terminal (for example, a mobile phone). The downloadable application program is an application program that may provide an internet protocol multimedia subsystem (Internet Protocol Multimedia Subsystem, IMS) connection of the application program. The downloadable application program may be an application preinstalled on the terminal or may be a third-party application that may be downloaded by the user and installed on the terminal.

For example, the first application is used as an example. The first application may be "Taobao", and the method may be applied to a process in which the terminal enters a name of a to-be-purchased commodity into an interface of "Taobao". The first application may be a "browser" application, and the method may be applied to a process in which the terminal enters to-be-searched-for information into a Baidu search window. The first application may be an email client, and the method may be applied to a process in which the terminal enters a consignee email address into an interface of the email client. Certainly, the first application in this application includes but is not limited to the applications in the foregoing embodiment, and another possible form of the first application is not described in detail in this application. The second application and the first application are different. For example, when the first application is "Taobao", the second application may be a "browser" application; and when the first application is an email client, the second application may be "Baidu Maps".

A third application and a fourth application in this embodiment of this application may be embedded application programs (namely, system applications in the terminal) that are installed on the terminal. For example, the third application and the fourth application may be system-level applications such as Reminder (including Reminder used to record text data and picture data and Voice memo used to record audio data), Clipboard, Calendar, Notepad, Email, and Messaging in the terminal. The third application and the fourth application in this embodiment of this application are the same. For example, the third application and the fourth application each may be Reminder in the terminal. Alternatively, the third application and the fourth application in this embodiment of this application may be different. For example, the third application Reminder in the terminal, and the fourth application may be Clipboard in the terminal.

It may be understood that many users record, in terminals (namely, nonvolatile storage media of the terminals) by using the third application and/or the fourth application, information that may be used, such as a shopping list, an inbox address to which an email needs to be sent, a travel destination address, and a travel planning route, to facilitate viewing at any time.

Table 1 is an example table of remark information stored by the terminal in the nonvolatile storage medium of the terminal when the user uses the third application and/or the fourth application in this embodiment of this application.

TABLE 1

Remark information stored in a nonvolatile storage medium

| Remark information | Remark information source |
|---|---|
| 1. Snail - Jay Chou | Reminder |
| 2. ABC brand trench coat | |
| 3. Steven@outlook.com | |
| 4. No. 100, West Section of South Second Ring Road, Xi'an City | |
| 5. Sweeping robot | Messaging |
| 6. Bob - 18697645689 | |
| 7. September 19 - Mother's birthday | Calendar |
| 8. Garden Community, No. 2, North Street, Xi'an City | Clipboard |
| 9. Ben@126.com | |
| 10. Giant Wild Goose Pagoda - Terracotta Warrior - Huaqing Pool | |

As shown in Table 1, the remark information 1 (a user's favorite song "Snail"—Jay Chou), the remark information 2 (a commodity that the user wants to purchase—ABC brand trench coat), the remark information 3 (a mailbox address that is recorded by the user—Steven@outlook.com), and the remark information 4 (an address recorded by the user—No. 100, West Section of South Second Ring Road, Xi'an City) may be remark information stored by the terminal when the user uses Reminder. The remark information 5 (the sweeping robot) and the remark information 6 (Bob's mobile phone number 18697645689) may be remark information stored by the terminal when the user uses Messaging. The remark information 7 (September 19—Mother's birthday) may be remark information stored by the terminal when the user uses Calendar. The remark information 8 (Garden Community, No. 2, North Street, Xi'an City), the remark information 9 (a mailbox address Ben@126.com), and the remark information 10 (user's travel planning route in Xi'an, Giant Wild Goose Pagoda—Terracotta Warrior—Huaqing Pool) may be remark information stored by the terminal when the user uses Clipboard.

In this embodiment of this application, the nonvolatile storage medium may be a storage area (referred to as a preset storage area) that is in storage space of the terminal and that is specially used to store the remark information obtained when the user uses the foregoing application. In other words, the terminal may store, in the preset storage area, all the remark information obtained by the terminal when the user uses the foregoing applications. For example, the remark information 1 to the remark information 10 shown in Table 1 each are stored in the preset storage area.

Alternatively, the nonvolatile storage medium may be a storage area of a system-level application such as Reminder, Clipboard, Calendar, Notepad, Email, or Messaging in the terminal. For example, the remark information 1 to the remark information 4 shown in Table 1 are remark information stored by the terminal when the user uses Reminder, and the remark information 1 to the remark information 4 may be stored in a storage area corresponding to Reminder. The remark information 5 and the remark information 6 may be stored in a storage area corresponding to Messaging. The remark information 7 may be stored in a storage area corresponding to Calendar. The remark information 8 to the remark information 10 may be stored in a storage area corresponding to Clipboard.

For example, as shown in FIG. 1, Reminder in a mobile phone 100 records the remark information 1 (the user's favorite song—"Snail"—Jay Chou), the remark information 2 (the commodity that the user wants to purchase—ABC brand trench coat), the remark information 3 (the mailbox address that is recorded by the user Steven@outlook.com), and the remark information 4 (the address recorded by the user—No. 100, West Section of South Second Ring Road).

It may be understood that, when the user uses the first application or the second application in the terminal, it is very likely that the user needs to enter, into an interface of the first application or an interface of the second application, remark information stored by the terminal in the nonvolatile storage medium when the user uses the third application and/or the fourth application. For example, when the terminal displays the interface of "Taobao", the user may enter the name of the to-be-purchased commodity into the interface of "Taobao", for example, a disc album of "Snail", the ABC brand trench coat, or the sweeping robot.

In this embodiment of this application, to improve information input efficiency when the user searches for information by using an application in the terminal, the terminal may display, in response to a first operation performed by the user on a first interface of the first application, at least one piece of first remark information that matches an attribute of the first application, and display, in response to a first operation performed by the user on a second interface of the second application, at least one piece of second remark information that matches an attribute of the second application. Because the first remark information is information that is stored in the nonvolatile storage medium of the terminal when the user uses the third application, and the first remark information matches the attribute of the first application, the first remark information probably includes information that the user wants to enter into the first interface of the first application. Because the second remark information is information that is stored in the nonvolatile storage medium when the user uses the fourth application, and the second remark information matches the attribute of the second application, the second remark information probably includes information that the user wants to enter into the second interface of the second application. In this case, the terminal can directly enter, in response to a selection operation performed by the user on the at least one piece of first remark information or the at least one piece of second remark information, remark information selected by the user, and does not need to enter the remark information word by word. This can improve information input efficiency.

For example, the terminal in this application may be a mobile phone, a tablet, a personal computer (Personal Computer, PC), a personal digital assistant (personal digital assistant, PDA), a smartwatch, a netbook, a wearable electronic device, or the like. A specific form of the terminal is not particularly limited in this application.

Figure 2:
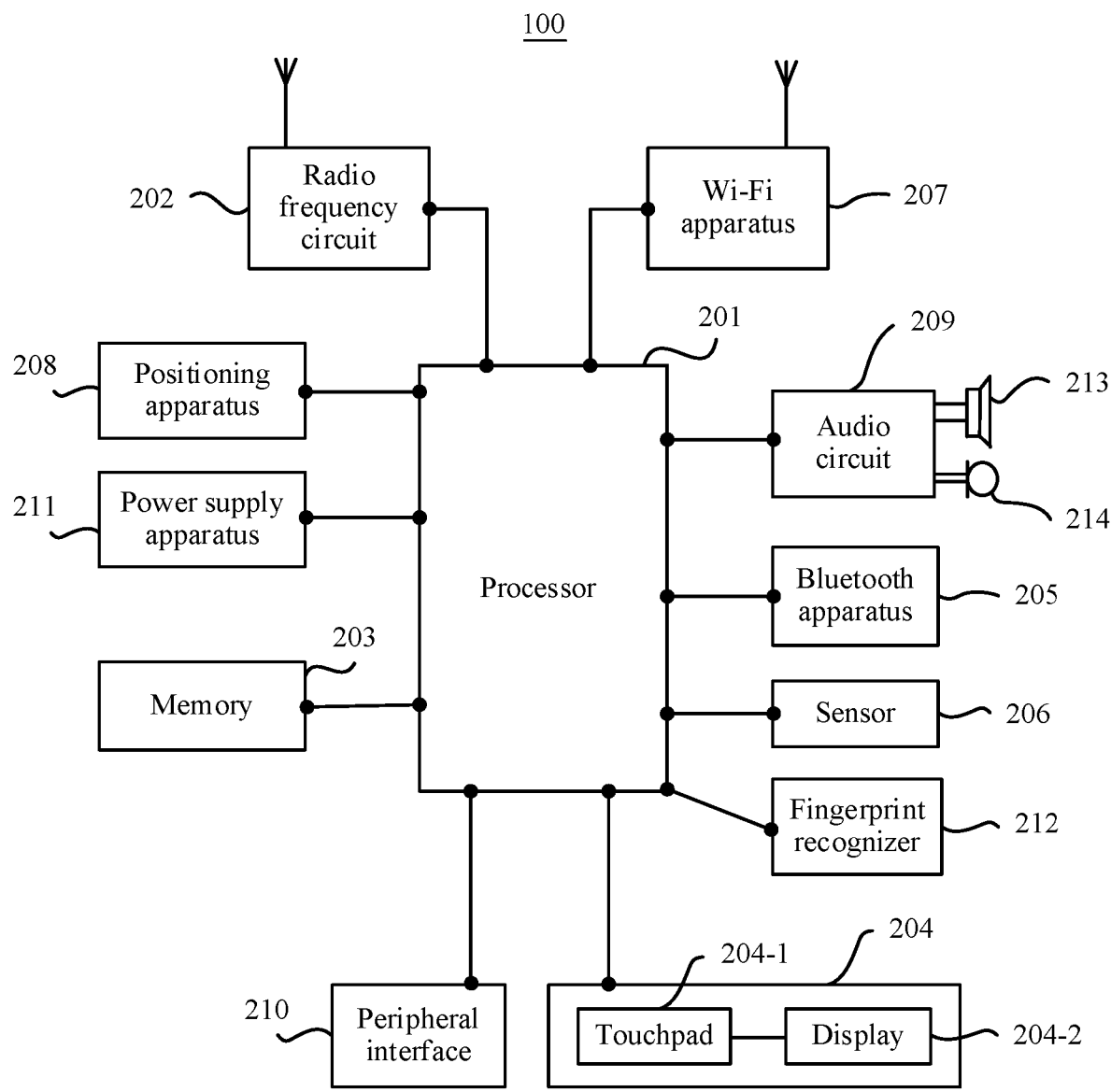
FIG. 2 is a schematic diagram of a hardware structure of a terminal according to an embodiment of this application.

The information input method provided in this application may be performed by an information input apparatus, and the information input apparatus may be a terminal shown in FIG. 2. In addition, the information input apparatus may alternatively be a central processing unit (CPU) of the terminal, or a control module that is configured to enter information into the terminal. In this embodiment of the present invention, an example in which the terminal performs the information input method is used to describe the information input method provided in this embodiment of the present invention.

Referring to FIG. 2, in this application, an example in which the terminal is a mobile phone 100 shown in FIG. 2 is used herein to describe the terminal provided in this application. The mobile phone 100 shown in FIG. 2 is only an example of the terminal, and the mobile phone 100 may have more or fewer components than those shown in the figure, or may combine two or more components, or may have different component configurations. Various components shown in FIG. 2 may be implemented in hardware that includes one or more signal processing and/or application-specific integrated circuits, in software, or in a combination of hardware and software.

As shown in FIG. 2, the mobile phone 100 is used as an example of the terminal. The mobile phone 100 may specifically include components such as a processor 201, a radio frequency (Radio Frequency, RF) circuit 202, a memory 203, a touchscreen 204, a Bluetooth apparatus 205, one or more sensors 206, a Wi-Fi apparatus 207, a positioning apparatus 208, an audio circuit 209, a peripheral interface 210, and a power supply apparatus 211. These components may perform communication by using one or more communication buses or signal lines (not shown in FIG. 2). A person skilled in the art may understand that a hardware structure shown in FIG. 2 does not constitute any limitation on the mobile phone, and the mobile phone 100 may include more or fewer components than those shown in the figure, or may combine some components, or may have different component arrangements.

The following describes the components of the mobile phone 100 in detail with reference to FIG. 2.

The processor 201 is a control center of the mobile phone 100. The processor 101 is connected to parts of the mobile phone 100 by using various interfaces and cables, runs or executes an application program stored in the memory 203, and invokes data stored in the memory 203, to perform various functions of the mobile phone 100 and process data. In some embodiments, the processor 201 may include one or more processing units. In some embodiments of this application, the processor 201 may further include a fingerprint verification chip, configured to verify a captured fingerprint.

The radio frequency circuit 202 may be configured to receive and send radio signals. Particularly, after receiving downlink data from a base station, the radio frequency circuit 202 may send the downlink data to the processor 201 for processing, and send uplink data to the base station. Usually, the radio frequency circuit includes but is not limited to an antenna, at least one amplifier, a transceiver, a coupler, a low noise amplifier, a duplexer, and the like. In addition, the radio frequency circuit 202 may further communicate with another device through wireless communication. Any communications standard or protocol may be used for the wireless communication, and includes but is not limited to a global system for mobile communications, a general packet radio service, code division multiple access, wideband code division multiple access, long term evolution, and the like.

Figure 3:
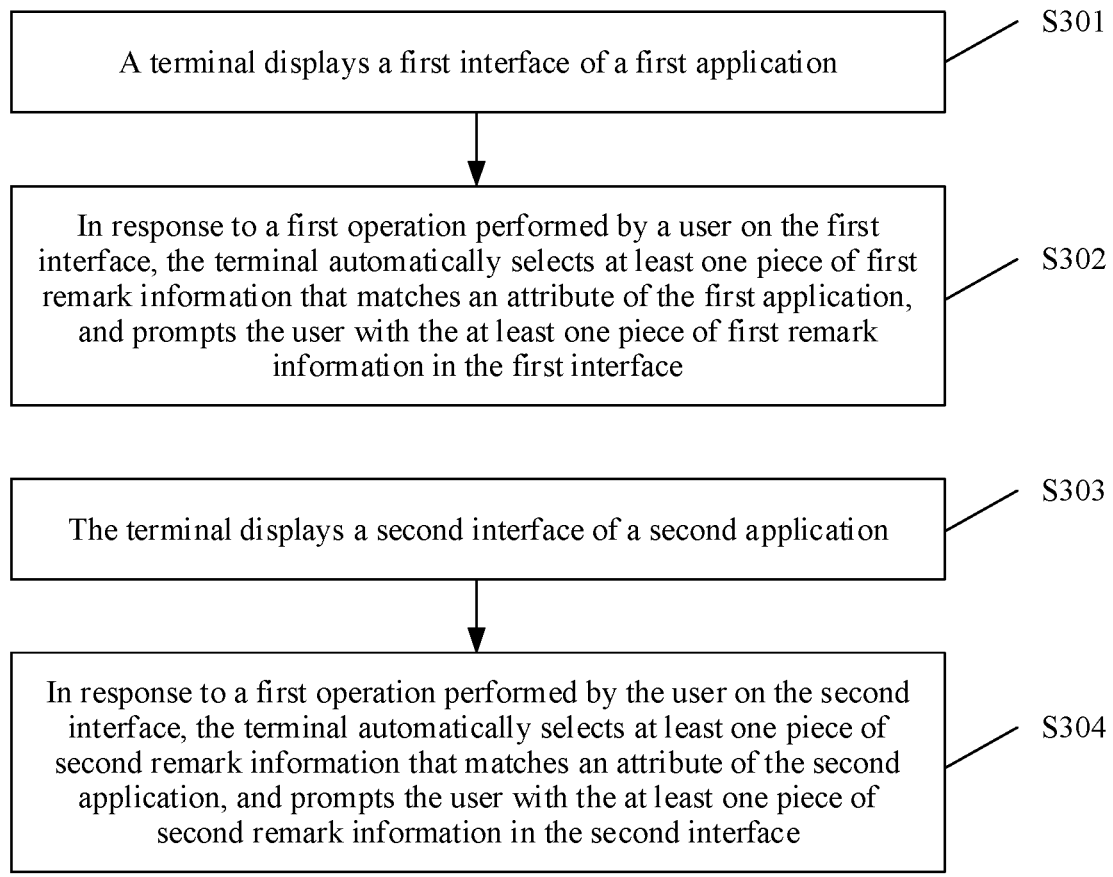
FIG. 3 is a flowchart of an information input method according to an embodiment of this application.

The memory 203 is configured to store the application program and the data. The processor 201 runs the application program and the data that are stored in the memory 203, to execute various functions of the mobile phone 100 and process data. The memory 203 mainly includes a program storage area and a data storage area. The program storage area may store at least one of an operating system or an application program required by at least one function (such as an audio playing function or an image playing function). The data storage area may store data (such as audio data or a phone book) that is created based on use of the mobile phone 100. The memory 203 may be divided into different storage areas based on different functions, and is configured to store application programs and data created based on use of the application programs. For example, as shown in FIG. 3, the memory 203 of the mobile phone 100 may include a Reminder storage area, a Taobao storage area, an email box storage area, and the like. For example, an application program—Reminder in the mobile phone 100 may invoke data stored in the Reminder storage area, and the mobile phone 100 may store, in the Reminder storage area of the memory 203, remark information written by the user into Reminder. The Taobao storage area is used to store related data of the application program—Taobao in the mobile phone 100, for example, order information and a commodity browsing record.

In addition, the memory 203 may include a high-speed random access memory (Random Access Memory, RAM), and may further include a nonvolatile memory such as a magnetic disk storage device, a flash memory device, another volatile solid-state storage device, and the like. The memory 203 may store various operating systems. The memory 203 may be independent, and is connected to the processor 201 by using the communications bus; or the memory 203 may be integrated with the processor 201.

The touchscreen 204 may specifically include a touchpad 204-1 and a display 204-2.

The touchpad 204-1 may capture a touch event performed by the user of the mobile phone 100 on or near the touchpad 204-1 (for example, an operation performed by the user on or near the touchpad 204-1 by using any appropriate object such as a finger or a stylus), and send captured touch information to another component (for example, the processor 201). The touch event performed by the user near the touchpad 204-1 may be referred to as a floating touch. The floating touch may be that the user does not need to directly touch the touchpad to select, move, or drag an object (for example, an icon), and that the user only needs to be located near a device for ease of performing a required function. In addition, the touchpad 204-1 may be implemented in a plurality of types such as a resistive type, a capacitive type, an infrared type, and a surface acoustic wave type.

The display (also referred to as a display screen) 204-2 may be configured to display information entered by the user or information provided for the user and various menus in the mobile phone 100. The display 204-2 may be configured in a form of a liquid crystal display, an organic light emitting diode, or the like. The touchpad 204-1 may cover the display 204-2. After detecting the touch event on or near the touchpad 204-1, the touchpad 204-1 transmits the touch event to the processor 201 to determine a type of the touch event. Then, the processor 201 may provide a corresponding visual output on the display 204-2 based on the type of the touch event.

It should be noted that, although the touchpad 204-1 and the display screen 204-2 are used as two independent components to implement input and output functions of the mobile phone 100 in FIG. 2, the touchpad 204-1 and the display screen 204-2 may be integrated to implement the input and output functions of the mobile phone 100 in some embodiments.

It may be understood that, the touchscreen 204 may include a plurality of stacked layers of materials. Only the touchpad (layer) and the display screen (layer) are presented in this embodiment of this application. Other layers are not described in this embodiment of this application. In addition, the touchpad 204-1 may be configured on a front side of the mobile phone 100 in a form of a full panel, and the display screen 204-2 may also be configured on the front side of the mobile phone 100 in a form of a full panel. Therefore, a frameless structure can be implemented for the front side of the mobile phone.

In addition, the mobile phone 100 may further have a fingerprint recognition function. For example, a fingerprint recognizer 212 may be configured on a rear side (for example, below a rear camera) of the mobile phone 100, or a fingerprint recognizer 212 is configured on a front side (for example, below the touchscreen 204) of the mobile phone 100. For another example, a fingerprint recognizer 212 may be configured in the touchscreen 204 to implement the fingerprint recognition function. To be specific, the fingerprint recognizer 212 may be integrated with the touchscreen 204 to implement the fingerprint recognition function of the mobile phone 100. In this case, the fingerprint recognizer 212 is configured in the touchscreen 204, and may be a part of the touchscreen 204, or may be configured in the touchscreen 204 in another manner. A main component of the fingerprint recognizer 212 in this embodiment of this application is a fingerprint sensor. Any type of sensing technology may be used for the fingerprint sensor, and includes but is not limited to an optical, capacitive, piezoelectric, or ultrasonic sensing technology, or the like.

The mobile phone 100 may further include the Bluetooth apparatus 205, configured to implement data exchange between the mobile phone 100 and another short-range device (for example, a mobile phone or a smartwatch). In this embodiment of this application, the Bluetooth apparatus may be an integrated circuit, a Bluetooth chip, or the like.

The one or more sensors 206 include a sensor that is disposed on a side edge of the mobile phone and that may be configured to detect a pressing operation performed by the user on the side edge and a sliding operation performed by the user on the side edge. The side edge in this application includes a left side edge of the terminal and/or a right side edge of the terminal.

Certainly, the one or more sensors 206 include but are not limited to the foregoing sensor. For example, the one or more sensors 206 may further include an optical sensor, a motion sensor, and another sensor. Specifically, the optical sensor may include an ambient optical sensor and a proximity sensor. The ambient optical sensor may adjust luminance of the display of the touchscreen 204 based on brightness of ambient light. The proximity sensor may turn off a power supply of the display when the mobile phone 100 moves to an ear. As one type of the motion sensor, an accelerometer sensor may detect values of acceleration in various directions (usually on three axes). The accelerometer sensor may detect a value and a direction of gravity when the accelerometer sensor is in a static state, and may be applied to an application for recognizing a mobile phone posture (such as switching between a landscape screen and a vertical screen, a related game, and magnetometer posture calibration), a function related to vibration recognition (such as a pedometer and a knock), and the like. Other sensors such as a gyroscope, a barometer, a hygrometer, a thermometer, and an infrared sensor may be further configured in the mobile phone 100. Details are not described herein.

The Wi-Fi apparatus 207 is configured to provide network access complying with a Wi-Fi related standard protocol for the mobile phone 100. By using the Wi-Fi apparatus 207, the mobile phone 100 may access a Wi-Fi hotspot, and further help the user send and receive e-mails, browse web pages, access streaming media, and the like. The Wi-Fi apparatus 207 provides wireless broadband Internet access for the user. In some other embodiments, the Wi-Fi module 207 may alternatively be used as a Wi-Fi wireless access point, to provide Wi-Fi network access for another device.

The positioning apparatus 208 is configured to provide a geographic location for the mobile phone 100. It may be understood that, the positioning apparatus 208 may be specifically a receiver of a positioning system such as a global positioning system (GPS), a BeiDou navigation satellite system, or Russian GLONASS.

After receiving a geographic location sent by the positioning system, the positioning apparatus 208 sends the information to the processor 201 for processing, or sends the information to the memory 203 for storage. In some other embodiments, the positioning apparatus 208 may alternatively be a receiver of an assisted global positioning system (Assisted Global Positioning System, AGPS). The AGPS system, as an assistance server, assists the positioning apparatus 208 in completing ranging and positioning services. In this case, a positioning assistance server communicates with the positioning apparatus 208 (namely, a GPS receiver) of a device such as the mobile phone 100 by using a wireless communications network, to provide positioning assistance.

In some other embodiments, the positioning apparatus 208 may be a positioning technology based on a Wi-Fi hotspot. Because each Wi-Fi hotspot has a globally unique media access control (Media Access Control, MAC) address, a device may scan and capture broadcast signals from surrounding Wi-Fi hotspots when Wi-Fi is enabled, and therefore can obtain MAC addresses broadcast by the Wi-Fi hotspots. The device sends, to a location server by using a wireless communications network, data (for example, the MAC addresses) that can identify the Wi-Fi hotspots, and the location server retrieves a geographic location of each Wi-Fi hotspot, calculates a geographic location of the device with reference to strength of the Wi-Fi broadcast signals, and sends the geographic location to the positioning apparatus 208 of the device.

The audio circuit 209, a speaker 213, and a microphone 214 may provide an audio interface between the user and the mobile phone 100. The audio circuit 209 may convert received audio data into an electrical signal and then transmit the electrical signal to the speaker 213, and the speaker 213 converts the electrical signal into an audio signal for outputting. In addition, the microphone 214 converts a captured audio signal into an electrical signal, and the audio circuit 209 receives the electrical signal and converts the electrical signal into audio data and then outputs the audio data to the RF circuit 202; and then the audio data is transmitted to another mobile phone, or the audio data is output to the memory 203 for further processing.

The peripheral interface 210 is configured to provide various interfaces for external input/output devices (for example, a keyboard, a mouse, an external display, an external memory, and a subscriber identification module card). For example, the peripheral interface 210 is connected to the mouse by using a universal serial bus (USB) interface, and is connected, by using a metal contact on a card slot of the subscriber identity module card, to the subscriber identification module (SIM) card provided by a telecommunications operator. The peripheral interface 210 may be configured to couple the external input/output device to the processor 201 and the memory 203.

In this embodiment of the present invention, the mobile phone 100 may communicate with another device in a device group by using the peripheral interface 210. The mobile phone 100, for example, may receive, by using the peripheral interface 210, to-be-displayed data sent by another device and display the data. This is not limited in this embodiment of the present invention.

The mobile phone 100 may further include the power supply apparatus 211 (for example, a battery or a power supply management chip) that supplies power to the components. The battery may be logically connected to the processor 201 by using the power supply management chip, so that functions such as charging, discharging, and power consumption management are implemented by using the power supply apparatus 211.

Although not shown in FIG. 2, the mobile phone 100 may further include a camera (a front-facing camera and/or a rear-facing camera), a camera flash, a micro projection apparatus, a near field communication (Near Field Communication, NFC) apparatus, and the like. Details are not described herein.

All methods in the following embodiments may be implemented in the mobile phone 100 having the foregoing hardware structure.

This application provides an information input method. The information input method may be applied to a terminal. As shown in FIG. 3, the information input method includes S301 to S304.

S301. The terminal displays a first interface of a first application.

The first application in this embodiment of this application may be an application program that is in a display interface (namely, the first interface) and that includes an input box. The input box is used by a user to enter information.

S302. In response to a first operation performed by the user on the first interface, the terminal automatically selects at least one piece of first remark information that matches an attribute of the first application, and prompts the user with the at least one piece of first remark information in the first interface.

The at least one piece of first remark information in this embodiment of this application is information that is stored in a nonvolatile storage medium of the terminal when the user uses a third application.

For example, the terminal stores remark information in the nonvolatile storage medium when the user uses the third application, and do so in the following manners: the terminal receives text information entered by using a keyboard (a virtual keyboard or a physical keyboard) of the terminal when the user uses the third application, and stores the text information (namely, the remark information) in the nonvolatile storage medium; the terminal receives voice information entered by using the microphone when the user uses the third application, performs a semantic analysis on the voice information to obtain corresponding text information, and stores the text information (namely, the remark information) in the nonvolatile storage medium; the terminal receives a picture (for example, a taken picture, a picture sent by another terminal, a picture obtained by taking a screenshot, or a picture downloaded from a network side) obtained when the user uses the third application, analyzes content of the picture to obtain text information used to describe the picture, and stores the text information (namely, the remark information) in the nonvolatile storage medium; the terminal receives text information obtained through cutting or copying when the user uses the third application, and stores the text information (namely, the remark information) in the nonvolatile storage medium; and so on. In this embodiment of this application, a specific manner in which the terminal stores the remark information in the nonvolatile storage medium when the user uses the third application includes but is not limited to the foregoing listed manners.

In this embodiment of this application, an attribute of an application (for example, the attribute of the first application) may be used to represent an application type of the application. Application types in this embodiment of this application may include at least a shopping type, an email box type, a search type, a navigation type, and the like. These application types may be obtained from application providers. Usually, when these applications are launched, providers provide application type information for a user, and the terminal can learn of and store the application type information when being installed with a client. For example, application types of "Taobao" and "Jingdong" are a shopping type; application types of "Outlook mailbox", "Foxmail mailbox", and "126 mailbox" are an email box type; application types of "Baidu", "QQ Music", "iQIYI Video", "UC Browser", and the like that can be used for an information search are a search type; and application types of "Baidu Maps", "AutoNavi Map", and the like that can be used for navigation are a navigation type.

For example, "Remark information stored in a nonvolatile storage medium" shown in Table 1 is used as an example. An attribute of stored information may be automatically determined through a semantic analysis, a format analysis, scenario matching, automatic matching, and the like, or may be manually determined by the user through marking. An automatic manner and a manual manner may both exist, and there may be more than one attribute. For example, when remark information includes three parts: a "user name", "@", and a "domain name", the terminal may determine that the remark information is remark information of a mailbox address attribute. For example, the terminal may automatically determine, based on an information format, that information "Steven@outlook.com" is an "Outlook mailbox" address. For example, a semantic analysis and a format analysis are performed on the remark information 1 "Snail—Jay Chou", to determine that the remark information 1 includes a snail and a person name, so that it is determined that the remark information 1 may be a song, or may be a song album or an optical disc, or may be a book, a movie, an image work, or the like. Therefore, an attribute of the remark information 1 indicates that the remark information 1 may be a commodity, or may be a song, a movie, a book, a picture, a book work, or the like. As shown in Table 2, the remark information 1 may be remark information that matches an attribute of "QQ Music", and the remark information 1 may also be remark information that matches an attribute of "Taobao", or the like. For example, a scenario analysis is performed on the remark information 2 "ABC brand trench coat" shown in Table 1. If the user enters the information into a shopping APP "Taobao", it may be determined that an attribute of the information is a shopping type. Alternatively, a semantic analysis may be performed on the information, and it is determined that the information is a trench coat type. Alternatively, various analyses are performed together. For example, an attribute of the information is determined based on a result of the scenario analysis and a result of the semantic analysis. Therefore, the attribute of the remark information 2 may be automatically determined as the shopping type. As shown in Table 2, the remark information 2 may be remark information that matches the attribute of "Taobao". When a device is connected to a network, an attribute of remark information may be queried on the network. Certainly, when an Internet access fee is considered, a network query may be performed only when the user agrees, or a network query may be performed only when the attribute cannot be automatically determined in another method.

Because the remark information 3 "Steven@outlook.com" is a mailbox address of an "Outlook mailbox", an attribute of the remark information 3 may indicate that the remark information 3 is a mailbox address. As shown in Table 2, the remark information 3 may be remark information that matches an attribute of an email box.

Similarly, as shown in Table 2, the remark information 4 "No. 100, West Section of South Second Ring Road, Xi'an City" in Table 1 may be remark information that matches an attribute of Baidu Maps. The remark information 5 "Sweeping robot" in Table 1 may be remark information that matches an attribute of "Taobao". The remark information 6 "Bob—18697645689" in Table 1 may be remark information that matches an attribute of "Contacts". The remark information 7 "September 19—Mother's birthday" in Table 1 is a reminding item. In a shopping-type application (for example, "Taobao"), the remark information 7 may be used to provide a reminder that a gift needs to be purchased for the mother, and in "Messaging" and "WeChat", the remark information 7 may be used to provide a reminder that a blessing needs to be given to the mother on September 19. Therefore, the remark information 7 may be remark information that matches attributes of "Taobao", "Messaging", and "WeChat". The remark information 8 "Garden Community, No. 2, North Street, Xi'an City" in Table 1 is address information. The address information may be used to perform navigation in a navigation-type application (for example, "Baidu Maps"), or may be used as a delivery address of an order in the shopping-type application (for example, "Taobao"). Therefore, the remark information 8 may be remark information that matches the attribute of "Baidu Maps". The remark information 9 "Ben@126.com" in Table 1 may be remark information that matches the attribute of the email box. The remark information 10 "Giant Wild Goose Pagoda—Terracotta Warrior—Huaqing Pool" in Table 1 includes address information, and the remark information 10 includes the scenic spot information. Therefore, as shown in Table 2, the remark information 10 may be remark information that matches attributes of "Baidu Maps" and "Ctrip".

TABLE 2

Table of a correspondence between remark information and an application

| Remark information | First application/ second application |
| --- | --- |
| Remark information 1 (Snail - Jay Chou) | Taobao QQ Music |
| Remark information 2 (ABC brand trench coat) | Taobao |
| Remark information 3 (Steven@outlook.com) | Email box |
| Remark information 4 (No. 100, West Section of South Second Ring Road, Xi'an City) | Baidu Maps Taobao |
| Remark information 5 Sweeping robot | Taobao |
| Remark information 6 (Bob - 18697645689) | Contacts |
| Remark information 7 (September 19 - Mother's birthday) | Email box |
| Remark information 8 (Garden Community, No. 2, North Street, Xi'an City) | Baidu Maps Taobao |
| Remark information 9 | Email box |

TABLE 2-continued

Table of a correspondence between remark information and an application

| Remark information | First application/ second application |
| --- | --- |
| (Ben@126.com) | |
| Remark information 10 (Giant Wild Goose Pagoda - Terracotta Warrior - Huaqing Pool) | Baidu Maps Ctrip |

It should be noted that applications whose attributes match the foregoing remark information include but are not limited to the applications shown in Table 2. For example, applications whose attributes match the remark information 2 may further include another shopping-type application installed on the terminal, and applications whose attributes match the remark information 8 may further include another navigation-type application installed on the terminal.

Optionally, the first application or the second application in this embodiment of this application may alternatively be a web page corresponding to any one of the foregoing application programs, and the web page includes an input box used to enter information. In this embodiment of this application, the first application and the second application include but are not limited to the foregoing listed application programs. Other specific forms of the first application and the second application are not described herein one by one in this embodiment of this application.

The first operation performed by the user on the first interface may be a tap operation performed by the user on an input box in the first interface. Usually, after the user taps the input box, a cursor used to indicate that the user may start to enter information is displayed in the input box. In this case, the user can start to enter information into the input box. In addition, when the terminal does not include the physical keyboard or does not display the virtual keyboard, only after the user taps the input box, the terminal can invoke an input method program in the terminal to display the virtual keyboard used to enter information. In this case, the user can start to enter information into the input box. It can be learned that the first operation performed by the user on the first interface (or the second interface) may be a tap operation (for example, a single-tap operation) performed by the user on the input box.

Figure 4A:
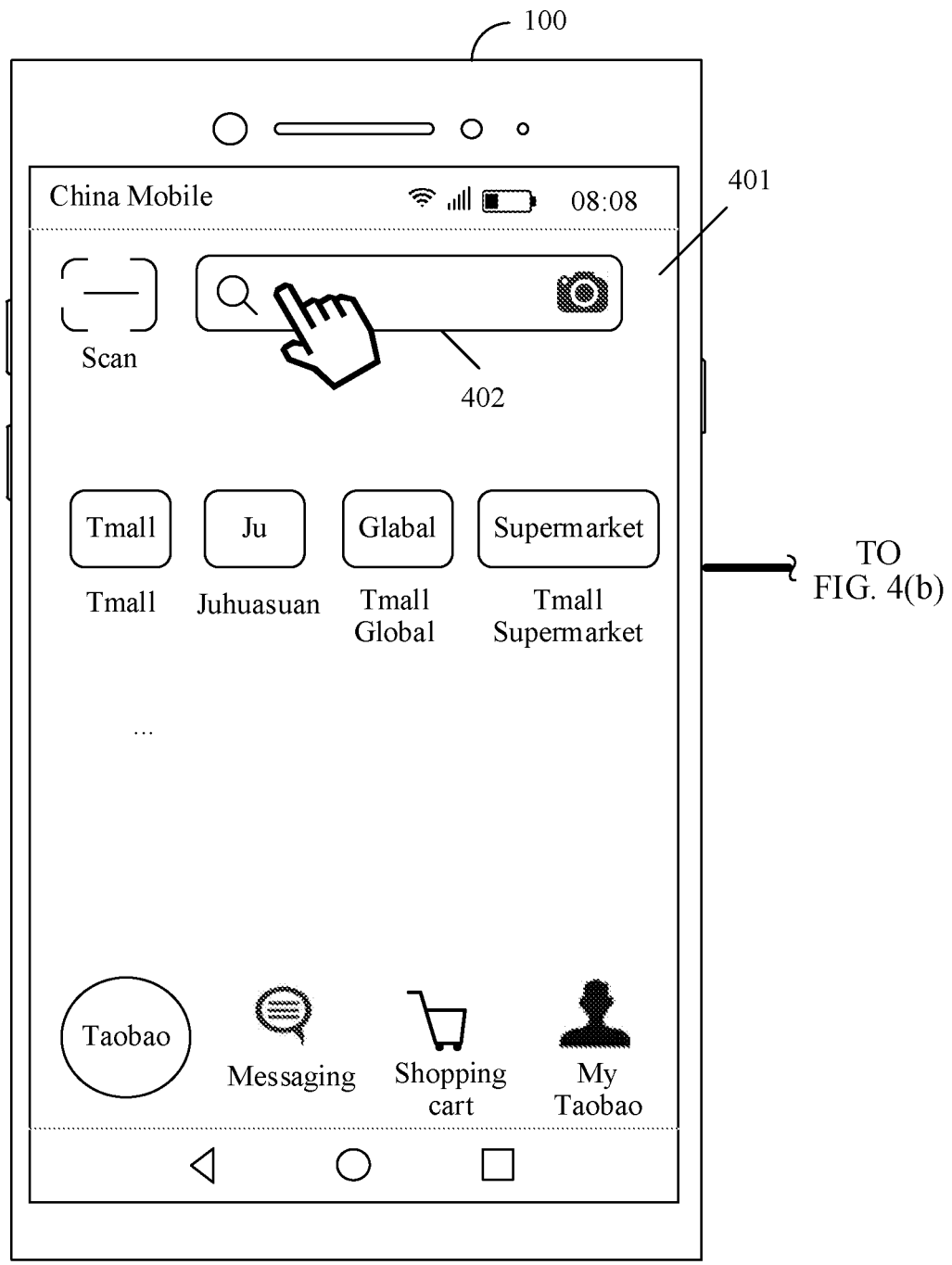
FIG. 4(a) to FIG. 4(c) are schematic diagrams of an example display interface according to an embodiment of this application.

For example, when the first application is "Taobao", the first interface may be a shopping interface 401 of "Taobao" shown in FIG. 4(a), and the shopping interface 401 includes an input box 402. The first operation may be a tap operation performed by the user on the input box 402.

Figure 5:
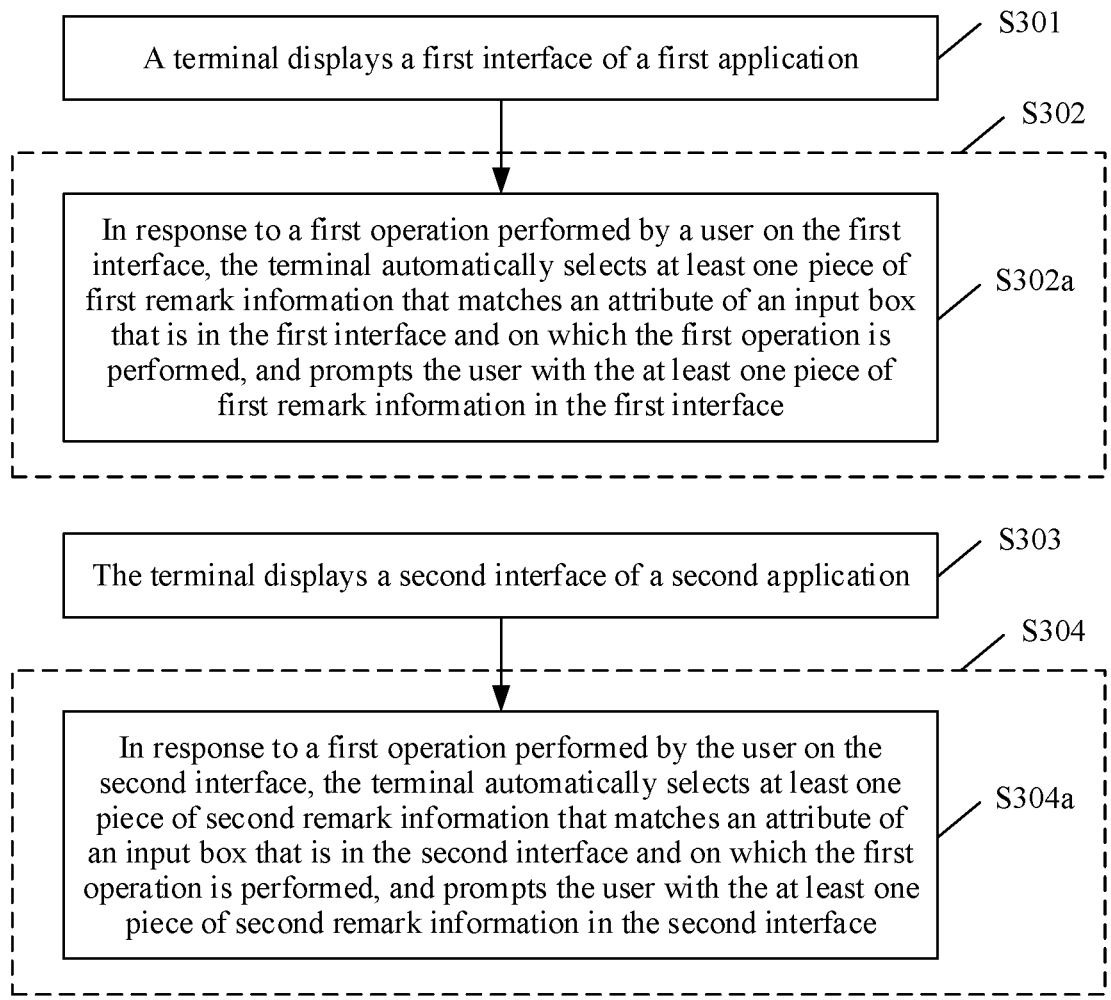
FIG. 5 is a flowchart of an information input method according to an embodiment of this application.

That the attribute of the first application matches the at least one piece of first remark information may be specifically that an attribute of the input box in the first interface of the first application matches the at least one piece of first remark information. Correspondingly, as shown in FIG. 5, S302 shown in FIG. 3 may be replaced with S302a:

S302a. In response to the first operation performed by the user on the first interface, the terminal automatically selects the at least one piece of first remark information that matches the attribute of the input box that is in the first interface and on which the first operation is performed, and prompts the user with the at least one piece of first remark information in the first interface.

For example, the input box 402 shown in FIG. 4(a) is used to enter a to-be-searched-for commodity, and an attribute of the input box 402 may be an attribute of a to-be-purchased commodity. Therefore, the at least one piece of first remark information that matches the attribute of the input box 402 that is in the first interface and on which the first operation is performed includes the remark information 1 "Snail—Jay Chou", the remark information 2 "ABC brand trench coat", and the remark information 5 "Sweeping robot" that are shown in Table 2.

As shown in FIG. 4(a), a mobile phone 100 may receive the tap operation (namely, the first operation) performed by the user on the input box 402, and after automatically finding, in response to the first operation, the at least one piece of first remark information that matches the attribute of the input box that is in the first interface and on which the first operation is performed, the mobile phone 100 prompts (namely, displays) at least one piece of first remark information 403 in the first interface 401. The at least one piece of first remark information 403 includes the remark information 1 "Snail—Jay Chou", the remark information 2 "ABC brand trench coat", and the remark information 5 "Sweeping robot".

Figure 4B:
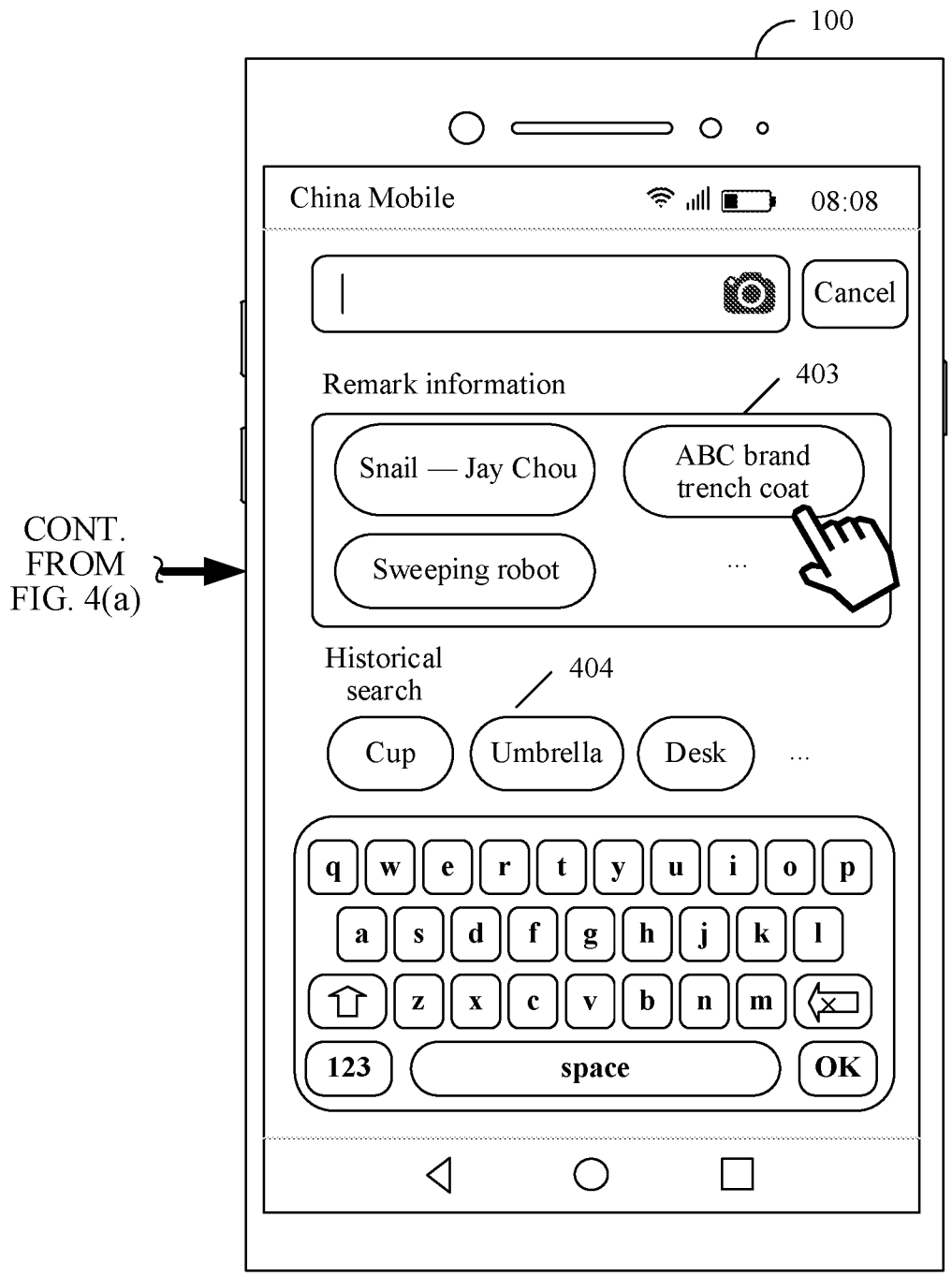
Figure 4C:
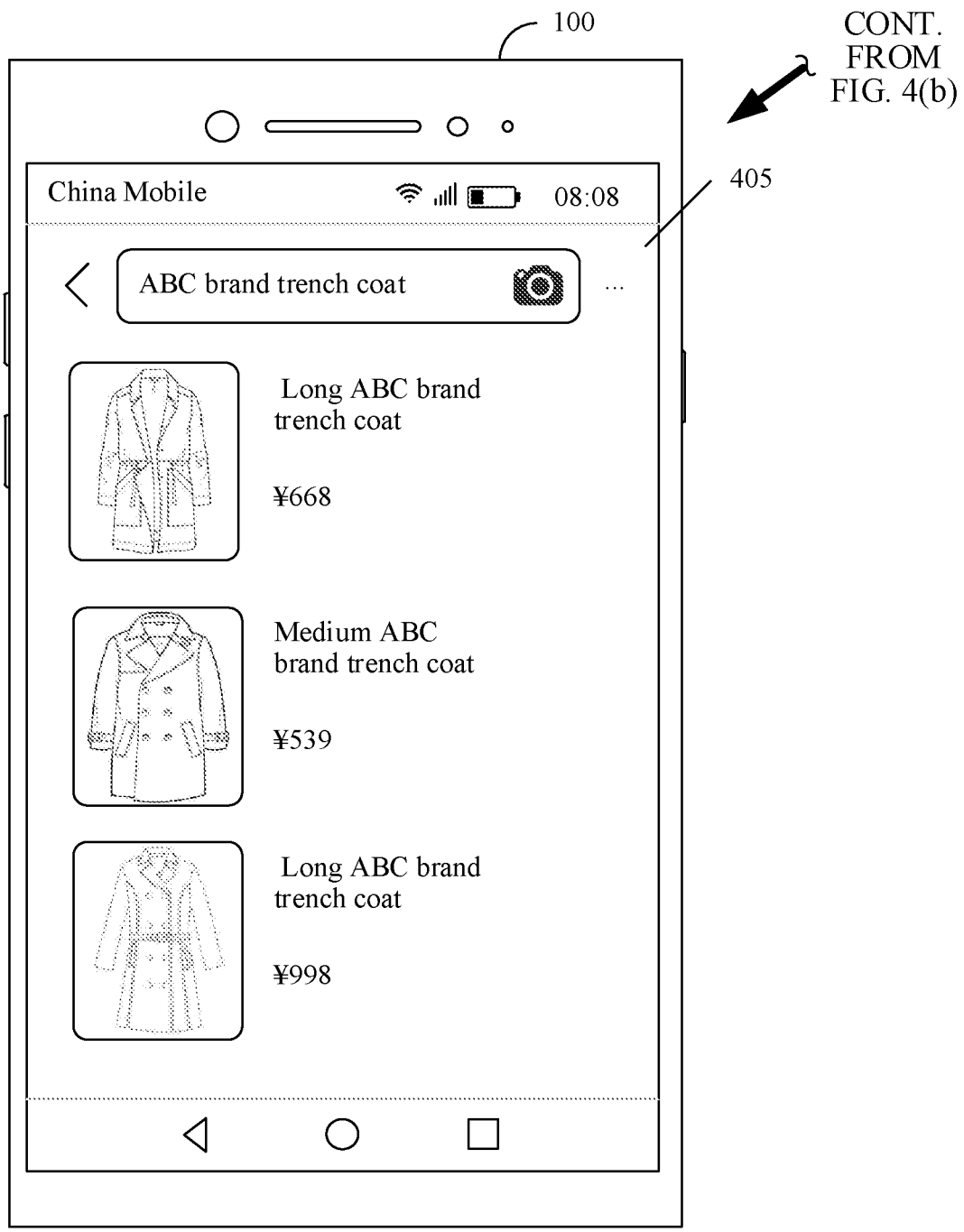

Subsequently, after the user taps any remark information in the first remark information 403, as shown in FIG. 4(b), after the user taps "ABC brand trench coat", the mobile phone 100 may display "ABC brand trench coat" in the input box in response to a selection operation performed by the user on "ABC brand trench coat". As shown in FIG. 4(c), "ABC brand trench coat" is displayed in the input box.

Further, in response to the selection operation performed by the user on "ABC brand trench coat" in the first remark information 403, the mobile phone 100 may search for a commodity related to "ABC brand trench coat", and display information about a found commodity. In other words, an interface 405 shown in FIG. 4(c) is displayed.

It may be understood that a display interface of an application (for example, the first interface of the first application) may include a plurality of input boxes, and different input boxes in a same interface have different attributes.

Figure 6A:
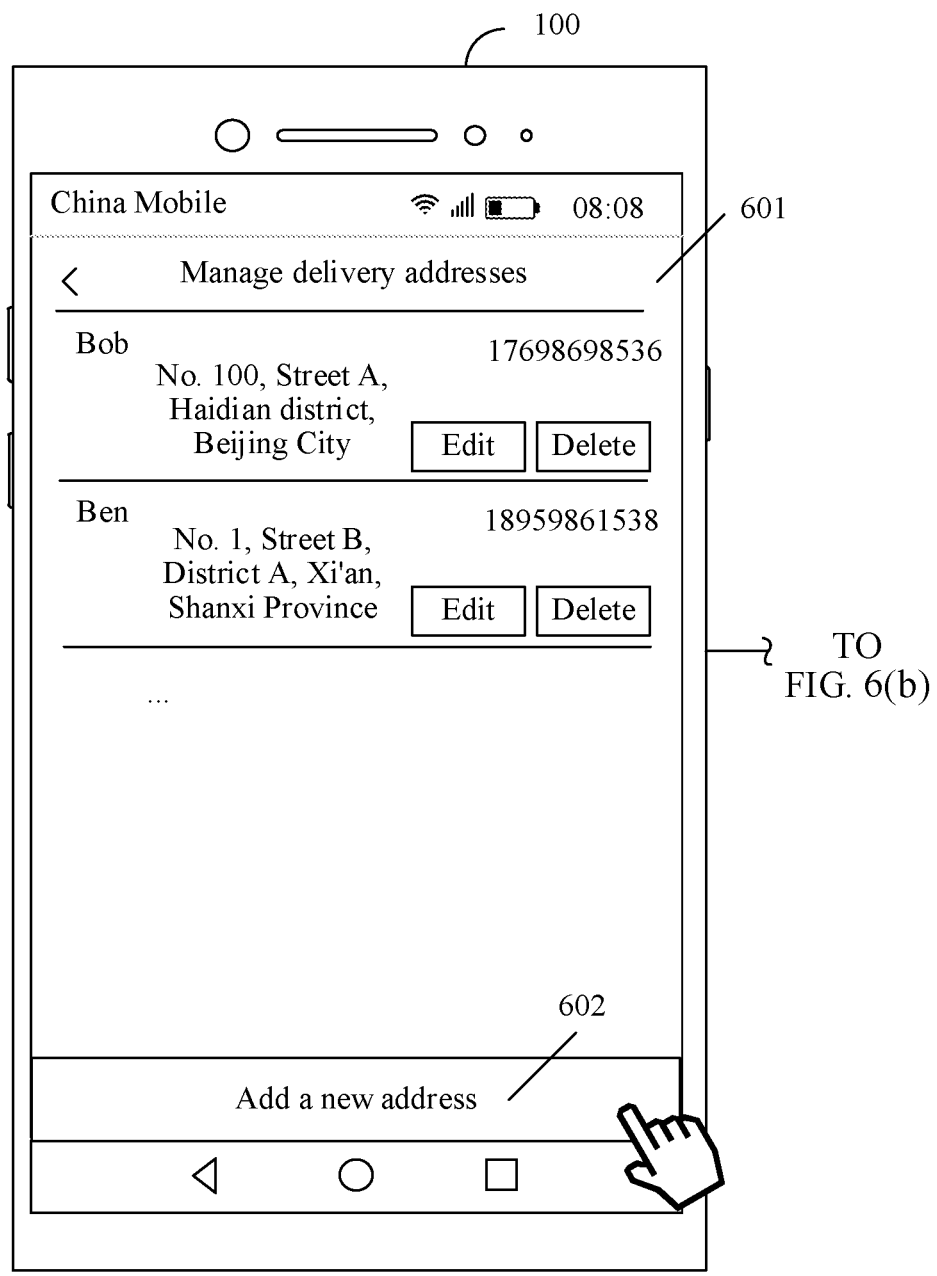
FIG. 6(a) to FIG. 6(d) are schematic diagrams of an example display interface according to an embodiment of this application.
Figure 6B:
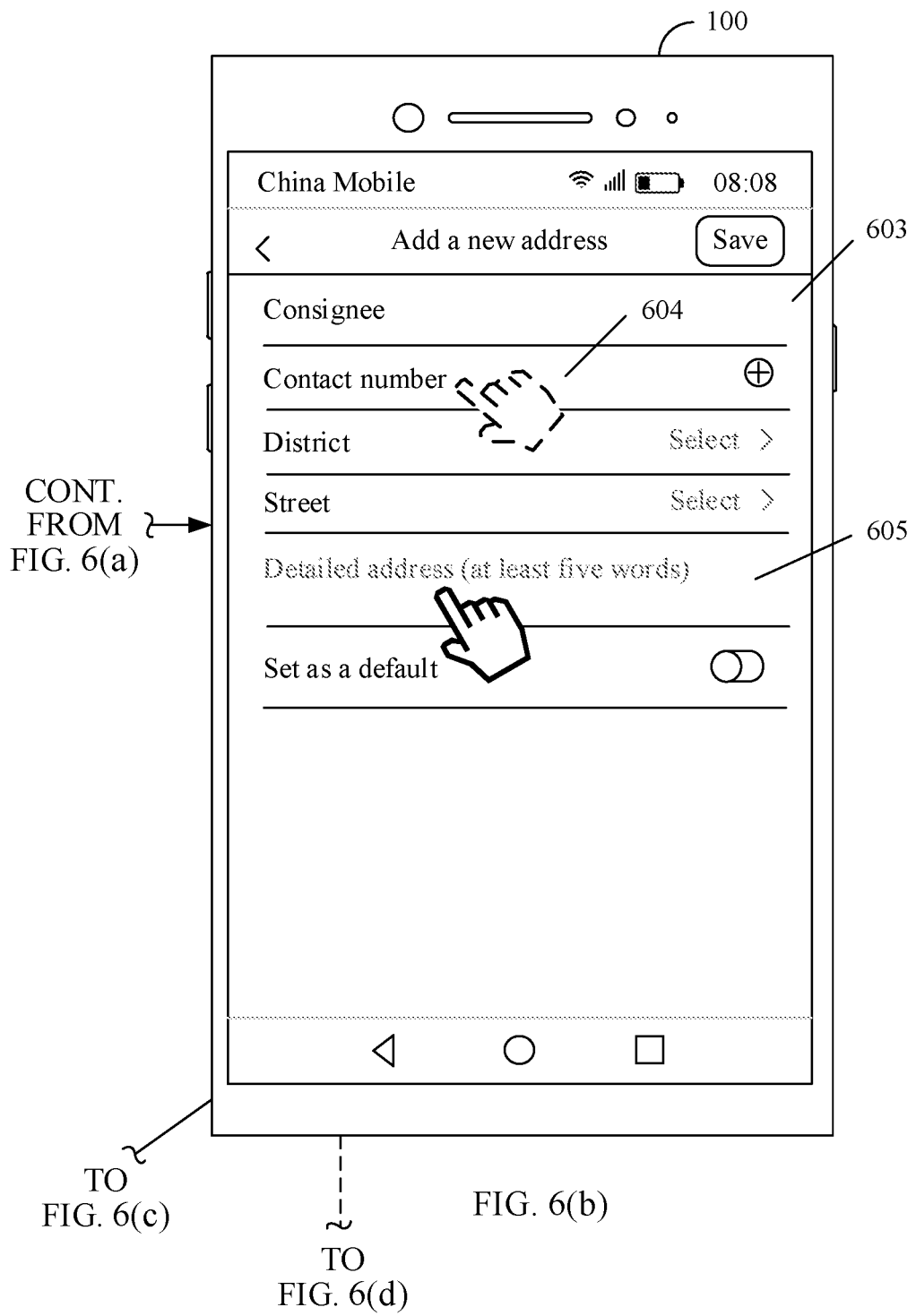

Referring to FIG. 6a to FIG. 6(d), FIG. 6(a) shows an address management interface 601 of "Taobao". The address management interface 601 includes an address that has been set in "Taobao" (for example, delivery information in which a consignee is Bob, a delivery address is No. 100, Street A, Haidian District, Beijing City, and a contact number is 17698698536, and delivery information in which a consignee is Ben, a delivery address is No. 1, Street B, District A, Xi'an City, Shanxi Province, and a contact number is 18959861538), and a button 602 "Add a new address". As shown in FIG. 6(b), the mobile phone 100 may display a new address setting interface 603 in response to a tap operation performed by the user on the button 602 "Add a new address" shown in FIG. 6(a). The new address setting interface 603 includes a plurality of input boxes such as "Consignee", "Contact number" 604, and "Detailed address" 605.

Each input box in the new address setting interface 603 has a different attribute. The input box 604 and the input box 605 that are shown in FIG. 6(b) are used as an example. The input box 604 is configured to enter a phone number of the consignee, and an attribute of the input box 604 may be a phone number attribute. The input box 605 is used to enter a detailed address of the consignee, and an attribute of the input box 605 may be an address attribute.

Figure 6C:
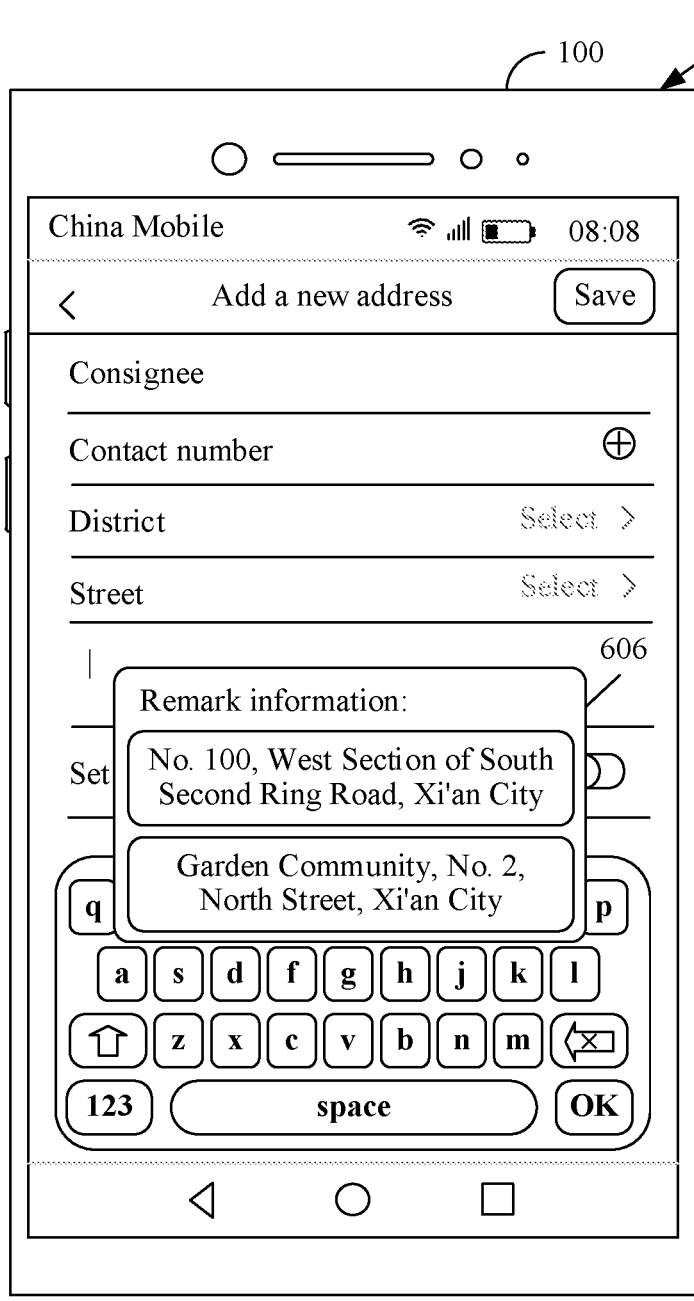
Figure 6D:
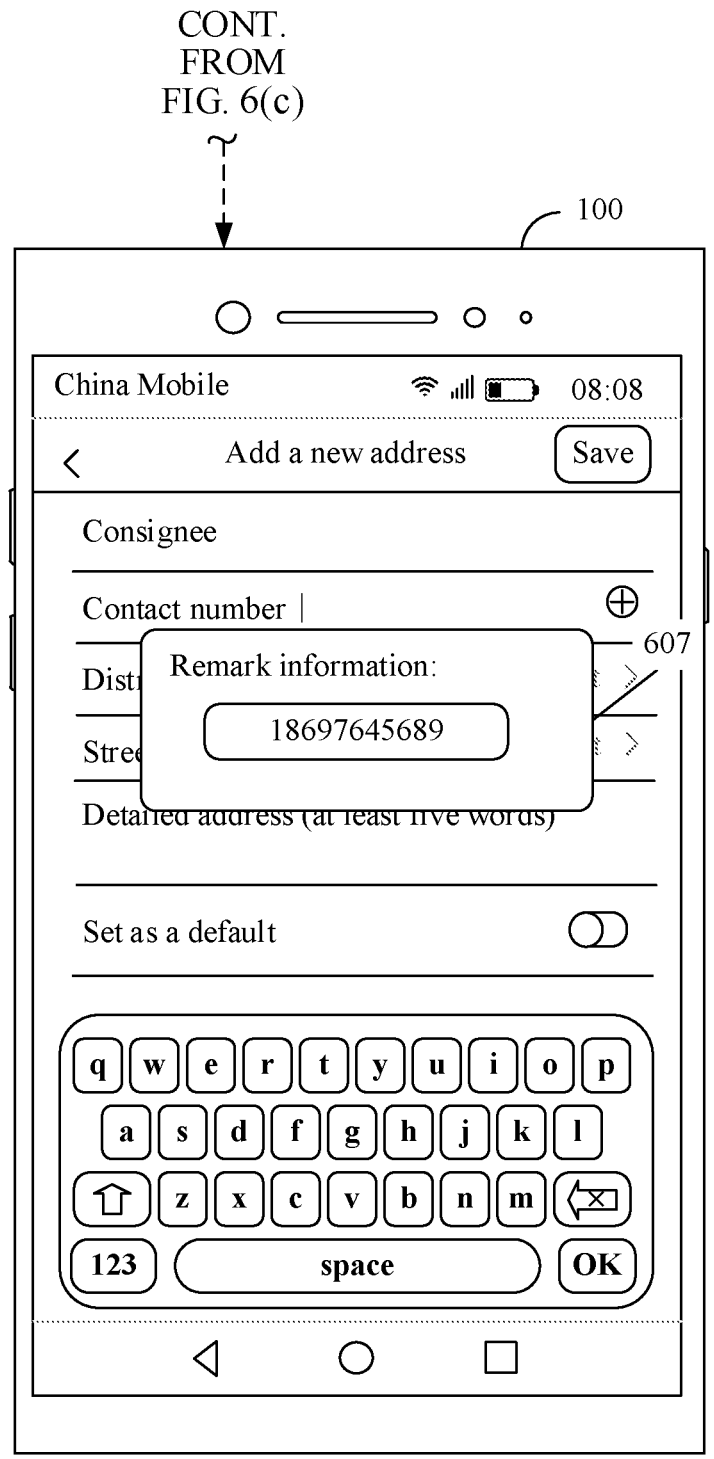

Because different input boxes in the first interface have different attributes, at least one piece of first remark information that is automatically selected by the terminal and that matches the attributes of the different input boxes that are in the first interface and on which the first operation is performed is different. For example, as shown in FIG. 6(c), in response to the first operation (for example, the tap operation) performed by the user on the input box 605 shown in FIG. 6(b), the mobile phone 100 may prompt, in the first interface, the user with at least one piece of first remark information 606 (including the remark information 4 "No. 100, West Section of South Second Ring Road, Xi'an City" and the remark information 8 "Garden Community, No. 2, North Street, Xi'an City" shown in Table 2) that matches the attribute of the input box 605. As shown in FIG. 6(d), in response to the first operation (for example, the tap operation) performed by the user on the input box 604 shown in FIG. 6(b), the mobile phone 100 may prompt, in the first interface, the user with at least one piece of first remark information 607 (including the remark information 6 "18697645689") that matches the attribute of the input box 604. It can be learned, by comparing FIG. 6(d) and FIG. 6(c), that the "at least one piece of first remark information 607 that matches the attribute of the input box 604 that is in the first interface 603 and on which the first operation is performed" is different from the "at least one piece of first remark information 606 that matches the attribute of the input box 605 that is in the first interface 603 and on which the first operation is performed".

S303. The terminal displays a second interface of the second application.

The second application in this embodiment of this application may also be an application program that is in a display interface (namely, the second interface) and that includes an input box. The input box is used by the user to enter information.

It should be noted that the first application and the second application in this embodiment of this application are different. For example, the first application may be "Taobao", and the first interface may be the shopping interface 401 of "Taobao" shown in FIG. 4(a); the second application may be "QQ Music", and the second interface may be a music search interface 701 shown in FIG. 4(a). Alternatively, the first application may be "Baidu Maps", and the first interface may be an address search interface 801 shown FIG. 8(a); the second application may be "Email box", and the second interface may be a new mail interface 901 shown in FIG. 9(a).

S304. In response to a first operation performed by the user on the second interface, the terminal automatically selects at least one piece of second remark information that matches an attribute of the second application, and prompts the user with the at least one piece of second remark information in the second interface.

The second remark information may be information that is stored in the nonvolatile storage medium when the user uses a fourth application.

It should be noted that, for a specific manner in which the terminal stores the remark information in the nonvolatile storage medium when the user uses the fourth application, refer to the manner in which the terminal stores the remark information in the nonvolatile storage medium when the user uses the third application. Details are not described herein again in this embodiment of this application. In addition, for the attribute of the application (for example, the attribute of the second application), and a matching relationship between remark information and an attribute of an application in this embodiment of this application, refer to detailed descriptions in the foregoing embodiment. Details are not described herein in this embodiment of this application.

The first operation performed by the user on the second interface may be a tap operation performed by the user on an input box in the second interface. For example, when the second application is "QQ Music", the second interface may be the music search interface 701 of "QQ Music" shown in FIG. 7(a), and the music search interface 701 includes an input box 702. The first operation may be a tap operation performed by the user on the input box 702.

That the attribute of the second application matches the at least one piece of second remark information may be specifically that an attribute of the input box in the second interface of the second application matches the at least one piece of second remark information. Correspondingly, as shown in FIG. 5, S304 shown in FIG. 3 may be replaced with S304a:

S304a. In response to the first operation performed by the user on the second interface, the terminal automatically selects the at least one piece of second remark information that matches the attribute of the input box that is in the second interface and on which the first operation is performed, and prompts the user with the at least one piece of second remark information in the second interface.

Figure 7A:
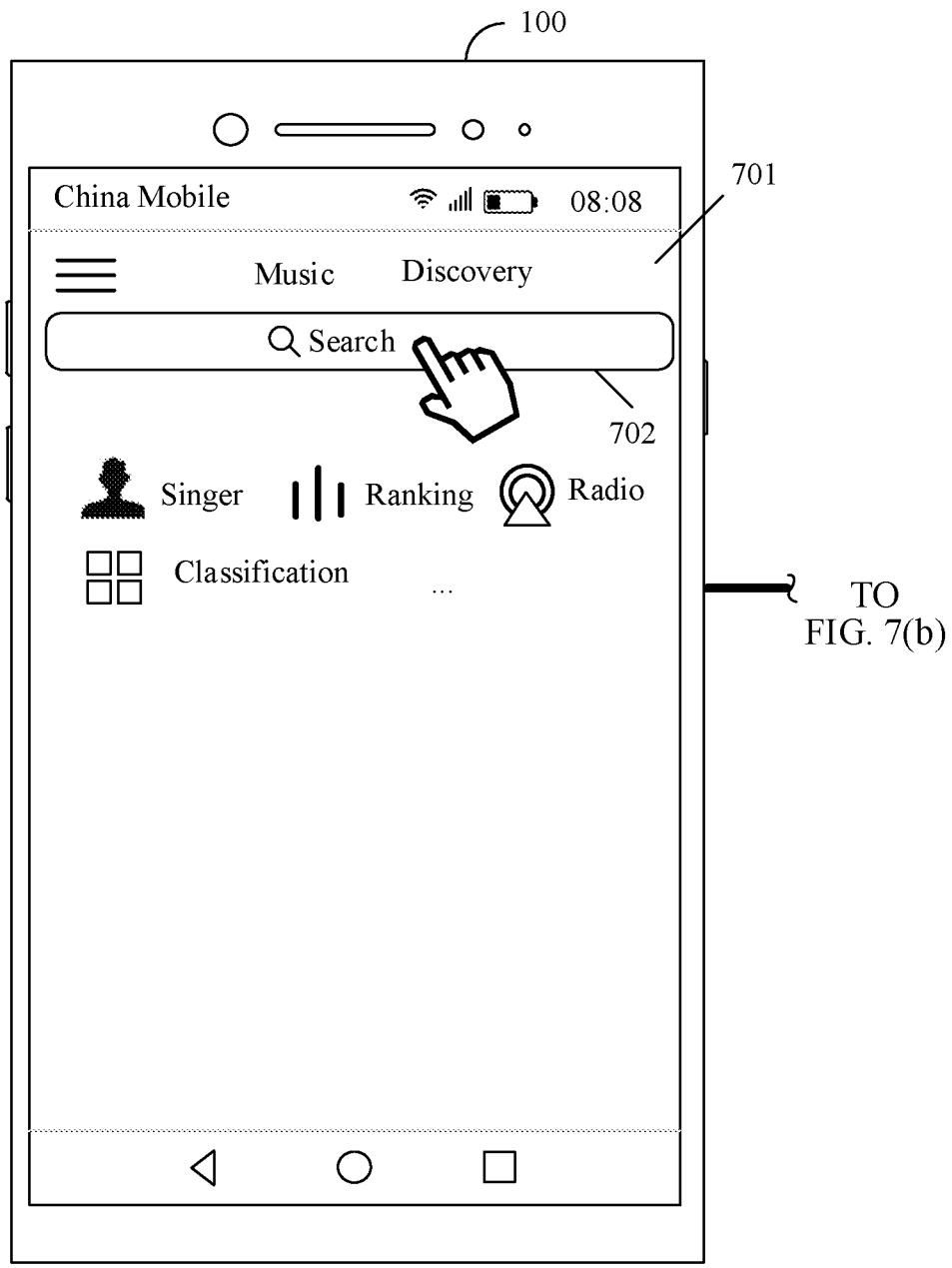
FIG. 7(a) to FIG. 7(c) are schematic diagram of an example display interface according to an embodiment of this application.

For example, the input box 702 shown in FIG. 7(a) is used to enter information about a to-be-searched-for song (for example, a name of the song, a name of a singer, or a name of an album), and an attribute of the input box 702 may be a song. Therefore, the at least one piece of second remark information that matches the attribute of the input box 702 that is in the second interface and on which the first operation is performed includes the remark information 1 "Snail—Jay Chou" that is shown in Table 2.

Figure 7B:
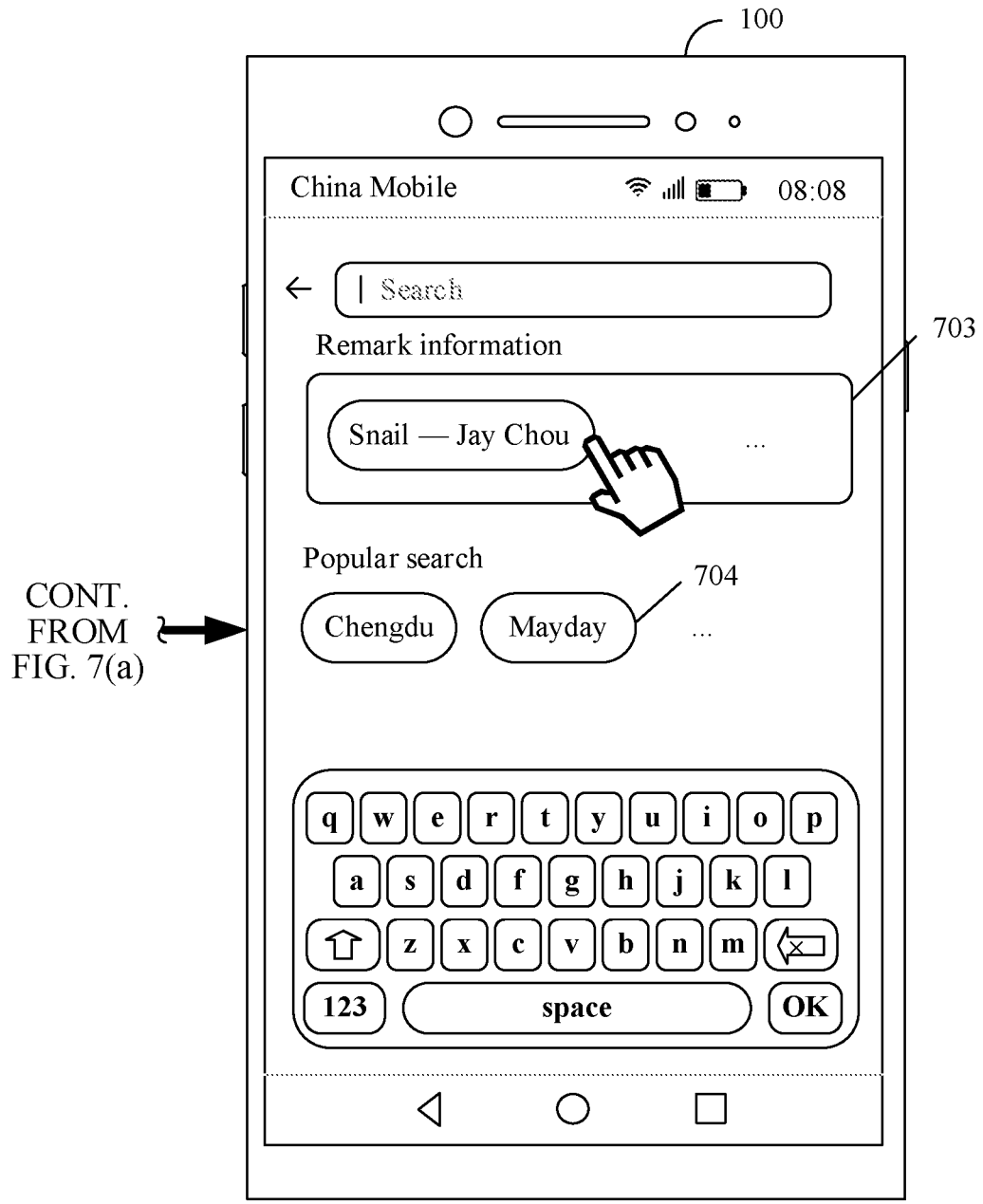

As shown in FIG. 7(b), the mobile phone 100 receives the tap operation (namely, the first operation) performed by the user on the input box 702 shown in FIG. 7(a), and after automatically finding, in response to the first operation, the at least one piece of second remark information that matches the attribute of the input box that is in the second interface and on which the first operation is performed, the mobile phone 100 prompts (namely, displays) at least one piece of second remark information 703 in the second interface. The at least one piece of second remark information 703 includes the remark information 1 "Snail—Jay Chou".

Figure 7C:
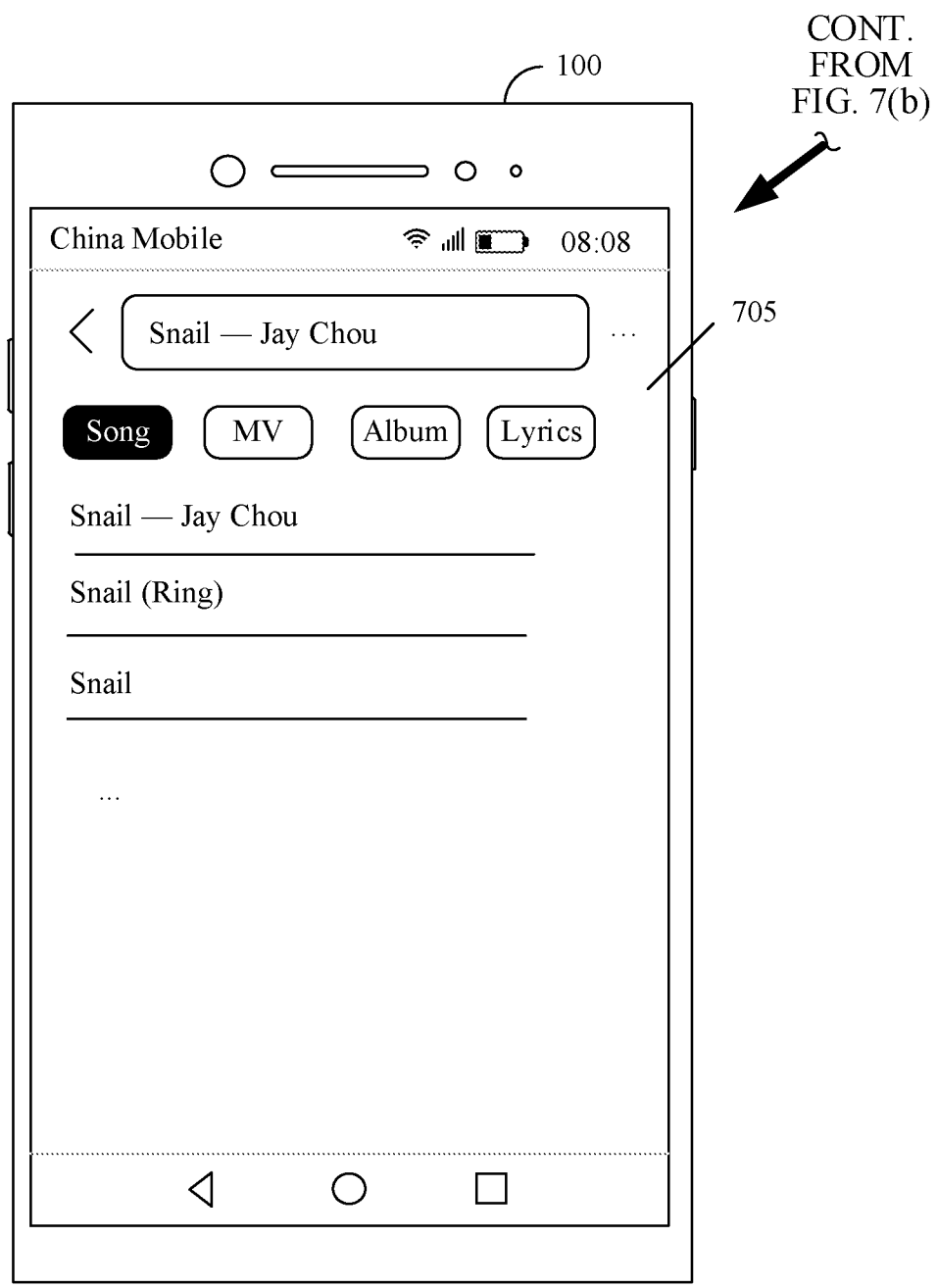

Subsequently, after the user taps any remark information in the at least one piece of second remark information 703, as shown in FIG. 7(b), after the user taps "Snail—Jay Chou", the mobile phone 100 may display "Snail—Jay Chou" in the input box in response to a selection operation performed by the user on "Snail—Jay Chou". As shown in FIG. 7(c), "Snail—Jay Chou" is displayed in the input box.

Further, in response to the selection operation performed by the user on "Snail—Jay Chou" in the second remark information 703, the mobile phone 100 may search for audio information related to "Snail—Jay Chou", and display the found audio information. In other words, an interface 705 shown in FIG. 7(c) is displayed.

It should be noted that a display interface (for example, the second interface) of the second application may also include a plurality of input boxes, and different input boxes in a same interface have different attributes.

In this embodiment of this application, the following scenario (1) and the following scenario (2) are used to describe, by using specific examples, the information input method provided in this embodiment of this application.

Scenario (1)

For example, the terminal is the mobile phone 100 shown in FIG. 1. It is assumed that the first application is a shopping-type application "Taobao", and the second application is "QQ music"; the nonvolatile storage medium of the mobile phone 100 stores the plurality of pieces of remark information shown in Table 1.

With reference to the descriptions in the foregoing embodiment, it can be learned, from the example shown in the scenario (1), that because "Taobao" (namely, the first application) and "QQ music" (namely, the second application) are different, the at least one piece of first remark information 403 shown in FIG. 4(b) is different from the at least one piece of second remark information 703 shown in FIG. 7(b), and the first remark information 403 (for example, "ABC brand trench coat" and "Sweeping robot") that matches the attribute of "Taobao" (namely, the first application) is not displayed in the display interface shown in FIG. 7(b).

Scenario (2)

For example, the terminal is the mobile phone 100 shown in FIG. 2. It is assumed that the first application is a navigation-type application "Baidu Maps", and the second application is "Email box" (for example, Outlook mailbox, 163 mailbox, and Foxmail mailbox); the nonvolatile storage medium of the mobile phone 100 stores the plurality of pieces of remark information shown in Table 1.

A case in which the first application is "Baidu Maps" is as follows.

Figure 8A:
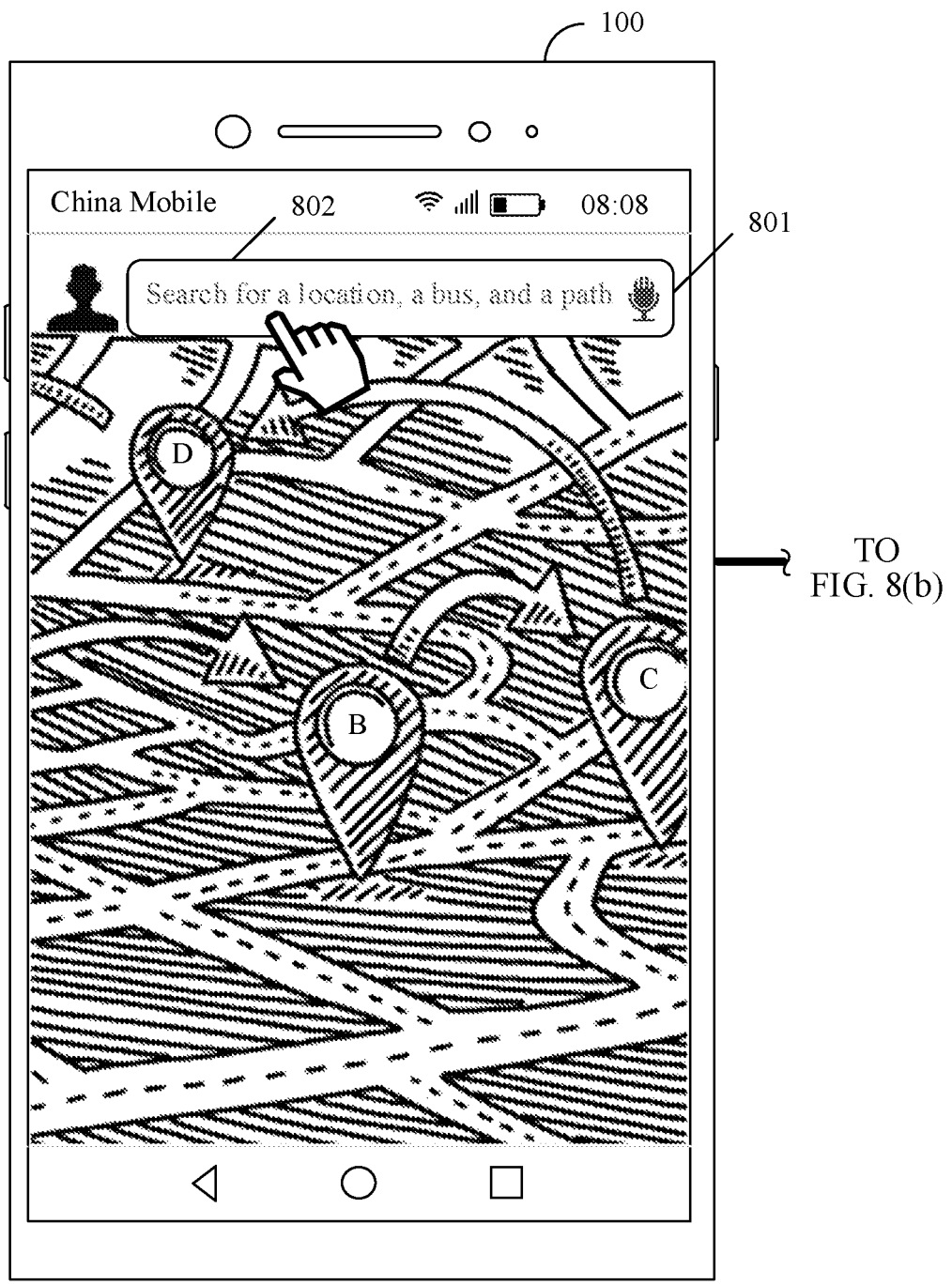
FIG. 8(a) and FIG. 8(b) are schematic diagrams of an example display interface according to an embodiment of this application.

The first application may be a "map" application (for example, Baidu Maps), the first interface may be the address search interface 801 shown in FIG. 8(a), the address search interface 801 includes an input box 802, the input box 802 is used to enter address information, and an attribute of the input box 802 may be an address attribute.

As shown in FIG. 8(a), the mobile phone 100 may receive a first operation (for example, a tap operation) performed by the user on the input box 802, and in response to the first operation, automatically select at least one piece of first remark information that matches the attribute of the input box that is in the first interface and on which the first operation is performed, for example, "No. 100, West Section of South Second Ring Road, Xi'an City", "Garden Community, No. 2, North Street, Xi'an City", and "Xi'an—Giant Wild Goose Pagoda, Terracotta Warrior, Huaqing Pool, . . . ", and display the at least one piece of first remark information 803 shown in FIG. 8(b) (in other words, S302 is performed).

Further, for a specific manner in which the mobile phone 100 displays selected remark information in the input box in response to a selection operation (namely, the second operation) performed by the user on "No. 100, West Section of South Second Ring Road, Xi'an City", "Garden Community, No. 2, North Street, Xi'an City", and "Xi'an—Giant Wild Goose Pagoda, Terracotta Warrior, Huaqing Pool, . . . ", refer to related descriptions in the scenario (1). Details are not described herein again in this embodiment of this application.

A case in which the second application is "Email box" is as follows.

Figure 9A:
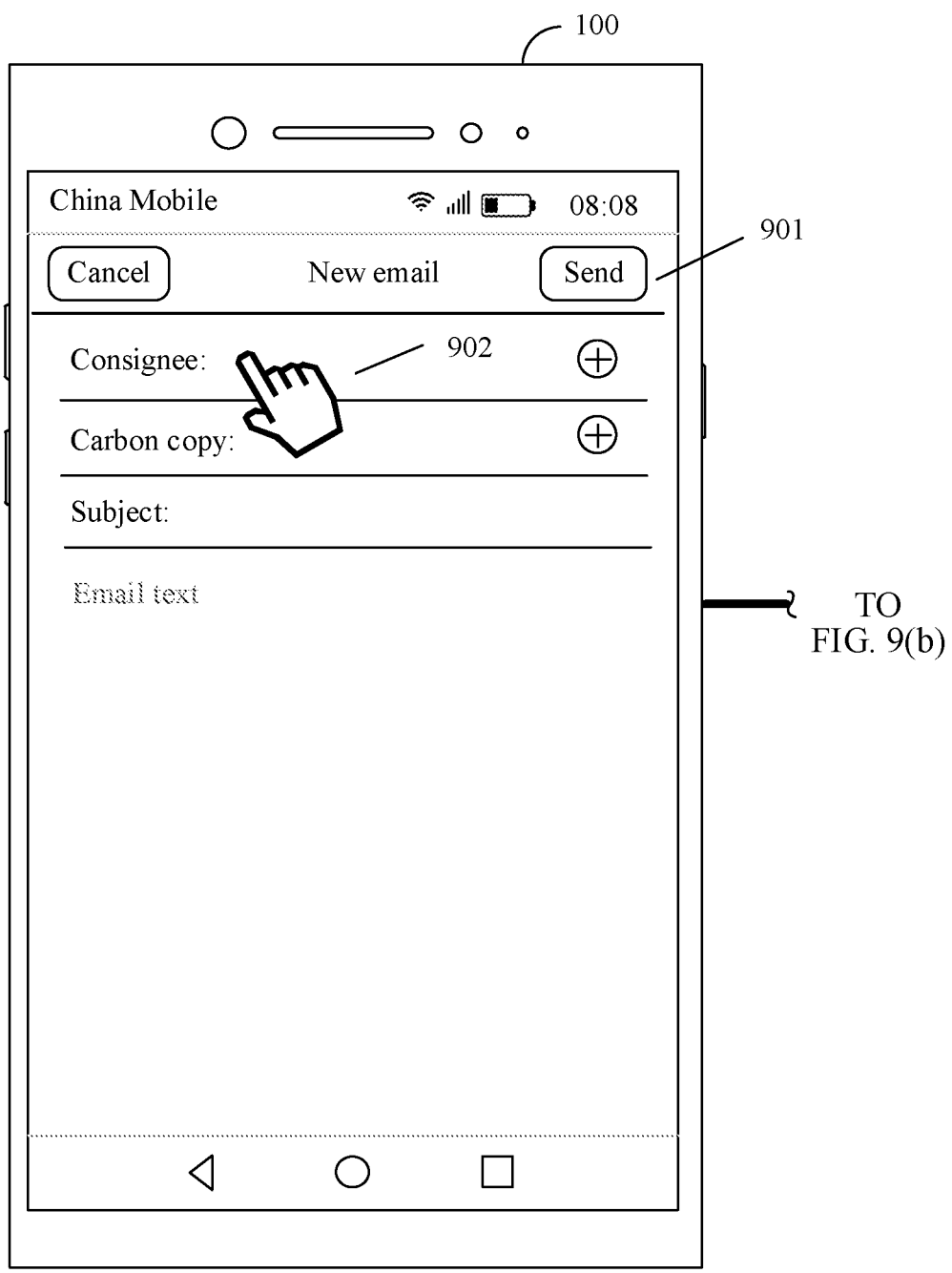
FIG. 9(a) to FIG. 9(c) are schematic diagrams of an example display interface according to an embodiment of this application.

The second interface may be the new mail interface 901 shown in FIG. 9(a), and the new mail interface 901 includes an input box 902. The input box 902 is configured to enter an email address to which the user wants to send an email, so that the mobile phone 100 may send the email based on the email address entered by the user into the input box 902.

Figure 9B:
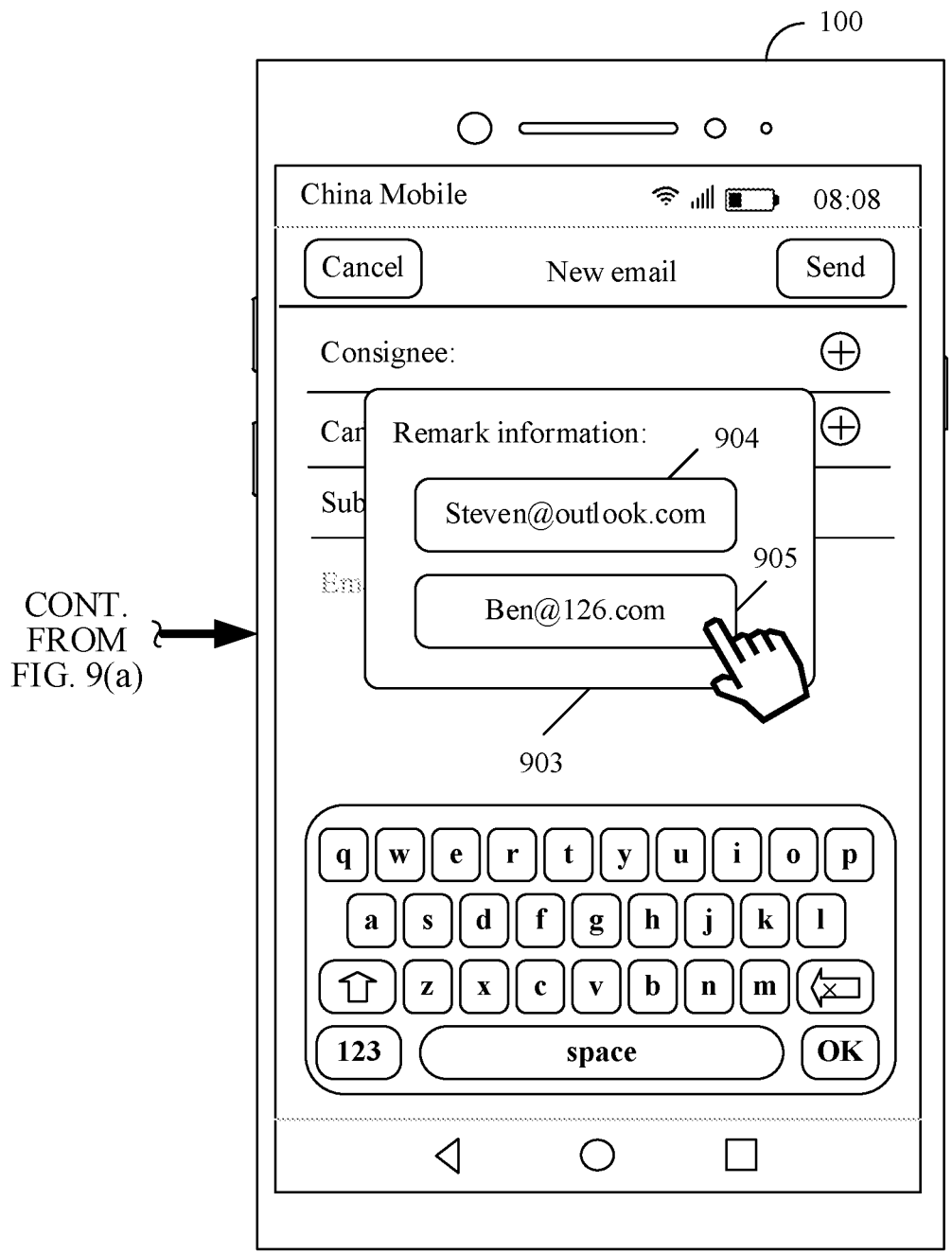

As shown in FIG. 9(a), the mobile phone 100 may receive a tap operation (namely, a first operation) performed by the user on the input box 902, and in response to the first operation, display second remark information 903 shown in FIG. 9(b) (in other words, S304 is performed). As shown in Table 1, remark information corresponding to the email box includes "Steven@outlook.com" and "Ben@126.com". Therefore, as shown in FIG. 9(b), the second remark information 903 includes Steven@outlook.com 904 and Ben@126.com 905.

Figure 9C:
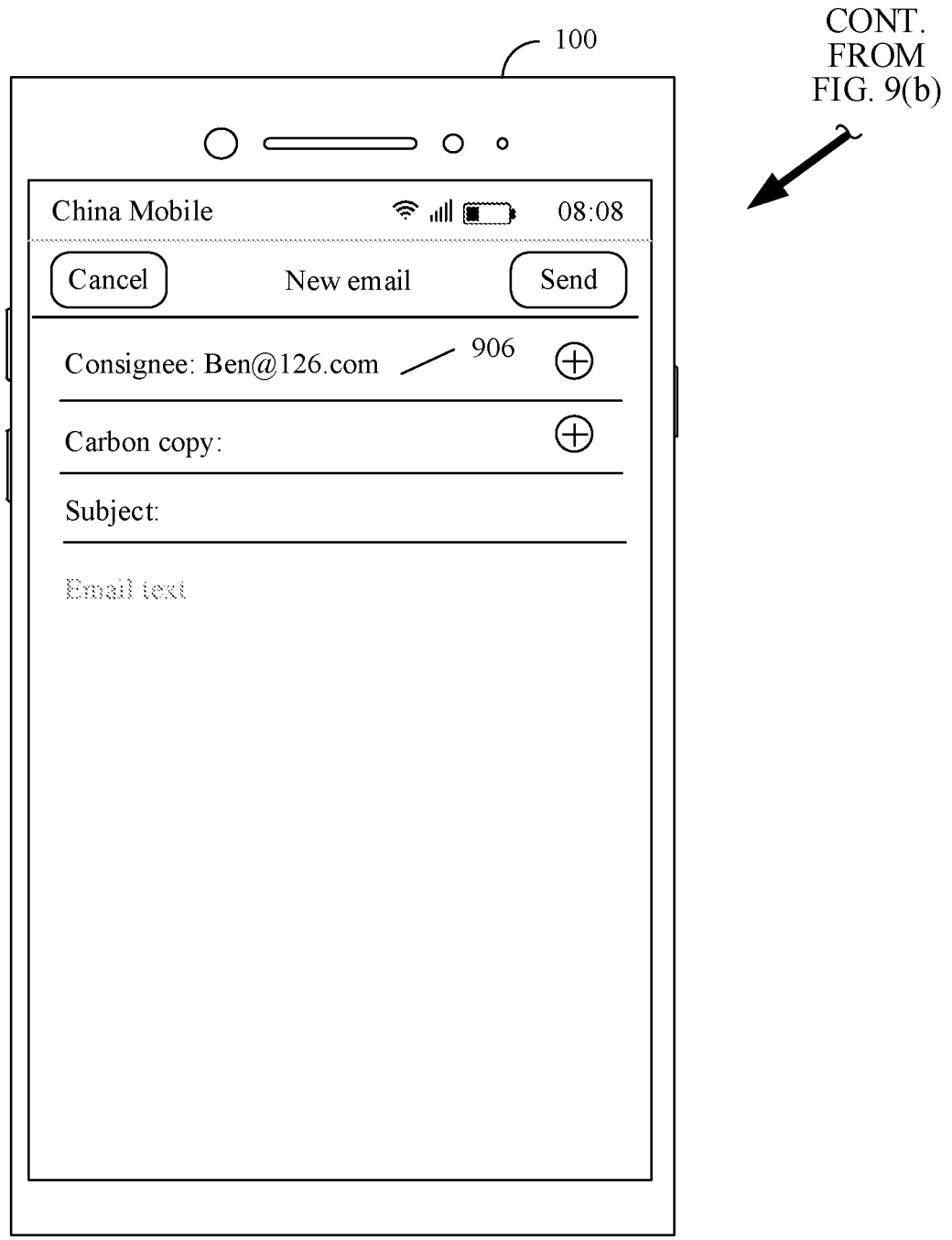

Subsequently, after the user taps any remark information in the second remark information 903, as shown in FIG. 9(b), after the user taps "Ben@126.com", the mobile phone 100 may display "Ben@126.com" in the input box in response to a selection operation performed by the user on "Ben@126.com". As shown in FIG. 9(c), "Ben@126.com" is displayed in an input box 906.

Figure 10A:
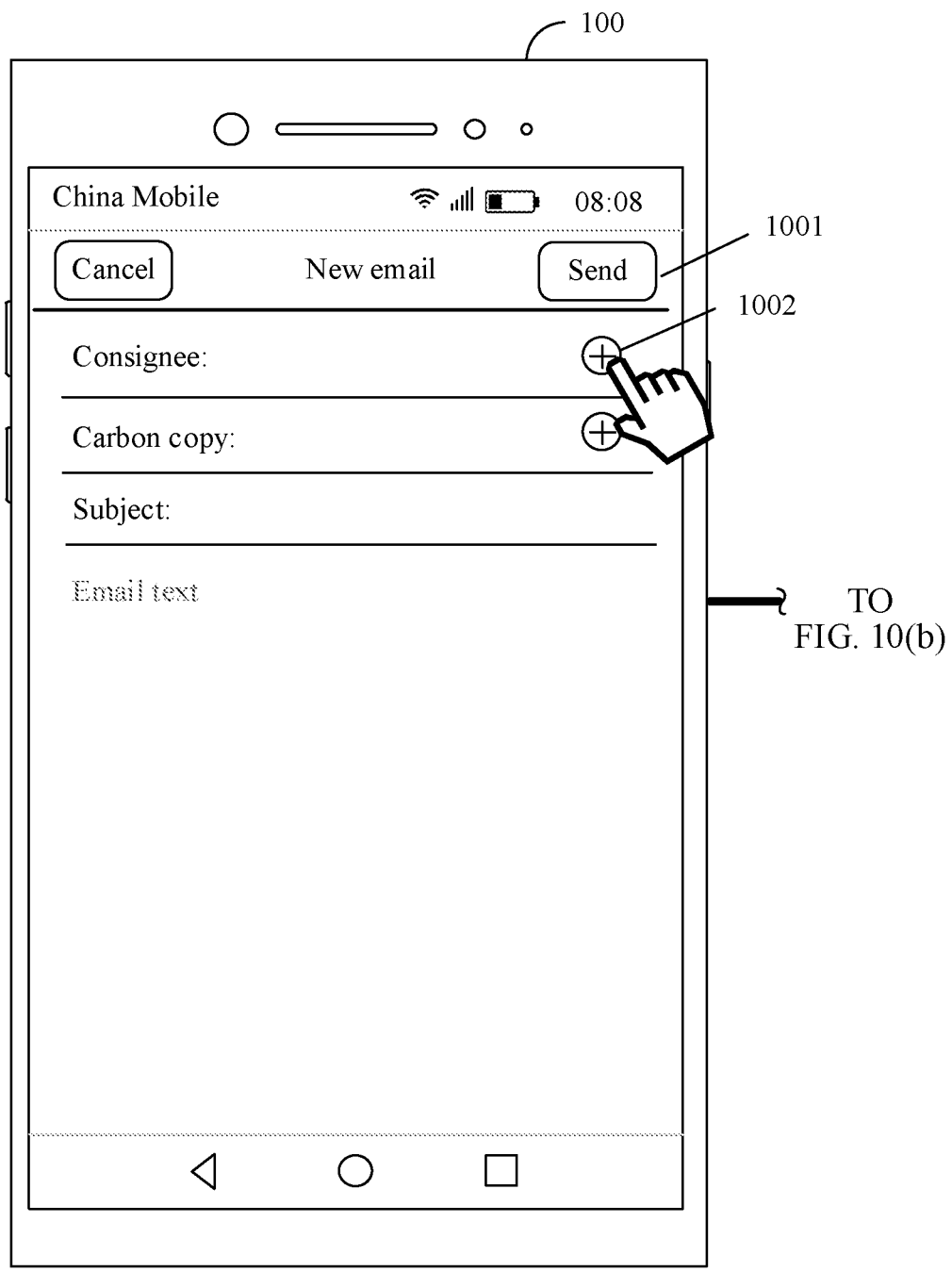
FIG. 10(a) and FIG. 10(b) are schematic diagrams of an example display interface according to an embodiment of this application.
Figure 10B:
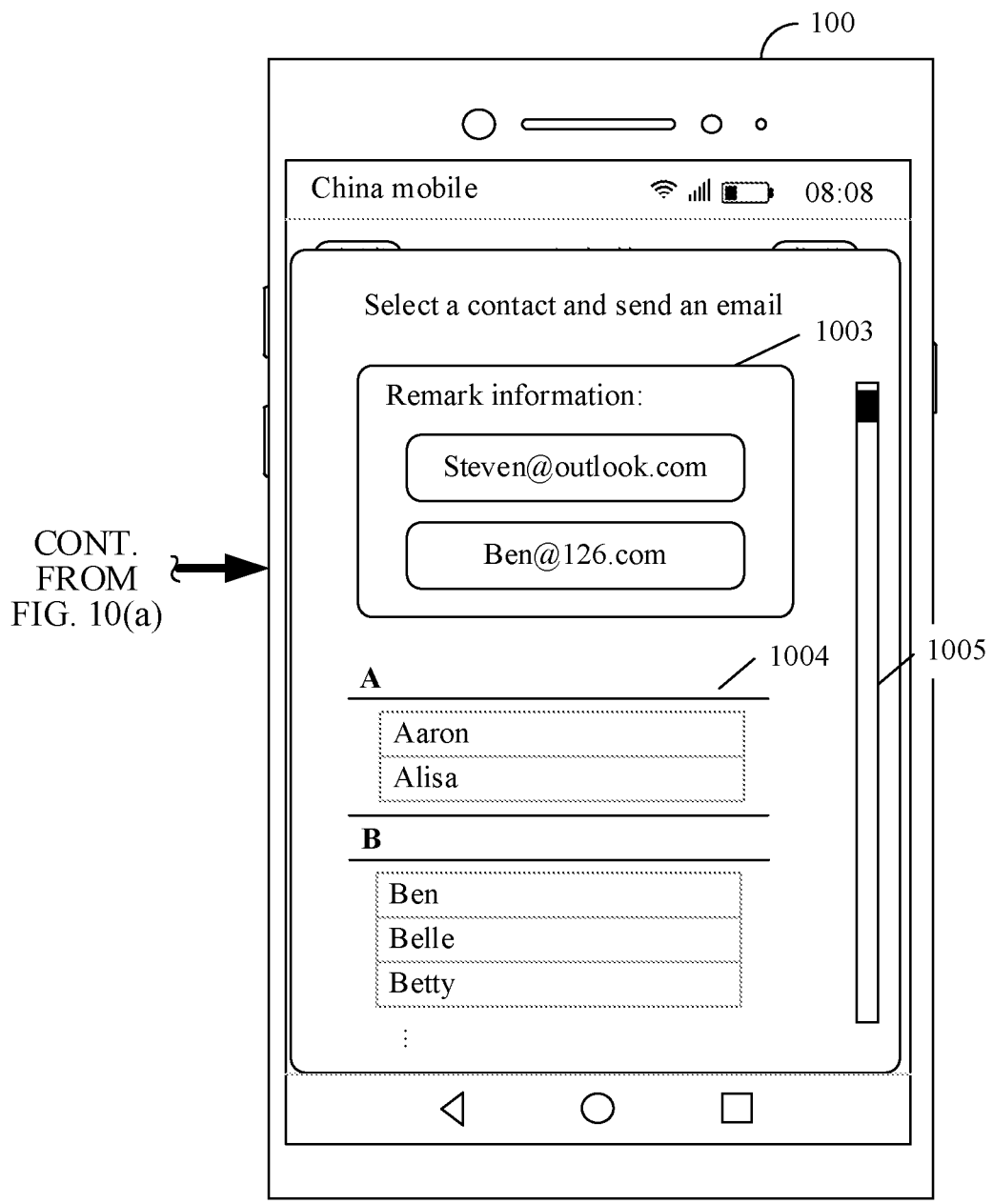

Optionally, the foregoing input box may alternatively be an input box 1002 in a new mail interface 1001 (namely, the second interface) shown in FIG. 10(a). The first operation may be a tap operation performed by the user on the input box 1002. After the user taps the input box 1002 shown in FIG. 10(a), the mobile phone 100 may display second remark information 1003, a contact list 1004, and a scrollbar 1005 that are shown in FIG. 10(b), and the second remark information 1003 includes "Steven@outlook.com" and "Ben@126.com". The contact list 1004 is used to provide a to-be-selected contact and a mailbox address of the to-be-selected contact.

Figure 8B:
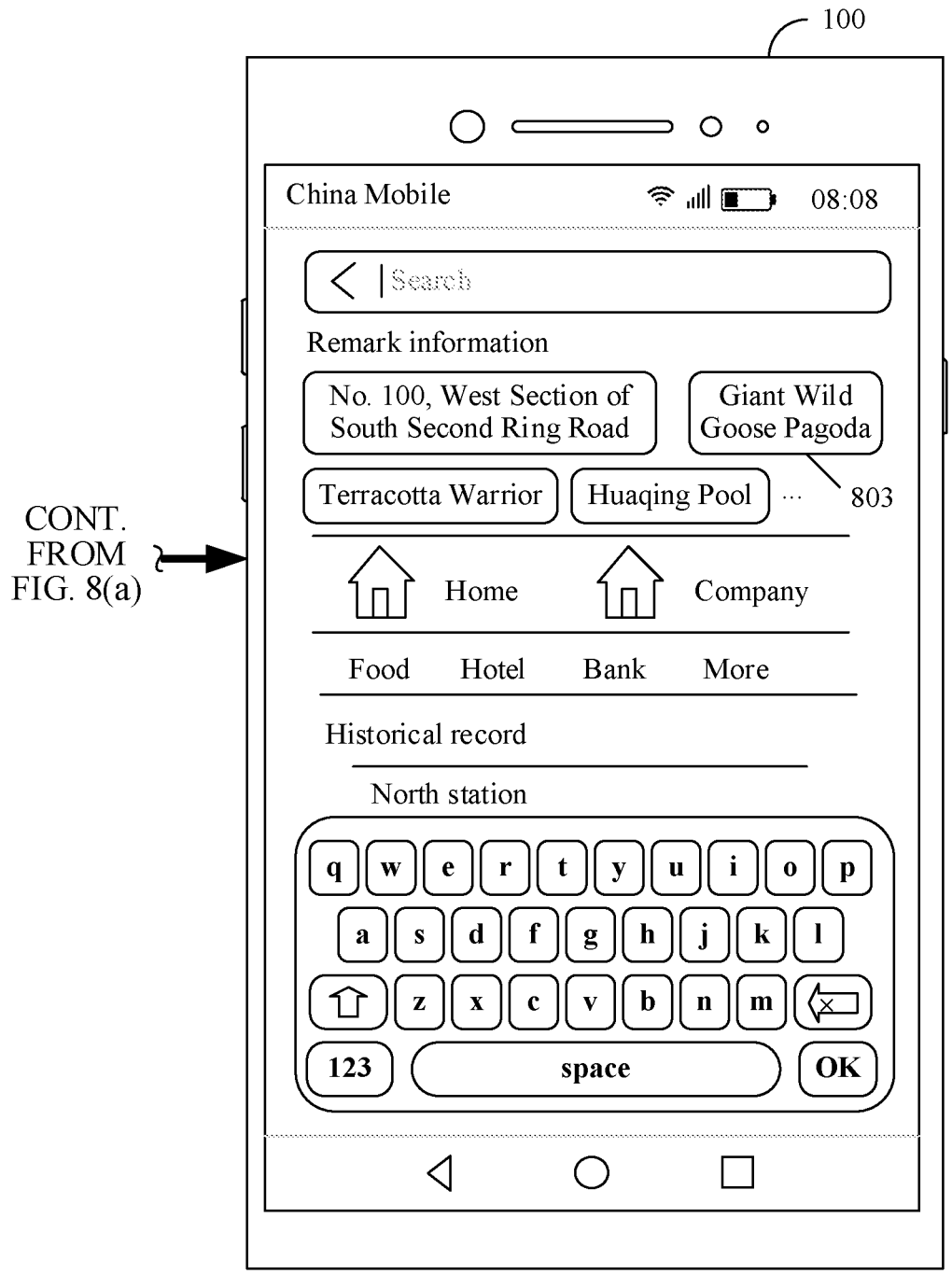

It can be learned, from the example shown in scenario (2), that because "Baidu Maps" (namely, the first application) and "Email box" (namely, the second application) are different, the at least one piece of first remark information 803 shown in FIG. 8(b) is different from the at least one piece of second remark information 903 shown in FIG. 9(b). A display interface shown in FIG. 9(b) does not display at least one piece of first remark information 803 (for example, "No. 100, West Section of South Second Ring Road", "Giant Wild Goose Pagoda", "Terracotta Warrior", and "Huaqing Pool") that matches the attribute of "Baidu Maps" (namely, the first application). A display interface shown in FIG. 8(b) does not display at least one piece of second remark information 903 (for example, "Steven@outlook.com" and "Ben@126.com") that matches the attribute of "Email box" (namely, the second application).

It should be noted that a sequence of performing S301-S302 and S303-S304 is not limited in this embodiment of this application. That the method provided in this embodiment of this application includes S301-S302 and S303-S304 means that the terminal has a function of performing S301-S302 and S303-S304. However, the terminal does not need to perform both S301-S302 and S303-S304.

For example, when the terminal displays the first interface of the first application, the terminal may perform S302 in response to the first operation performed by the user on the first interface. After the terminal performs S301-S302, if the user does not control the terminal to display the second interface, and the terminal does not need to perform S303-S304. However, when the terminal displays the second interface of the second application, the terminal may perform S304 in response to the first operation performed by the user on the second interface.

According to the information input method provided in this embodiment of this application, in response to the first operation performed by the user on the first interface of the first application, the terminal may automatically select the at least one piece of first remark information that matches the attribute of the first application, and prompt the user with the at least one piece of first remark information; in response to the first operation performed by the user on the second interface of the second application, the terminal may automatically select the at least one piece of second remark information that matches the attribute of the second application, and prompt the user with the at least one piece of second remark information. The first remark information and the second remark information are information that respectively matches the attribute of the first application and the attribute of the second application. Therefore, it is very likely that the first remark information includes information that the user wants to enter into the first interface, and it is very likely that the second remark information includes information that the user wants to enter into the second interface. In addition, the first remark information and the second remark information are stored in the nonvolatile storage medium of the terminal. Therefore, in response to the first operation, the terminal may directly select, from the nonvolatile storage medium of the terminal, remark information that matches an attribute of an application, and enter the selected remark information, and does not need to enter the remark information word by word. This can improve information input efficiency.

Figure 11:
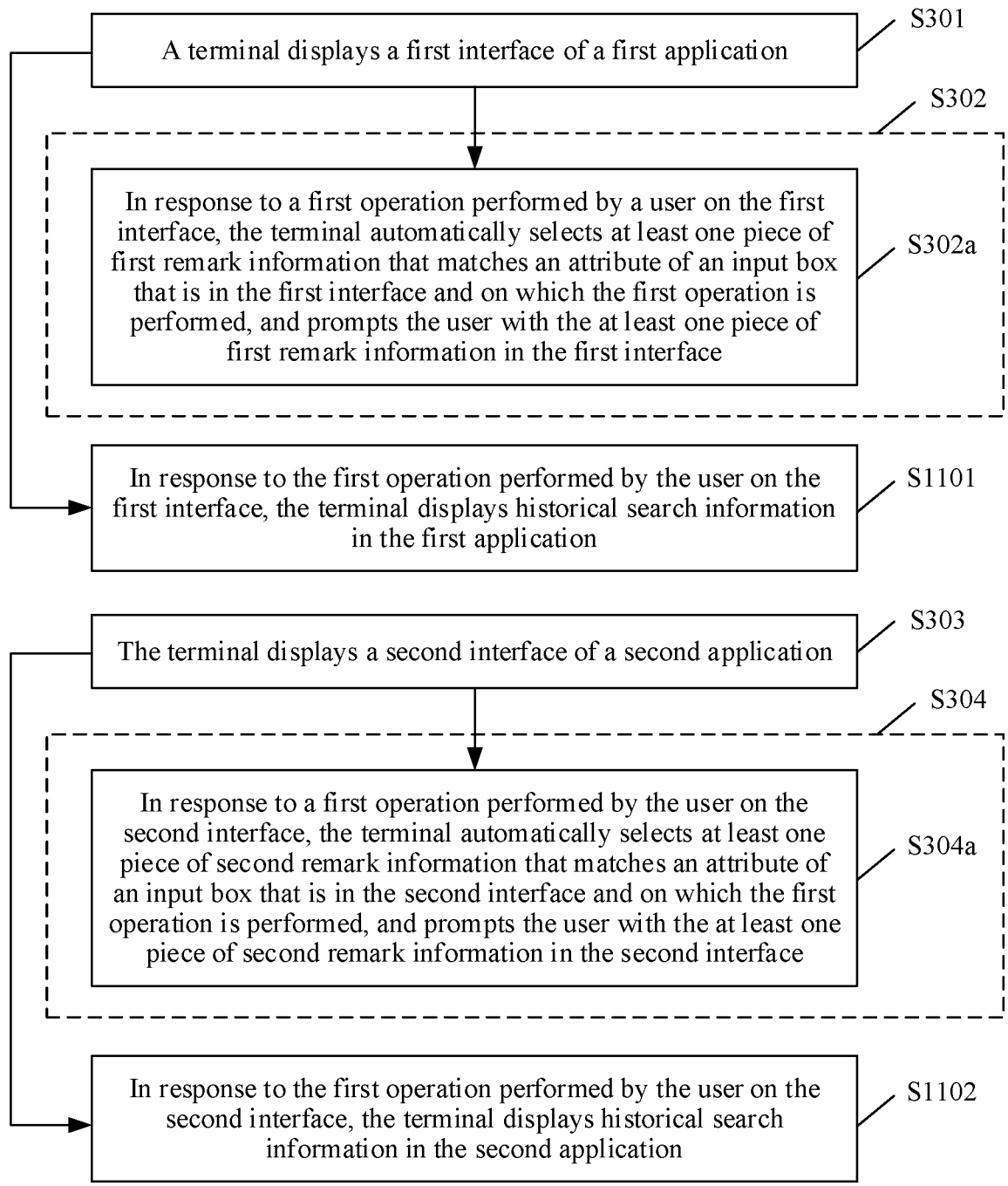
FIG. 11 is a flowchart 3 of an information input method according to an embodiment of this application.

Further, in response to the first operation performed by the user on the first interface, when displaying the first remark information, the terminal may further display historical search information in the first application. Specifically, after S301, the method in this embodiment of this application may further include S1101. After S303, the method in this embodiment of this application may further include S1102. For example, as shown in FIG. 11, after S301 shown in FIG. 5, the method in this embodiment of this application may further include S1101. After S303 shown in FIG. 5, the method in this embodiment of this application may further include S1102.

S1101. In response to the first operation performed by the user on the first interface, the terminal displays the historical search information in the first application.

Different from the first remark information and the second remark information, that the historical search information in the first application is stored in the first application in the terminal specifically means that the historical search information in the first application is stored in a storage area that is of the first application and that is in the terminal. However, the first remark information is stored in the nonvolatile storage medium of the terminal. The nonvolatile storage medium may include a storage area of the third application and a storage area of the fourth application, or include a preset storage area that is in the terminal and that is used to store the foregoing remark information.

For example, in a conventional solution, in response to the tap operation performed by the user on the input box 402, the mobile phone 100 may display a commodity that is browsed or searched for by the user in "Taobao" as shown in FIG. 4(b). For example, the mobile phone 100 may display historical search information 404. However, the historical search information 404 is different from the at least one piece of first remark information 403.

S1102. In response to the first operation performed by the user on the second interface, the terminal displays historical search information in the second application.

Different from the first remark information and the second remark information, that the historical search information in the second application is stored in the second application in the terminal specifically means that the historical search information in the second application is stored in a storage area that is of the second application and that is in the terminal. However, the second remark information is stored in the nonvolatile storage medium of the terminal. The nonvolatile storage medium may include the storage area of the third application and the storage area of the fourth application, or include a preset storage area that is in the terminal and that is used to store the foregoing remark information.

For example, in the conventional solution, in response to the tap operation performed by the user on the input box 702, the mobile phone 100 may display a name of a song that is listened to by the user in "QQ music" or a popular search 704 as shown in FIG. 7(*b*). For example, the mobile phone 100 may display popular searches "Chengdu" and "Mayday". However, the popular search 704 is different from the at least one piece of second remark information 703 in this embodiment of this application.

In this embodiment of this application, in response to the first operation performed by the user on the first interface, the terminal may not only display the at least one piece of first remark information, but also the display historical search information in the first application; in response to the first operation performed by the user on the second interface, the terminal may not only display the at least one piece of second remark information, but also display the historical search information in the second application. In this way, the terminal can display both remark information that matches an attribute of an application and historical search information in the application.

In an implementation of this embodiment of this application, before the terminal prompts (for example, displays) the user with the first remark information or the second remark information, the terminal may record the foregoing remark information (for example, the first remark information and the second remark information) by using the third application or the fourth application. Specifically, before S301 or S303, the method in this embodiment of this application may include S1201 to S1203.

S1201. In response to the second operation performed by the user, the terminal stores third remark information in the nonvolatile storage medium by using the third application or the fourth application.

The second operation may be an operation of entering, by the user, the third remark information into the terminal by using the third application or the fourth application. The third application or the fourth application may be system applications such as Reminder, Clipboard, Notepad, Messaging, or Email in the terminal.

In a first implementation of this embodiment of this application, the third application or the fourth application includes a system application that is in the terminal and that is specially used to record remark information entered by the user, for example, Reminder and Notepad. For example, the third application is Reminder in the mobile phone 100. The mobile phone 100 may display a Reminder interface 1201 shown in FIG. 12(*a*). After the user enters remark information "Aaron@outlook.com" into the Reminder interface 1201 shown in FIG. 12(*a*), the mobile phone 100 may display a display interface shown in FIG. 12(*b*). After the user taps a "Done" button 1202 shown in FIG. 12(*b*), the mobile phone 100 may store, in the nonvolatile storage medium (for example, a Reminder storage area) of the terminal, the remark information "Aaron@outlook.com" entered by the user.

Figure 12A:
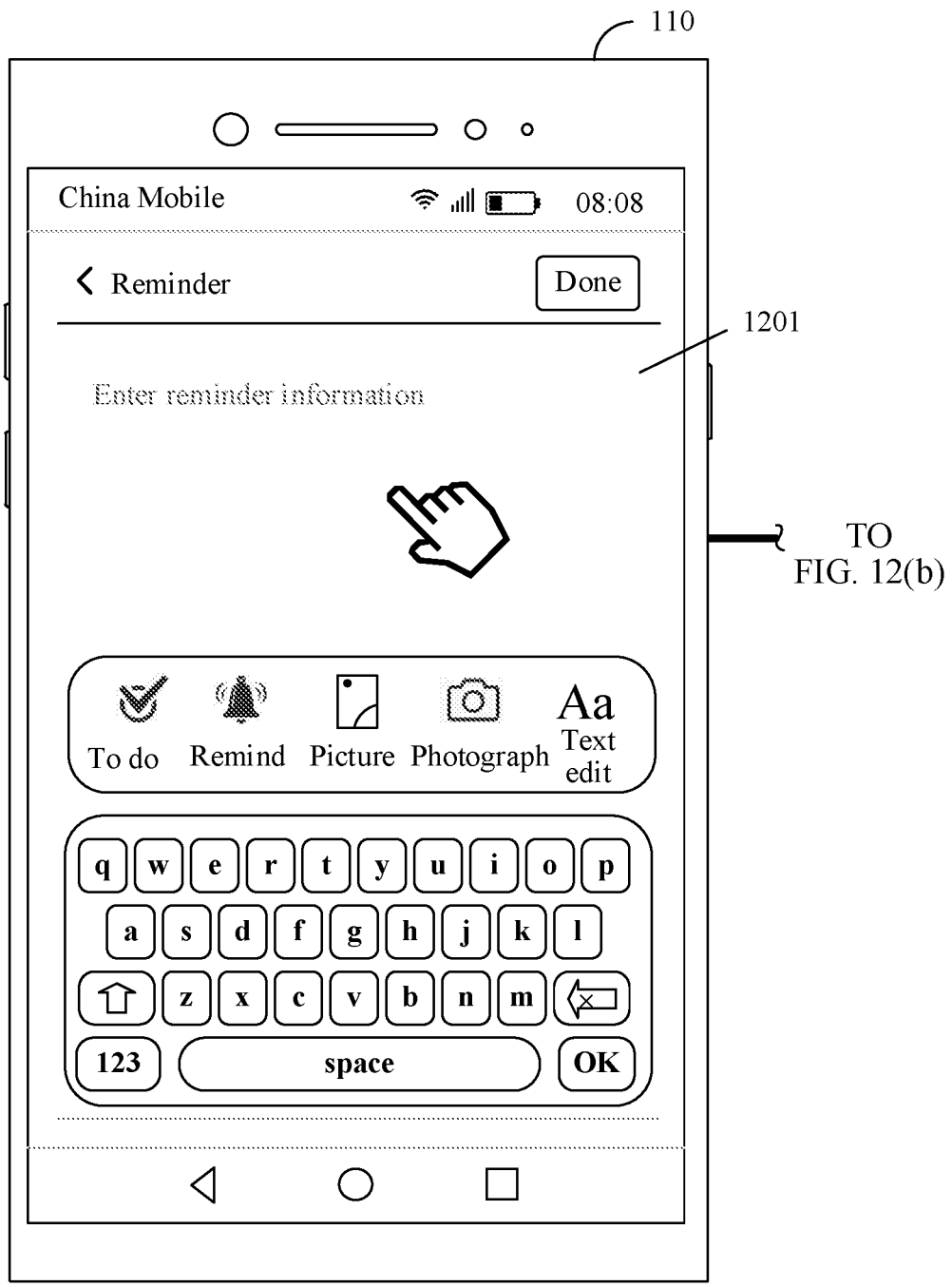
FIG. 12(a) to FIG. 12(c) are schematic diagrams of an example display interface according to an embodiment of this application.
Figure 12B:
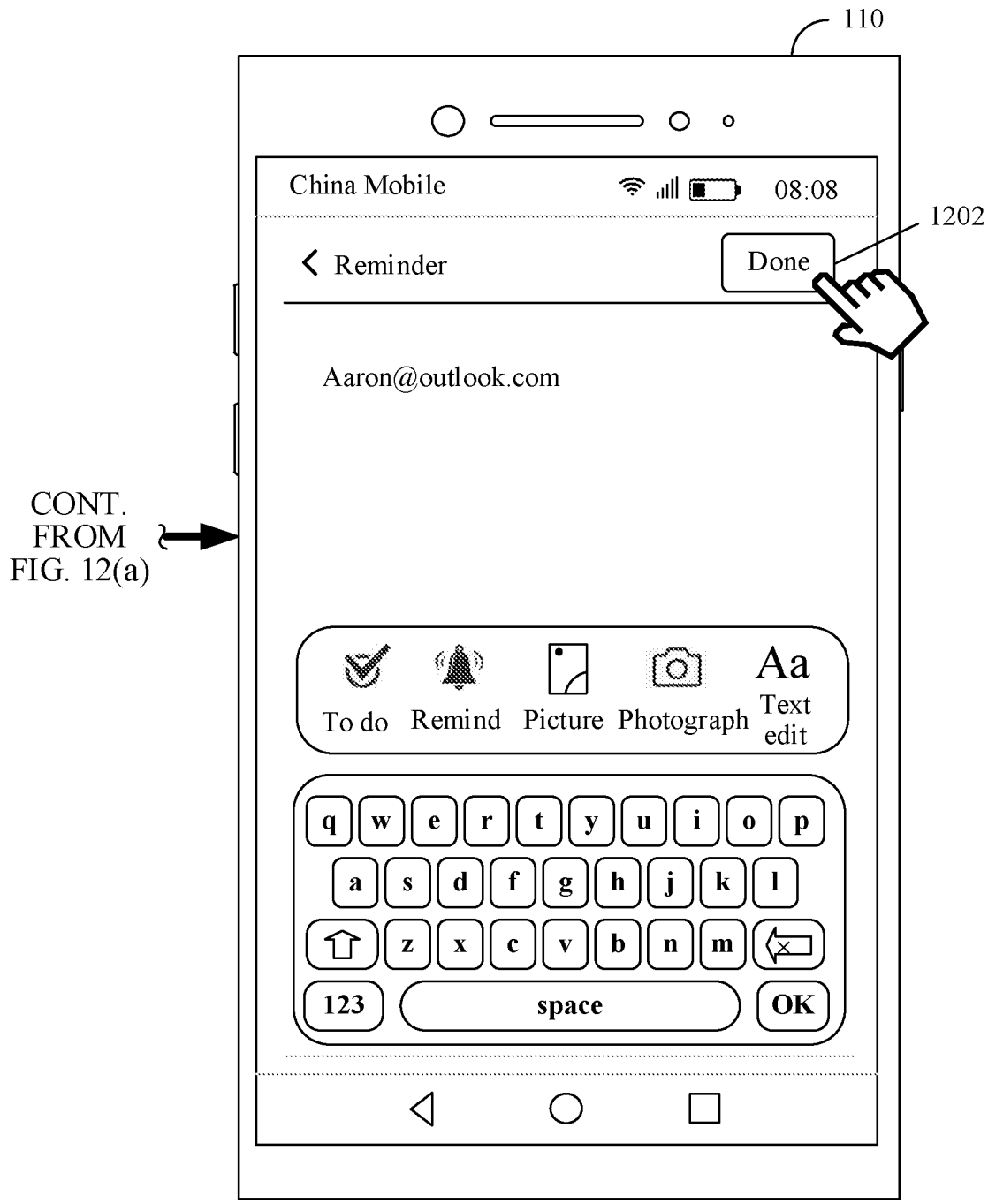
Figure 12C:
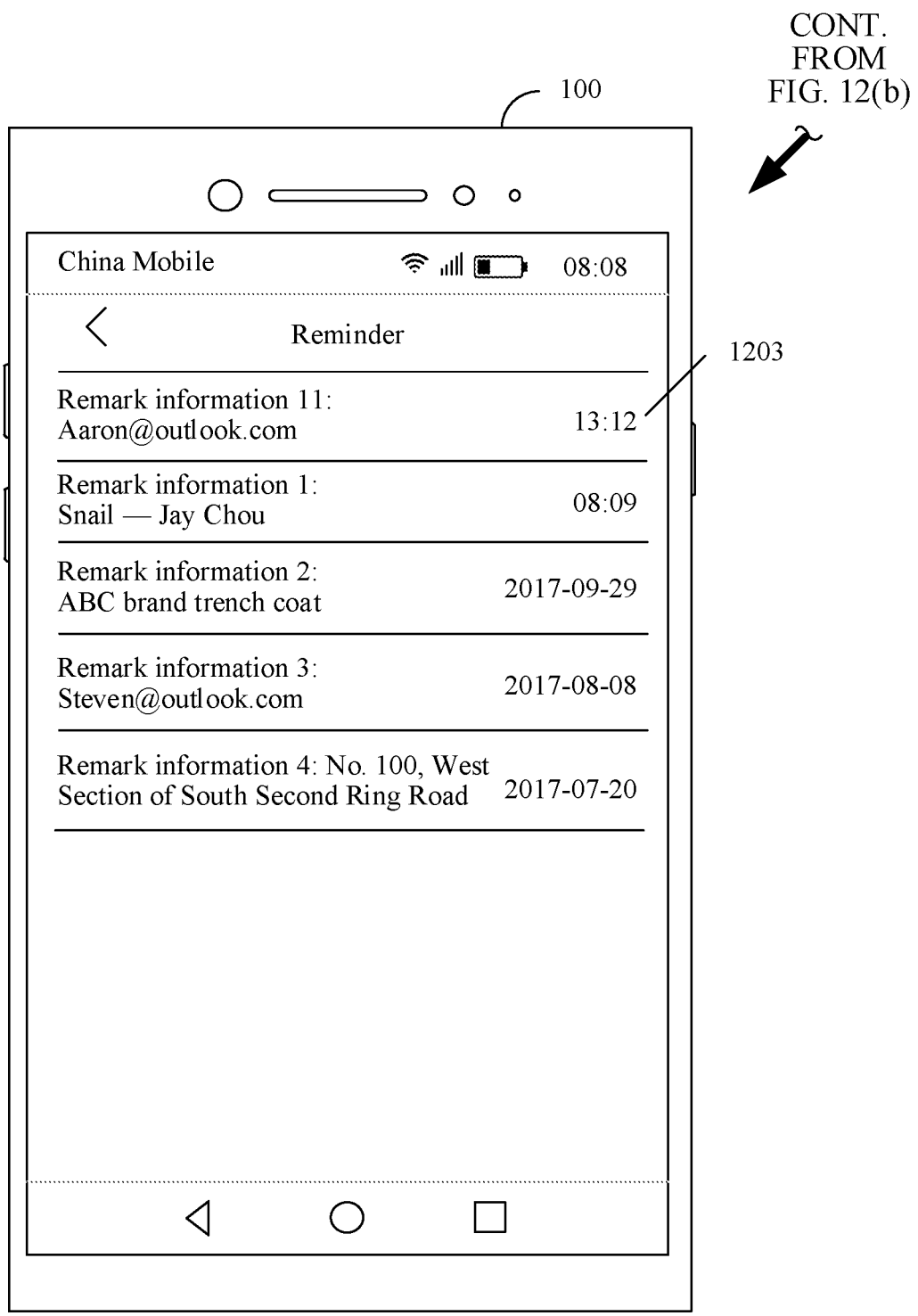

For example, compared with the remark information stored in Reminder that is in the mobile phone 100 and that is shown in FIG. 1, remark information stored in Reminder that is in the mobile phone 100 and that is shown in FIG. 12(*c*) further includes remark information 11 "Aaron@outlook.com" 1203.

In a second implementation, the third application or the fourth application includes a system application such as Clipboard, Messaging, or Email in the terminal. In this implementation, when the terminal detects that the user enters remark information having a preset attribute by using the third application or the fourth application, the terminal may store, in the nonvolatile storage medium, the remark information (namely, the third remark information) that has the preset attribute and that is entered by using the third application or the fourth application. In this embodiment of this application, the remark information having the preset attribute may include remark information (for example, the remark information 4 and the remark information 8 shown in Table 1) having the address attribute, remark information (for example, the remark information 1 and the remark information 2 shown in Table 1) having the attribute of a to-be-purchased commodity, and remark information (for example, the remark information 3 and the remark information 9 shown in Table 1) having the mailbox address attribute. The terminal may determine, based on a feature of remark information, whether the remark information is remark information having the preset attribute. The remark information having the mailbox address attribute is used as an example. When remark information includes three parts: a "user name", "@", and a "domain name", the terminal may determine that the remark information is remark information having the mailbox address attribute, and may store the remark information in the nonvolatile storage medium.

Further, in response to the second operation, the terminal may further display a third interface that is used to select an application whose attribute matches the third remark information, so that the user may select, in the third interface, the application whose attribute matches the third remark information. Specifically, the method in this embodiment of this application may further include S1202 and S1203.

S1202. The terminal displays the third interface in response to the second operation performed by the user, where the third interface includes a plurality of application options, and the plurality of application options are in a one-to-one correspondence with a plurality of applications installed on the terminal.

Figure 13A:
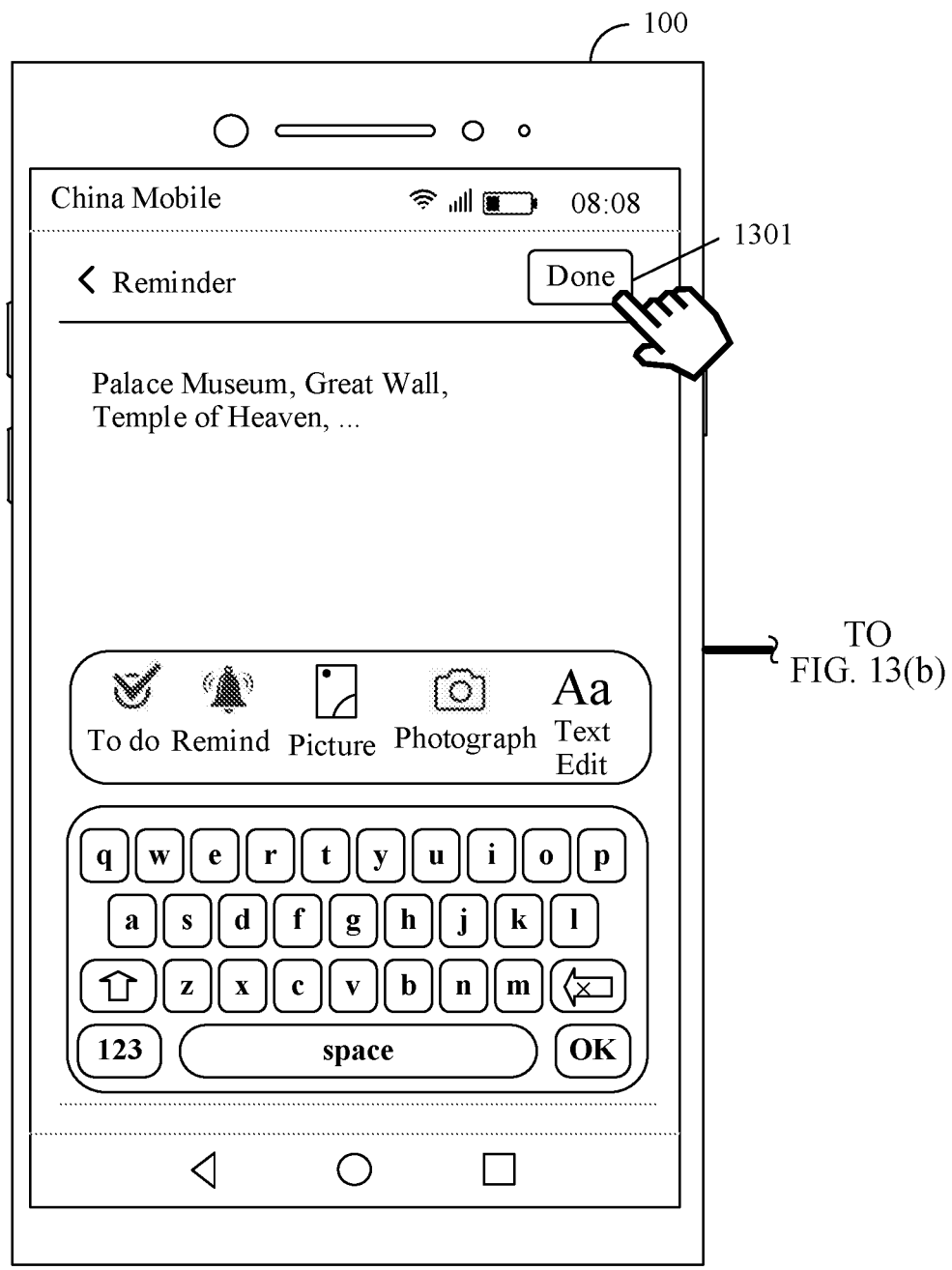
FIG. 13(a) and FIG. 13(b) are a schematic diagrams of an example display interface according to an embodiment of this application.
Figure 13B:
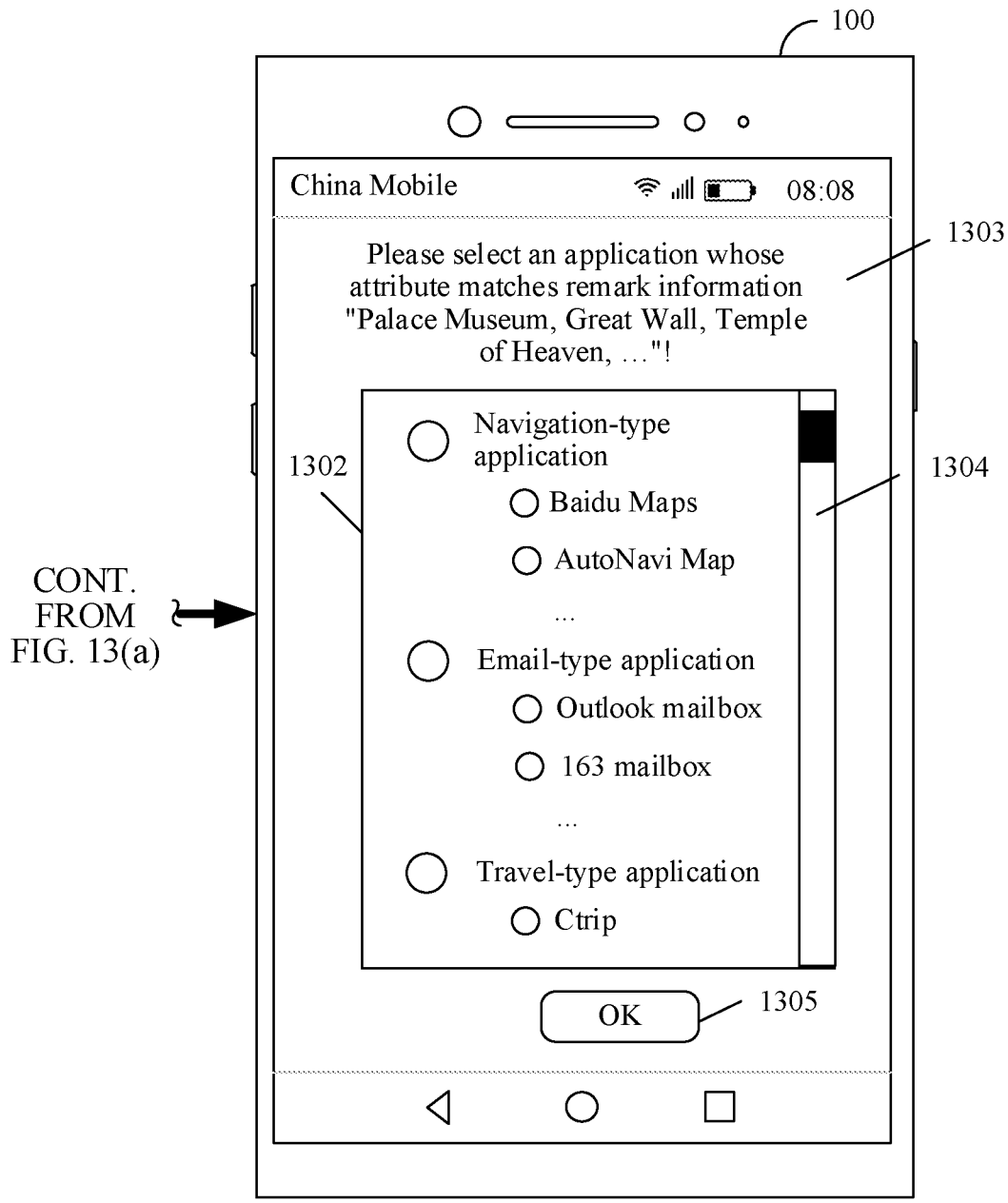

In the first implementation, the second operation may be a tap operation performed by the user on a "Done" button 1301 shown in FIG. 13(*a*). After the user taps the "Done" button 1301 shown in FIG. 13(*a*), in response to the tap operation performed by the user on the "Done" button 1301, the mobile phone 100 may display a third interface 1303 shown in FIG. 13(*b*). The third interface 1303 includes a plurality of application options 1302, for example, applications options of navigation-type applications such as "Baidu Maps" and "AutoNavi Map", application options of email-type applications such as "Outlook mailbox" and "163 mailbox", and an application option of a travel-type application such as "Ctrip". The third interface 1303 further includes prompt information used to prompt the user to select remark information, for example, prompt information "Please select an application whose attribute matches remark information 'Palace Museum, Great Wall, Temple of Heaven, . . . '".

Optionally, because a relatively large quantity of applications may be installed on the terminal, and a size of a display screen of the terminal is limited and is insufficient to display application options of all applications, a display box of the plurality of application options 1302 shown in FIG. 13(*b*) further includes a scrollbar 1304.

S1203. In response to a selection operation performed by the user on the plurality of application options, the terminal stores, in the nonvolatile storage medium, a correspondence between the third remark information and an application corresponding to an application option selected by the user, or sets an attribute of the application option selected by the user to an attribute of the third remark information.

It may be understood that the user may select one or more application options from the plurality of application options 1302 shown in FIG. 13(*b*). For example, the user may select applications options "Baidu Maps" and "Ctrip" for the remark information "Palace Museum, Great Wall, Temple of Heaven, . . . ". Then, the user may tap an "OK" button 1305, and in response to the tap operation performed by the user on the "OK" button 1305, the mobile phone 100 may store the remark information "Palace Museum, Great Wall, Temple of Heaven, . . . " and a correspondence between the remark information "Palace Museum, Great Wall, Temple of Heaven, . . . " and a combination of "Baidu Maps" and "Ctrip".

According to the information input method provided in this application, in response to the second operation, the terminal may display the third interface that is used by the user to select an application corresponding to the remark information, so that the user selects an application (for example, the first application) that may be subsequently used for the remark information. In this way, accuracy of a correspondence between remark information and an application can be improved.

In another implementation of this embodiment of this application, the terminal not only stores remark information, but also stores a correspondence between remark information and an application. In this implementation, in response to the second operation, the terminal may automatically analyze third remark information to determine an application whose attribute matches the third remark information, and store a correspondence between the third remark information and the application whose attribute matches the third remark information, and the user does not need to select the application whose attribute matches the third remark information. In other words, the terminal may determine and store, in a user perception-free manner, the correspondence between the third remark information and the application whose attribute matches the third remark information. Specifically, after S1201, the method in this embodiment of this application may further include S1301 and S1302. In other words, S1202 and S1203 may be replaced with S1301 and S1302.

S1301. In response to the second operation, the terminal analyzes the third remark information, and searches a plurality of applications installed on the terminal for the application whose attribute matches the third remark information.

The terminal may perform a semantic analysis on the third remark information to determine an attribute of the third remark information, and then determine, based on the attribute of the third remark information, the application whose attribute matches the third remark information. For example, it is assumed that the third remark information is "Chengdu". The terminal performs a semantic analysis on the remark information "Chengdu", and may determine that the third remark information may be a song or a place name. Therefore, the terminal may determine that an attribute of the third remark information "Chengdu" includes a song attribute and an address attribute, and then may determine, based on the attribute of "Chengdu", that applications whose attributes match "Chengdu" are a music-type application (for example, QQ Music) and a navigation-type application (for example, Baidu Maps).

Alternatively, the terminal may analyze a format of the third remark information, to determine the attribute of the third remark information. It is assumed that the third remark information is Aaron@outlook.com. The terminal may determine that Aaron@outlook.com conforms to a format (a "user name", "@", and a "domain name") of the mailbox address, and then determine that an attribute of Aaron@outlook.com is a mailbox address attribute, and that an application whose attribute matches Aaron@outlook.com is an email-type application such as an outlook mailbox and a 163 mailbox.

Alternatively, the third remark information is obtained by the terminal when the user uses the third application or the fourth application, the terminal may analyze a scenario in which the user uses the third application or the fourth application, to determine a scenario attribute of the scenario, and then determine the attribute of the third remark information based on the determined scenario attribute. For a specific method in which the terminal analyzes the scenario in which the user uses the third application or the fourth application, to determine the scenario attribute of the scenario, and then determines the attribute of the third remark information based on the determined scenario attribute, refer to related descriptions in S1701 and S1702 in this embodiment of this application. Details are not described herein in this application.

S1302. The terminal stores, in the nonvolatile storage medium, a correspondence between the third remark information and a found application, or sets an attribute of the found application to the attribute of the third remark information.

In this embodiment of this application, in response to the second operation performed by the user, the terminal may not only store the third remark information in the nonvolatile storage medium by using the third application or the fourth application, but also analyze the third remark information to determine, in the user perception-free manner, the application whose attribute matches the third remark information, and to store the correspondence between the third remark information and the determined application.

Figure 14:
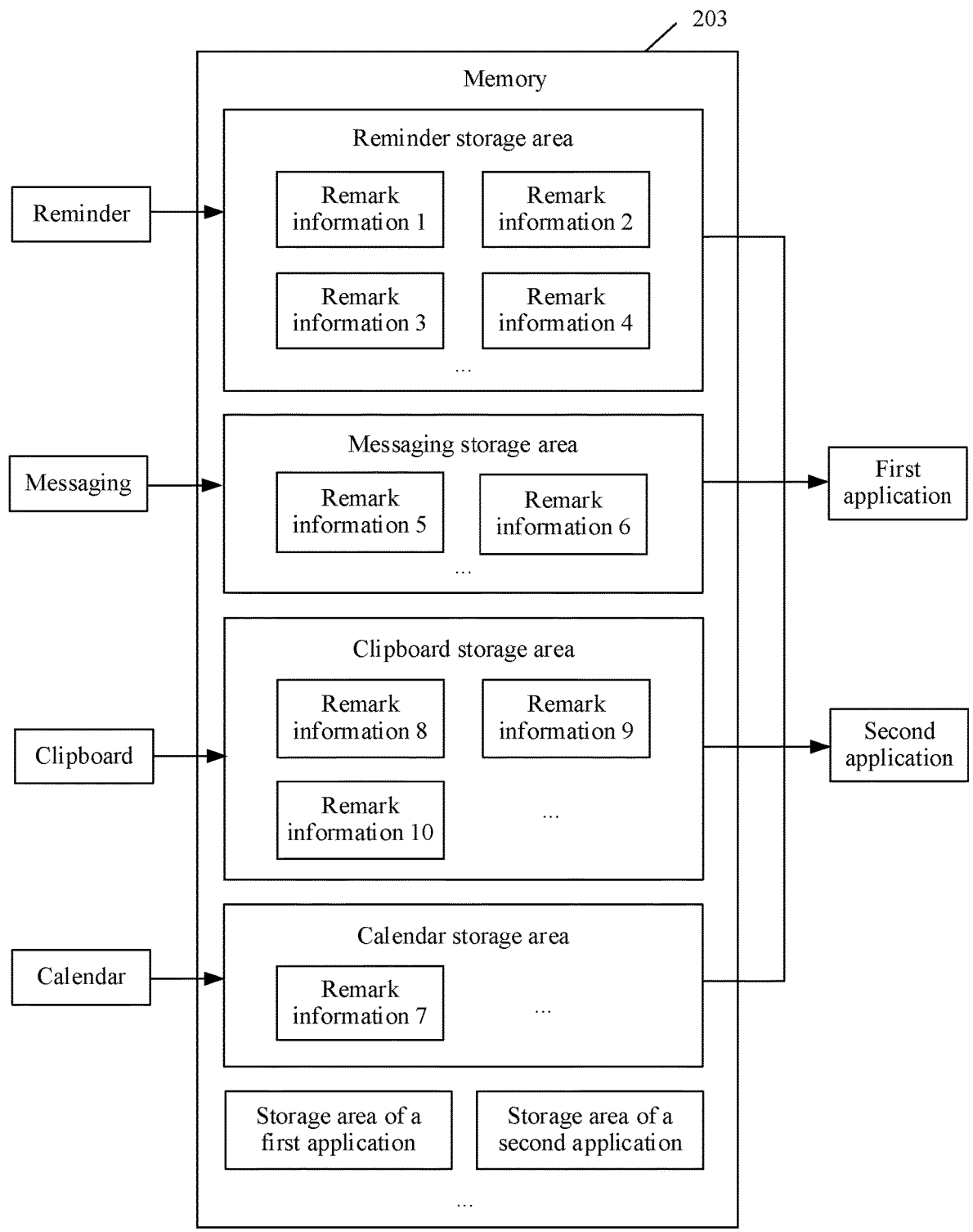
FIG. 14 is a schematic diagram of a structural composition of a memory of a terminal according to an embodiment of this application.

In a possible implementation, the nonvolatile storage medium used to store remark information in this embodiment of this application may be a storage area of a system-level application such as Reminder, Clipboard, Calendar, Notepad, Email, or Messaging in the terminal. For example, the memory 203 shown in FIG. 2 is used as an example. As shown in FIG. 14, the memory 203 may include the storage area of the system-level application such as Reminder, Clipboard, Calendar, Notepad, Email, or Messaging. The third remark information obtained by the terminal when the user uses the third application may be stored in the storage area of the third application; the third remark information obtained by the terminal when the user uses the fourth application may be stored in the storage area of the fourth application.

For example, with reference to FIG. 1, the remark information 1 to the remark information 4 are remark information obtained by the mobile phone 100 when the user uses Reminder. Therefore, the mobile phone 100 may store the remark information 1 to the remark information 4 in a Reminder storage area. The remark information 5 and the remark information 6 are remark information obtained by the mobile phone 100 when the user uses Messaging. Therefore, the mobile phone 100 may store the remark information 5 and the remark information 6 in a Messaging storage area. The remark information 7 is remark information obtained by the mobile phone 100 when the user uses Calendar. Therefore, the mobile phone 100 may store the remark information 7 in a Calendar storage area. The remark information 8 to the remark information 10 are remark information obtained by the mobile phone 100 when the user uses Clipboard. Therefore, the mobile phone 100 may store the remark information 8 to the remark information 10 in a Clipboard storage area. When displaying the first interface of the first application or the second interface of the second application, in response to the first operation performed by the user on the first interface or the second interface, the mobile phone 100 may automatically select matched remark information from storage areas of the system applications such as Reminder, Messaging, Calendar, and Clipboard shown in FIG. 14.

In this implementation, S302 may be replaced with S1401, and S304 may be replaced with S1402.

S1401. In response to the first operation performed by the user on the first interface, the terminal automatically selects the first remark information that matches the attribute of the first application from remark information stored in the third application and the fourth application, and prompts the user with the selected first remark information.

S1402. In response to the first operation performed by the user on the second interface, the terminal automatically selects the second remark information that matches the attribute of the second application from the remark information stored in the third application and the fourth application, and prompts the user with the selected second remark information.

The terminal in this embodiment of this application may include an interface configured to implement data exchange between "the first application/the second application" and "the third application/the fourth application". In this embodiment of this application, an interface may be added to an existing operating system (for example, an Android system). In response to the first operation, the terminal may invoke the interface to read the foregoing at least one piece of remark information from the third application/the fourth application. For example, the interface may be a private interface, namely, a nonstandard interface.

For example, the terminal may implement, based on an intent (intent)-based service, a process of prompting the user with the at least one piece of first remark information in the first interface of the first application. Specifically, the terminal may customize the input box in the first interface as an Intent option. When the terminal detects the first operation (for example, the tap operation) performed by the user on the input box (namely, the Intent option) in the first interface of the terminal, the terminal selects the at least one piece of first remark information that matches the attribute of the input box from the storage area of the third application and the storage area of the fourth application, generates link information of the selected remark information, and adds the link information to Intent. Then, the terminal sends a notification to the first application. When receiving the notification, the first application invokes the Intent to obtain the link information of the selected remark information, and then finds, based on the link information, the at least one piece of first remark information that matches the attribute of the input box.

Figure 15:
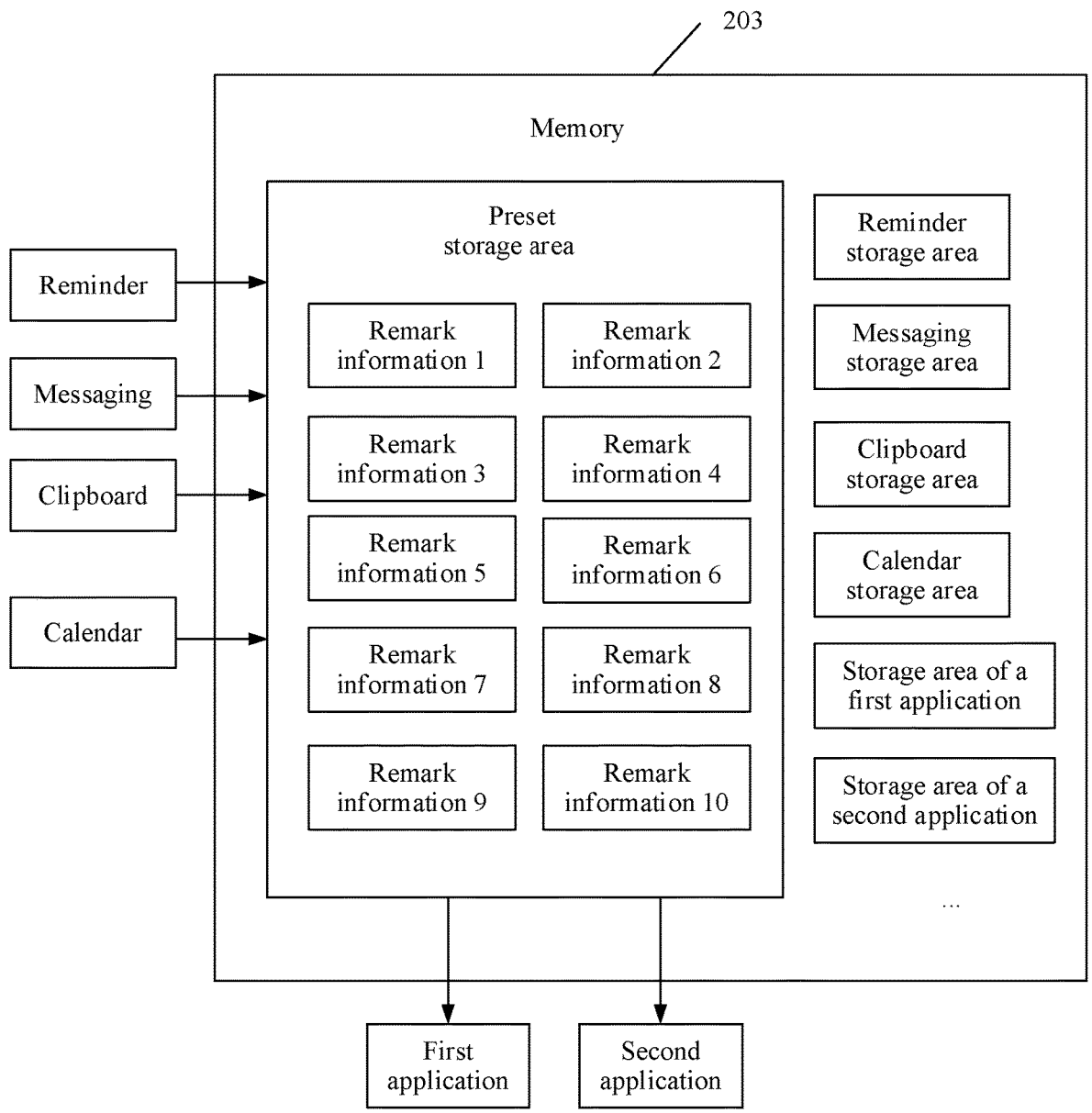
FIG. 15 is a schematic diagram of a structural composition of a memory of a terminal according to an embodiment of this application.

In another implementation, the nonvolatile storage medium may be a global storage area (referred to as a preset storage area) that is in storage space of the terminal and that is specially used to store remark information obtained when the user uses the foregoing applications. For example, the memory 203 shown in FIG. 2 is used as an example. As shown in FIG. 15, the memory 203 may include the preset storage area, and the storage area of the system-level application such as Reminder, Clipboard, Calendar, Notepad, Email, or Messaging. The storage area of the system-level application such as Reminder, Clipboard, Calendar, Notepad, Email, or Messaging is used to store installation information in a corresponding application and data generated in a use process. The preset storage area is used to store the third remark information (for example, the remark information 1 to the remark information 10) obtained when the user uses the third application or the fourth application (the system-level application such as Reminder, Clipboard, Calendar, Notepad, Email, or Messaging). When displaying the first interface of the first application or the second interface of the second application, in response to the first operation performed by the user on the first interface or the second interface, the mobile phone 100 may automatically select matched remark information from a preset storage area shown in FIG. 14.

For example, it is assumed that the first application is a shopping-type application (for example, Taobao), and the first remark information is a commodity name (for example, a sweeping robot). When detecting that the user performs a purchase operation on the first remark information in the first application, the terminal may add a first mark (for example, purchased) to the first remark information. Correspondingly, when automatically selecting the first remark information that matches the attribute of the first application, the terminal may not select the first remark information to which the first mark is added. Specifically, after S302, the method in this embodiment of this application may further include S1601:

S1601. The terminal adds the first mark to one piece of first remark information when detecting that the user performs, in the first application on the piece of first remark information, an operation that meets a preset condition.

Correspondingly, in response to the first operation performed by the user on the first interface, when the terminal selects again the remark information that matches the attribute of the first application, the terminal may not select the first remark information to which the first mark is added, and instead, select first remark information that matches the attribute of the first application and to which the first mark is not added.

When the first application is a shopping-type application, the operation that meets the preset condition may be a purchase operation performed, in the first application, by the user on a commodity corresponding to the first remark information. It may be understood that after the user has purchased, in the first application, the commodity corresponding to the first remark information, the user may no longer need the remark information with which the terminal prompts the user. When the first application is an email-type application, the operation that meets the preset condition may be that the user sends, in the first application, an email to an email box corresponding to the first remark information. It may be understood that, after the user has sent, in the first application, the email to the email box corresponding to the first remark information, the first application may record the first remark information (namely, an email address). When the user uses the first application again to send an email to the email address, the terminal does not need to prompt the user with the email address. When the first application is a navigation-type application, the operation that meets the preset condition may be a navigation search performed by the user on the first remark information in the first application. It may be understood that when the user performs the navigation search on the first remark information in the first application, the first application may store the historical search information in the first application, and when the user uses the first application again for navigation, the terminal does not need to prompt the user with the first remark information.

It should be noted that in this embodiment of this application, the operation that meets the preset condition includes but is not limited to the foregoing listed operations, and another operation form is not described herein in this embodiment of this application.

In this embodiment of this application, that the terminal adds the first mark to the first remark information may be specifically that the terminal adds a preset flag bit, for example, "0", to the first remark information. The terminal adds the first mark to the first remark information to distinguish between the first remark information and other remark information. For a method in which the terminal adds the first mark to the first remark information, refer to a specific method in which a mark is added to one piece of information to distinguish between the information and other information in a conventional technology. Details are not described herein in this embodiment of this application.

Figure 16A:
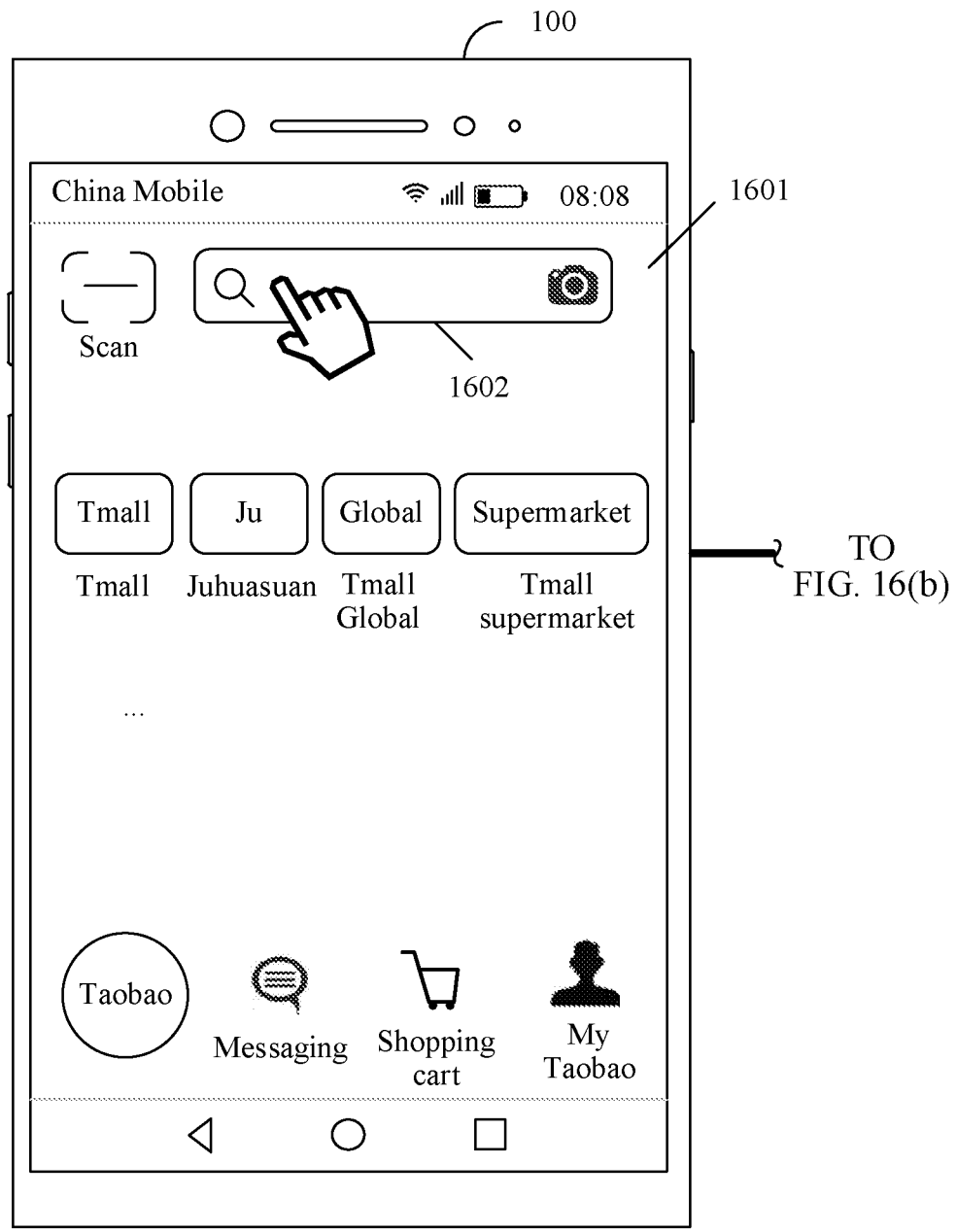
FIG. 16(a) and FIG. 16(b) are schematic diagrams of an example display interface according to an embodiment of this application.
Figure 16B:
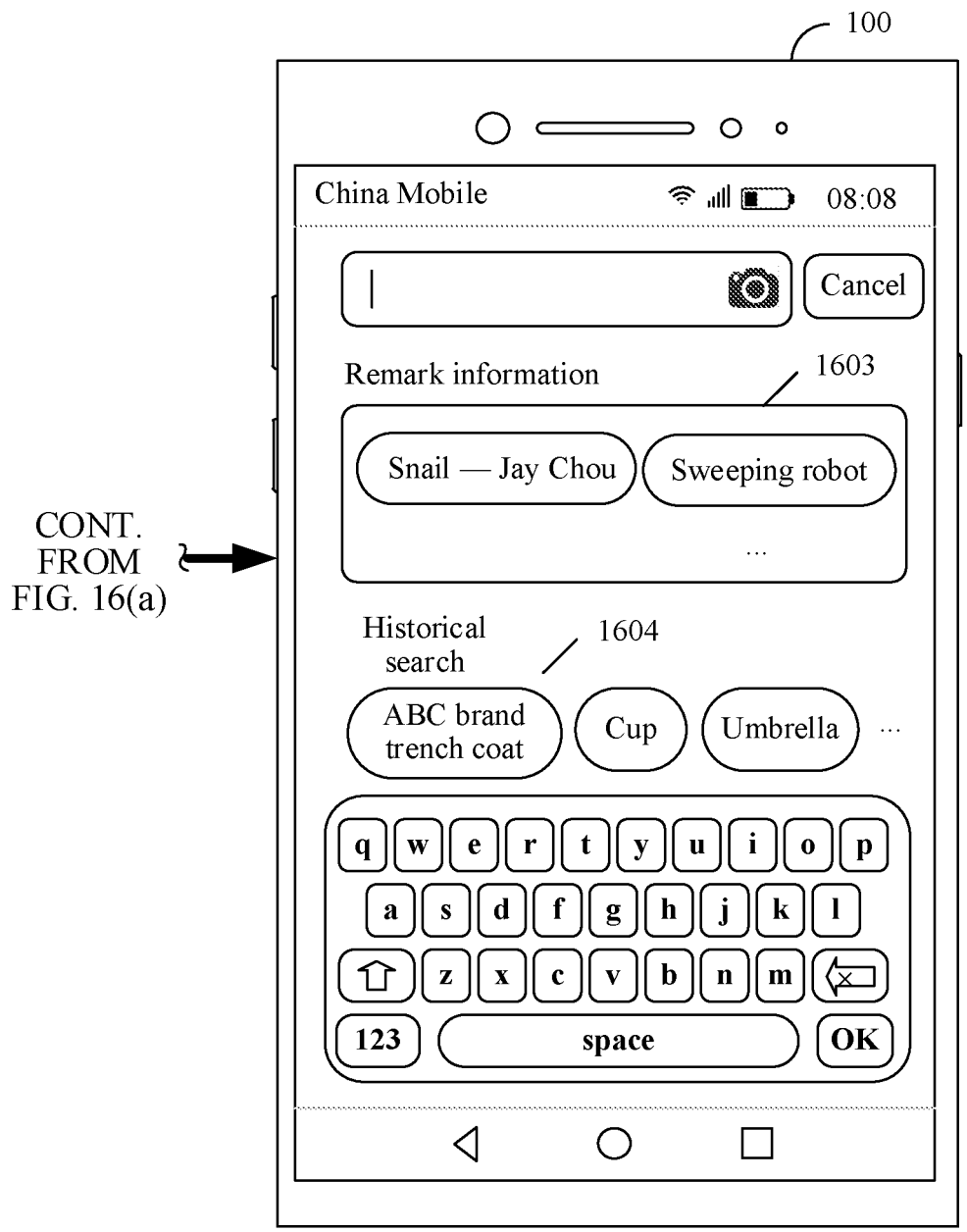

For example, with reference to FIG. 4(a) to FIG. 4(c), as shown in FIG. 4(c), the mobile phone 100 has searched for the first remark information "ABC brand trench coat" in "Taobao". In this case, as shown in FIG. 16(b), the mobile phone 100 may receive a tap operation (namely, the first operation) performed by the user on an input box 1602 in a first interface 1601 shown in FIG. 16(a). In response to the first operation, after automatically finding the first remark information ("Snail—Jay Chou" and "Sweeping robot") to which the first mark is not added and that matches the attribute of the input box that is in the first interface and on which the first operation is performed, the mobile phone 100 prompts (namely, displays) the user with at least one piece of first remark information 1603. The at least one piece of first remark information 1603 includes "Snail—Jay Chou" and "Sweeping robot". Compared with the at least one piece of first remark information 403 shown in FIG. 4(b), the at least one piece of first remark information 1603 shown in FIG. 16(b) does not include the remark information "ABC brand trench coat".

In this embodiment of this application, the terminal may select, from the nonvolatile storage medium, the first remark information that matches the attribute of the first application and to which the first mark is not added, to prevent the terminal from repeatedly prompting the user with the first remark information on which the user has performed an operation, namely, the first remark information on which the user has performed, in the first application, the operation that meets the preset condition.

Likewise, the terminal adds the first mark to one piece of second remark information when detecting that the user performs, in the second application on the piece of second remark information, the operation that meets the preset condition. Correspondingly, in response to the first operation performed by the user on the second interface, when the terminal selects again remark information that matches the attribute of the second application, the terminal may not select the second remark information to which the first mark is added, and instead, select second remark information that matches the attribute of the second application and to which the first mark is not added.

Further, in this embodiment of this application, the first remark information is information that is stored in the nonvolatile storage medium of the terminal when the user uses the third application. In this embodiment of this application, the nonvolatile storage medium may maintain a scenario library. The scenario library includes a plurality of scenarios, and each of the plurality of scenarios has a different scenario attribute. When the user uses the third application, the terminal may further determine a scenario in which the user uses the third application, then determine a scenario attribute of the scenario, and finally store, in a scenario corresponding to the determined scenario attribute in the preset scenario library, first remark information obtained by the terminal when the user uses the first application. Specifically, before S302, the method in this embodiment of this application may further include S1701:

S1701. When the user uses the third application, the terminal determines the scenario attribute of the scenario in which the user uses the third application, and stores, in the scenario corresponding to the scenario attribute in the preset scenario library, the first remark information that is obtained by the terminal when the user uses the third application, where the preset scenario library is stored in the nonvolatile storage medium, the preset scenario library includes a plurality of scenarios, and each of the plurality of scenarios has a different scenario attribute.

Figure 17:
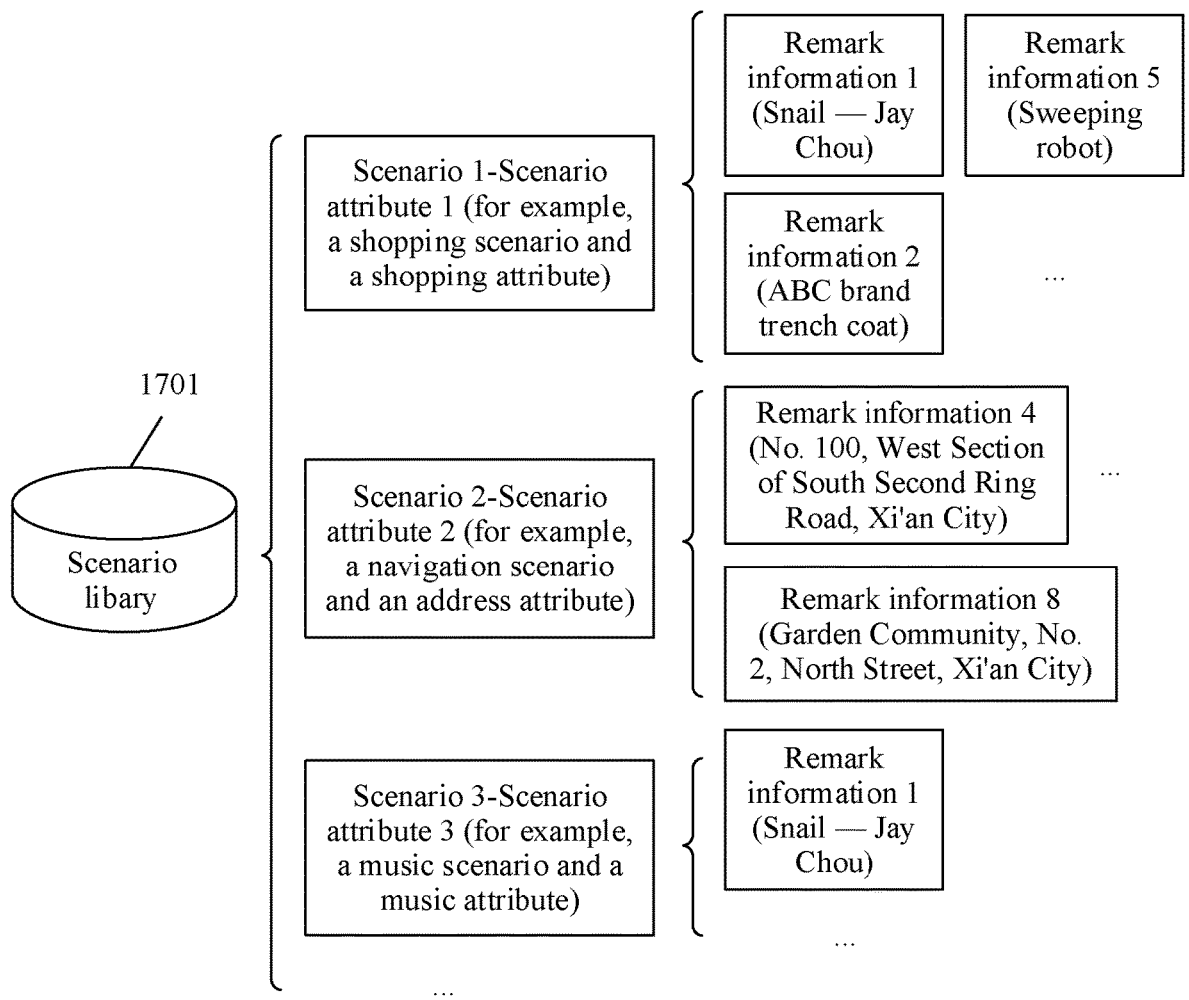
FIG. 17 is a schematic diagram of an example scenario library according to an embodiment of this application.

For example, as shown in FIG. 17, a scenario library 1701 includes a plurality of scenarios, for example, a scenario 1, a scenario 2, and a scenario 3. A scenario attribute of the scenario 1 is a scenario attribute 1, a scenario attribute of the scenario 2 is a scenario attribute 2, and a scenario attribute of the scenario 3 is a scenario attribute 3.

For example, the scenario 1 is a shopping scenario. A scenario attribute of the shopping scenario is a shopping attribute. As shown in FIG. 17, the scenario 1 may include remark information that indicates commodity names, for example, the remark information 1 "Snail—Jay Chou", the remark information 5 "Sweeping robot", and the remark information 2 "ABC brand trench coat". For example, the scenario 2 is a navigation scenario. A scenario attribute of the navigation scenario is the address attribute. As shown in FIG. 17, the scenario 2 includes remark information that indicates address information, for example, the remark information 4 "No. 100, West Section of South Second Ring Road, Xi'an City" and the remark information 8 "Garden Community, No. 2, North Street, Xi'an City". For example, the scenario 3 is a music scenario. A scenario attribute of the music scenario is a music attribute. As shown in FIG. 17, the scenario 3 includes remark information that indicates a song name, for example, the remark information 1 "Snail—Jay Chou".

In this embodiment of this application, the scenario attribute of the scenario in which the user uses the third application may be an attribute of first remark information obtained by the terminal when the user uses the third application. For example, with reference to Table 1, the remark information 1 "Snail—Jay Chou" in Table 1 is remark information obtained by the terminal when the user uses Reminder (namely, the third application). The terminal performs a semantic analysis on the remark information 1 "Snail—Jay Chou", and determines that the remark information 1 may be a song, or may be a disc (namely, a commodity). Therefore, the terminal may determine that an attribute of a scenario in which the user uses Reminder to record the remark information 1 may be the music attribute and the shopping attribute. The terminal may store the remark information 1 in the music scenario and the shopping scenario in the scenario library.

Correspondingly, the "automatically selecting at least one piece of first remark information that matches an attribute of the first application" in S302 may include S1702:

S1702. The terminal automatically selects a scenario that is in the preset scenario library and whose scenario attribute matches the attribute of the first application, and selects first remark information in the matched scenario.

When the terminal displays the first interface of the first application, in response to the first operation performed by the user on the first interface, the terminal may automatically select the scenario whose scenario attribute matches the attribute of the first application used by the user, and then select the first remark information in the determined scenario.

It may be understood that when the user uses the fourth application, the terminal may further determine a scenario attribute of a scenario in which the user uses the fourth application, and store, in a scenario corresponding to the scenario attribute in the preset scenario library, second remark information obtained by the terminal when the user uses the fourth application. Correspondingly, the "automatically selecting at least one piece of second remark information that matches an attribute of the second application" in S304 may include: automatically selecting, by the terminal, a scenario that is in the preset scenario library and whose scenario attribute matches the attribute of the second application, and selecting second remark information in the matched scenario.

In this embodiment of this application, the terminal may classify and store, based on the scenario in which the user uses the third application or the fourth application, remark information obtained by the terminal when the user uses the third application or the fourth application. Because each scenario has a different scenario attribute, when receiving the first operation performed on the first application (or the second application), the terminal may automatically select the scenario that is in the preset scenario library and whose scenario attribute matches the attribute of the first application (or the second application), and select remark information in the matching scenario.

It can be understood that, to implement the foregoing functions, the terminal and the like include corresponding hardware structures and/or software modules for performing the functions. A person skilled in the art should easily be aware that, in combination with the examples described in the embodiments disclosed in this specification, units, algorithms, and steps may be implemented by hardware or a combination of hardware and computer software in the embodiments of the present invention. Whether a function is performed by hardware or hardware driven by computer software depends on particular applications and design constraints of the technical solutions. A person skilled in the art may use different methods to implement the described functions for each particular application, but it should not be considered that the implementation falls beyond the scope of the embodiments of the present invention.

In the embodiments of this application, the terminal may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that, in the embodiments of the present invention, division into modules is an example, is merely logical function division, and may be other division in an actual implementation.

Figure 18:
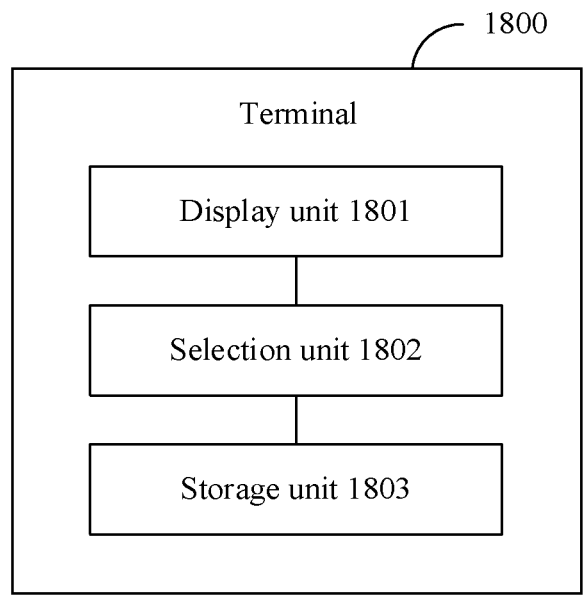
FIG. 18 is a schematic diagram of a structural composition of a terminal according to an embodiment of this application.

When each function module is obtained through division based on each corresponding function, as shown in FIG. 18, an embodiment of this application provides a terminal 1800. The terminal 1800 includes a display unit 1801, a selection unit 1802, and a storage unit 1803.

The display unit 1801 is configured to support the terminal 1800 in performing S301, S302, S302a, the "prompting the user with the at least one piece of first remark information in the first interface" in S1401, S303, S304, S304a, the "prompting the user with the at least one piece of second remark information in the second interface" in S1402, S1101, S1102, and S1202 that are in the foregoing method embodiment, and/or another process of the technology described in this specification.

The selection unit 1802 is configured to support the terminal 1800 in performing the "automatically selecting, in response to a first operation performed by the user on the first interface, at least one piece of first remark information that matches an attribute of the first application" in S302, the "automatically selecting, in response to the first operation performed by the user on the first interface, the at least one piece of first remark information that matches the attribute of the input box that is in the first interface and on which the first operation is performed" in S302a, the "automatically selecting, in response to the first operation performed by the user on the first interface, the first remark information that matches the attribute of the first application from remark information stored in the third application and the fourth application" in S1401, the "automatically selecting, in response to a first operation performed by the user on the second interface, at least one piece of second remark information that matches an attribute of the second application" in S304, the "automatically selecting, in response to the first operation performed by the user on the second interface, the at least one piece of second remark information that matches the attribute of the input box that is in the second interface and on which the first operation is performed" in S304a, and the "automatically selecting, in response to the first operation performed by the user on the second interface, the second remark information that matches the attribute of the second application from the remark information stored in the third application and the fourth application" in S1402 that are in the foregoing method embodiment, and/or another process of the technology described in this specification.

The storage unit 1803 is configured to support the terminal 1800 in performing S1201, S1203, and S1302 in the foregoing method embodiment, and/or another process of the technology described in this specification.

Further, the terminal 1800 may further include a detection unit and an addition unit (not shown). The detection unit is configured to support the terminal 1800 in performing the "detecting that the user performs, in the first application on the piece of first remark information, an operation that meets a preset condition" in S1601 in the foregoing method embodiment, and/or another process of the technology described in this specification. The addition unit is configured to support the terminal 1800 in performing the "adding the first mark to one piece of first remark information" in S1601 in the foregoing method embodiment, and/or another process of the technology described in this specification.

Further, the terminal 1800 may further include a determining unit. The determining unit is configured to support the terminal 1800 in performing S1701 in the foregoing method embodiment, and/or another process of the technology described in this specification.

Further, the terminal 1800 may further include an analysis unit. The analysis unit is configured to support the terminal 1800 in performing S1301 in the foregoing method embodiment, and/or another process of the technology described in this specification.

Certainly, the terminal 1800 includes but is not limited to the foregoing listed unit modules. For example, the terminal 1800 may further include a communications unit. The communications unit is configured to: send a message or information to another device, and receive a message or information sent by the another device. In addition, functions that can be specifically implemented by the function units include but are not limited to functions corresponding to the method steps in the foregoing examples. For detailed descriptions of other units of the terminal 1800, refer to the detailed descriptions of the method steps corresponding to the units. Details are not described herein again in this embodiment of this application.

When an integrated unit is used, the analysis unit, the determining unit, the detection unit, the selection unit, and the like may be integrated in a processing module for implementation; the communications unit may be an RF circuit, a Wi-Fi module, or a Bluetooth module of the terminal; the storage unit may be a storage module of the terminal; and the display unit 2402 may be a display module, for example, a touchscreen.

Figure 19:
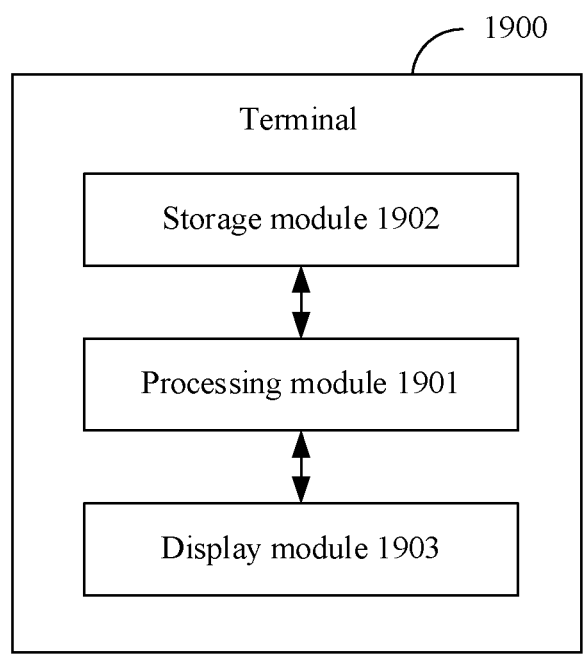
FIG. 19 is a schematic diagram of a structural composition of a terminal according to an embodiment of this application.

FIG. 19 is a possible schematic structural diagram of a terminal in the foregoing embodiments. The terminal 1900 includes a processing module 1901, a storage module 1902, and a display module 1903. The processing module 1901 is configured to control and manage the terminal. The display module 1903 is configured to display an image generated by the processing module 1901. The storage module 1902 is configured to store program code and data of the terminal. Further, the terminal 1900 may further include a communications module. The communications module is configured to communicate with another terminal. For example, the communications module is configured to: perform voice communication with the another terminal, and receive a profile picture from or send a profile picture to another terminal.

The processing module 1901 may be a processor or a controller, such as a central processing unit (CPU), a general-purpose processor, a digital signal processor (DSP), an application-specific integrated circuit (ASIC), a field-programmable gate array (FPGA) or another programmable logic device, a transistor logic device, a hardware component, or any combination thereof. The processing module 1901 may implement or execute various example logical blocks, modules, and circuits described with reference to content disclosed in the present invention. The processor may be a combination of processors implementing a computing function, for example, a combination of one or more microprocessors, or a combination of a DSP and a microprocessor. The communications module may be a transceiver, a transceiver circuit, a communications interface, or the like. The storage module 1902 may be a memory.

When the processing module 1901 is a processor (the processor 201 shown in FIG. 2), the communications module is an RF circuit (the radio frequency circuit 202 shown in FIG. 2), the storage module 1902 is a memory (the memory 203 shown in FIG. 2), and the display module 1903 is a touchscreen (including the touchpad 204-1 and the display 204-2 shown in FIG. 2), the terminal provided in this application may be the mobile phone 100 shown in FIG. 2. The communications modules may include not only the RF circuit, but also the Wi-Fi module and the Bluetooth module. Communications modules such as the RF circuit, the Wi-Fi module, and the Bluetooth module may be collectively referred to as a communications interface. The processor, the communications interface, the touchscreen, and the memory may be coupled together by using a bus.

An embodiment of this application further provides a control device, including a processor and a memory. The memory is configured to store computer program code, the computer program code includes a computer instruction, and when executing the computer instruction, the processor performs the information input method according to foregoing method embodiment.

An embodiment of this application further provides a computer storage medium. The computer storage medium stores computer program code, and when the foregoing processor executes the computer program code, the terminal performs related method steps in any accompanying drawing of FIG. 3, FIG. 5, and FIG. 11 to implement the method in the foregoing embodiment.

An embodiment of this application further provides a computer program product. When the computer program product is run on a computer, the computer is enabled to perform related method steps in any accompanying drawing of FIG. 3, FIG. 5, and FIG. 11 to implement the method in the foregoing embodiment.

The terminal 1800, the terminal 1900, the computer storage medium, and the computer program product provided in this application are all configured to perform the corresponding method provided above. Therefore, for advantageous effects that can be achieved by the terminal 1800, the terminal 1900, the computer storage medium, and the computer program product, refer to the advantageous effects of the corresponding methods provided above. Details are not described herein again.

Based on the descriptions of the foregoing implementations, a person skilled in the art may clearly understand that, for a purpose of convenient and brief description, division into the foregoing function modules is used as an example for description. In actual application, the foregoing functions may be allocated to different function modules and implemented based on a requirement. In other words, an inner structure of an apparatus is divided into different function modules, to implement all or some of the functions described above. For a detailed working process of the foregoing system, apparatus, and unit, refer to a corresponding process in the foregoing method embodiment. Details are not described herein again.

In the several embodiments provided in this application, it should be understood that the disclosed system, apparatus, and method may be implemented in other manners. For example, the described apparatus embodiments are merely examples. For example, the division into the modules or units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions in the embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a computer readable storage medium. Based on such an understanding, the technical solutions of this application essentially, or the part contributing to the prior art, or all or a part of the technical solutions may be implemented in the form of a software product. The computer software product is stored in a storage medium and includes several instructions for instructing a computer device (which may be a personal computer, a server, a network device, or the like) or a processor to perform all or some steps of the method described in the embodiments of this application. The storage medium is any medium that can store program code, for example, a flash memory, a removable hard disk, a read-only memory, a random access memory, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method applied to a terminal, the method comprising:
using a third application to store pieces of first remark information based upon attributes of a first application;
using a fourth application to store pieces of second remark information based upon attributes of a second application;
displaying, by the terminal, a first interface of the first application, and in response to a first operation performed by a user on the first interface, automatically selecting at least one of the pieces of first remark information stored in the third application that matches one of the attributes of the first application, and prompting the user with the at least one piece of first remark information in the first interface, wherein the first remark information is information that is stored in a nonvolatile storage medium of the terminal when the user uses the third application; and
displaying, by the terminal, a second interface of the second application, and in response to a first operation performed by the user on the second interface, automatically selecting at least one piece of second remark information stored in the fourth application that matches one of the attributes of the second application, and prompting the user with the at least one piece of second remark information in the second interface, wherein the second remark information is information that is stored in the nonvolatile storage medium when the user uses the fourth application, wherein the first application, the second application, the third application and the fourth application are different applications, and the first remark information and the second remark information are different;
wherein:
before the displaying, by the terminal, the first interface of the first application, and in response to the first operation performed by the user on the first interface, automatically selecting at least one piece of first remark information stored in the third application that matches an attribute of the first application, and prompting the user with the at least one piece of first remark information in the first interface, the method further comprises:
when the user uses the third application, determining, by the terminal, a scenario attribute of a scenario in which the user uses the third application, and storing, in a scenario corresponding to the scenario attribute in a preset scenario library, the first remark information that is obtained by the terminal when the user uses the first application, wherein the preset scenario library is stored in the nonvolatile storage medium, the preset scenario library comprises a plurality of scenarios, and each of the plurality of scenarios has a different scenario attribute.

2. The method according to claim 1, wherein:
the first operation performed on the first interface is a tap operation performed by the user on an input box in the first interface;
the automatically selecting at least one piece of first remark information that matches an attribute of the first application comprises:
automatically selecting, by the terminal, at least one piece of first remark information stored in the third application that matches an attribute of the input box that is in the first interface and on which the first operation is performed;
the first operation performed on the second interface is a tap operation performed by the user on an input box in the second interface; and
the automatically selecting at least one piece of second remark information that matches an attribute of the second application comprises:
automatically selecting, by the terminal, at least one piece of second remark information stored in the third application that matches an attribute of the input box that is in the second interface and on which the first operation is performed.

3. The method according to claim 1, wherein the method further comprising:
adding, by the terminal, a first mark to one piece of first remark information when detecting that the user performs, in the first application on the piece of first remark information, an operation that meets a preset condition; and
the automatically selecting at least one piece of first remark information stored in the third application that matches an attribute of the first application comprises:
automatically selecting, by the terminal, first remark information that matches the attribute of the first application and to which the first mark is not added.

4. The method according to claim 1, wherein the automatically selecting at least one piece of first remark information stored in the third application matches an attribute of the first application comprises:
automatically selecting, by the terminal, a scenario that is in the preset scenario library and whose scenario attribute matches the attribute of the first application, and selecting first remark information in the matched scenario.

5. The method according to claim 1, further comprising:
in response to a second operation performed by the user, storing, by the terminal, third remark information in the nonvolatile storage medium by using the third application or the fourth application;
displaying, by the terminal, a third interface in response to the second operation, wherein the third interface comprises a plurality of application options, and the plurality of application options are in a one-to-one correspondence with a plurality of applications installed on the terminal; and in response to a selection operation performed by the user on the plurality of application options, storing, by the terminal in the nonvolatile storage medium, a correspondence between the third remark information and an application corresponding to an application option selected by the user, or setting an attribute of the application option selected by the user to an attribute of the third remark information.

6. The method according to claim 1, further comprising:

in response to a second operation performed by the user, storing, by the terminal, third remark information in the nonvolatile storage medium by using the third application or the fourth application;

in response to the second operation, analyzing, by the terminal, the third remark information, and searching a plurality of applications installed on the terminal for an application whose attribute matches the third remark information; and storing, by the terminal, a correspondence between the third remark information and the application found in the searched plurality of applications in the nonvolatile storage medium, or setting an attribute of the found application to an attribute of the third remark information.

7. The method according to claim 1, wherein the third application comprises a reminder application, and the fourth application comprise an email application.

8. A terminal, comprising:
a touchscreen;
a memory storing one or more programs;
one or more processors;
multiple application programs; and
wherein
when the one or more processors execute the one or more programs, the terminal is configured to implement the following steps:
using a third application to store pieces of first remark information based upon attributes of a first application;
using a fourth application to store pieces of second remark information based upon attributes of a second application;
displaying a first interface of the first application, and in response to a first operation performed by a user on the first interface, automatically selecting at least one of the pieces of first remark information stored in the third application that matches one of the attributes of the first application, and prompting the user with the at least one piece of first remark information in the first interface, wherein the first remark information is information that is stored in a nonvolatile storage medium of the terminal when the user uses the third application; and
displaying a second interface of the second application, and in response to a first operation performed by the user on the second interface, automatically selecting at least one piece of second remark information stored in the fourth application that matches one of the attributes of the second application, and prompting the user with the at least one piece of second remark information in the second interface, wherein the second remark information is information that is stored in the nonvolatile storage medium when the user uses the fourth application, wherein the first application, the second application, the third application and the fourth application are different applications, and the first remark information and the second remark information are different;

wherein:

before the displaying, the first interface of the first application, and in response to the first operation performed by the user on the first interface, automatically select at least one piece of first remark information stored in the third application that matches an attribute of the first application, and prompt the user with the at least one piece of first remark information in the first interface, the method further comprises:

when the user uses the third application, determining, by the terminal, a scenario attribute of a scenario in which the user uses the third application, and storing, in a scenario corresponding to the scenario attribute in a preset scenario library, the first remark information that is obtained by the terminal when the user uses the first application, wherein the preset scenario library is stored in the nonvolatile storage medium, the preset scenario library comprises a plurality of scenarios, and each of the plurality of scenarios has a different scenario attribute.

9. The terminal according to claim 8, wherein the first operation performed on the first interface is a tap operation performed by the user on an input box in the first interface;

the automatically selecting at least one piece of first remark information stored in the third application that matches an attribute of the first application comprises:
automatically selecting at least one piece of first remark information that matches an attribute of the input box that is in the first interface and on which the first operation is performed;

the first operation performed on the second interface is a tap operation performed by the user on an input box in the second interface; and the automatically selecting at least one piece of second remark information stored in the fourth application that matches an attribute of the second application comprises:
automatically selecting at least one piece of second remark information that matches an attribute of the input box that is in the second interface and on which the first operation is performed.

10. The terminal according to claim 8, wherein the terminal is further configured to:
add a first mark to one piece of first remark information when detecting that the user performs, in the first application on the piece of first remark information, an operation that meets a preset condition; and
the automatically selecting at least one piece of first remark information stored in the third application that matches an attribute of the first application comprises:
automatically selecting, by the terminal, first remark information that matches the attribute of the first application and to which the first mark is not added.

11. The terminal according to claim 8, wherein the automatically selecting at least one piece of first remark information stored in the third application that matches an attribute of the first application comprises:
automatically selecting, by the terminal, a scenario that is in the preset scenario library and whose scenario attribute matches the attribute of the first application, and selecting first remark information in the matched scenario.

12. The terminal according to claim 8, wherein the terminal is further configured to:

in response to a second operation performed by the user, store third remark information in the nonvolatile storage medium by using the third application or the fourth application;

display a third interface in response to the second operation, wherein the third interface comprises a plurality of application options, and the plurality of application options are in a one-to-one correspondence with a plurality of applications installed on the terminal; and in response to a selection operation performed by the user on the plurality of application options, store in the nonvolatile storage medium, a correspondence between the third remark information and an application corresponding to an application option selected by the user, or setting an attribute of the application option selected by the user to an attribute of the third remark information.

13. The terminal according to claim 8, wherein the terminal is further configured to:

in response to a second operation performed by the user, store third remark information in the nonvolatile storage medium by using the third application or the fourth application;

in response to the second operation, analyze the third remark information, and searching a plurality of applications installed on the terminal for an application whose attribute matches the third remark information; and store a correspondence between the third remark information and the application found in the searched plurality of applications in the nonvolatile storage medium, or setting an attribute of the found application to an attribute of the third remark information.

14. The terminal according to claim 8, wherein the third application comprise a reminder application, and the fourth application comprises an email application.

15. A non-transitory computer-readable storage medium, comprising a program or an instruction, wherein when run on a terminal, the program or instruction enables the terminal to perform the following operations:

using a third application to store pieces of first remark information matchable with attributes, indicative of application type, of a first application;

using a fourth application to store pieces of second remark information matchable with attributes, indicative of application type, of a second application;

displaying, by the terminal, a first interface of the first application, and in response to a first operation performed by a user on the first interface, automatically selecting at least one of the pieces of first remark information stored in the third application that matches an attribute of the first application, and prompting the user with the at least one piece of first remark information in the first interface, wherein the first remark information is information that is stored in a nonvolatile storage medium of the terminal when the user uses the third application; and displaying, by the terminal, a second interface of the second application, and in response to a first operation performed by the user on the second interface, automatically selecting at least one piece of second remark information stored in the fourth application that matches an attribute of the second application, and prompting the user with the at least one of the pieces of second remark information in the second interface, wherein the second remark information is information that is stored in the nonvolatile storage medium when the user uses the fourth application, the first application, the second application, the third application and the fourth application are different applications, and the first remark information and the second remark information are different;

wherein:

before the displaying, the first interface of the first application, and in response to the first operation performed by the user on the first interface, automatically select at least one piece of first remark information stored in the third application that matches an attribute of the first application, and prompt the user with the at least one piece of first remark information in the first interface, the method further comprises:

when the user uses the third application, determining, by the terminal, a scenario attribute of a scenario in which the user uses the third application, and storing, in a scenario corresponding to the scenario attribute in a preset scenario library, the first remark information that is obtained by the terminal when the user uses the first application, wherein the preset scenario library is stored in the nonvolatile storage medium, the preset scenario library comprises a plurality of scenarios, and each of the plurality of scenarios has a different scenario attribute.

* * * * *